US012629232B2

(12) United States Patent
Saxler et al.

(10) Patent No.: US 12,629,232 B2
(45) Date of Patent: May 19, 2026

(54) BIOMECHANICAL TRAINING DEVICE FOR THE TEMPOROMANDIBULAR JOINT

(71) Applicant: Forstgarten International Holding GmbH, St. Gallen (CH)

(72) Inventors: Frank Saxler, Paguera (ES); Frank Hornung, Geroda (DE)

(73) Assignee: Forstgarten International Holding GmbH, St. Gallen (CH)

( * ) Notice: Subject to any disclaimer, the term of this patent is extended or adjusted under 35 U.S.C. 154(b) by 1352 days.

(21) Appl. No.: 17/420,413

(22) PCT Filed: Dec. 23, 2019

(86) PCT No.: PCT/EP2019/086969
§ 371 (c)(1),
(2) Date: Feb. 10, 2022

(87) PCT Pub. No.: WO2020/141134
PCT Pub. Date: Jul. 9, 2020

(65) Prior Publication Data
US 2022/0192789 A1      Jun. 23, 2022

(30) Foreign Application Priority Data

Jan. 4, 2019      (DE) ..................... 10 2019 000 008.0
Mar. 11, 2019      (DE) ..................... 10 2019 106 170.9

(51) Int. Cl.
*A61C 7/08*          (2006.01)
*A61C 7/36*          (2006.01)
*A63B 23/03*          (2006.01)

(52) U.S. Cl.
CPC .................. *A61C 7/08* (2013.01); *A61C 7/36* (2013.01); *A63B 23/032* (2013.01)

(58) Field of Classification Search
CPC ....... A63B 23/00; A63B 23/03; A63B 23/032; A61C 7/08; A61C 7/36; A61F 5/00
See application file for complete search history.

(56) References Cited

U.S. PATENT DOCUMENTS

2005/0192157 A1*   9/2005  Norton ................. A63B 23/032
                                                                    482/11
2012/0142498 A1*   6/2012  Li ........................... B25G 1/10
                                                                    482/11

(Continued)

FOREIGN PATENT DOCUMENTS

DE      112009001742 T5      7/2011
DE      102012220054 A1      6/2014

(Continued)

OTHER PUBLICATIONS

International Search Report for corresponding PCT application No. PCT/EP2019/086969, dated Mar. 12, 2020.

(Continued)

*Primary Examiner* — Andrew S Lo
(74) *Attorney, Agent, or Firm* — McDonnell Boehnen Hulbert & Berghoff LLP

(57)                              ABSTRACT
The present disclosure relates to an apparatus for training the muscular, sensorimotor and neurophysiological systems of the temporomandibular joint and for positioning and guiding the lower jaw relative to the upper jaw. The apparatus includes at least two modules which lie against one another in the region of a comparatively large-area separating-sliding plane without teeth or tooth fissures or comparable shapes obstructing the sideways movement of the modules relative to one another along the separating-sliding plane. At least one of the two modules is designed as an upper jaw module which has a plurality of recesses for the teeth of the upper jaw, said recesses approximately forming an arch, and a first smooth sliding surface. At least one of the two (Continued)

modules is designed as a lower jaw module having a plurality of recesses for the teeth of the lower jaw and a second smooth sliding surface.

20 Claims, 39 Drawing Sheets

(56)                    References Cited

U.S. PATENT DOCUMENTS

| | | | |
|---|---|---|---|
| 2015/0210014 A1 | 7/2015 | Hultgren | |
| 2018/0078344 A1* | 3/2018 | Falkel | A61C 7/36 |
| 2018/0256388 A1* | 9/2018 | Magistro | A61C 7/08 |
| 2021/0162156 A1* | 6/2021 | Farrell | A61M 16/049 |
| 2022/0167876 A1* | 6/2022 | Kaltenbach | A61B 5/1111 |

FOREIGN PATENT DOCUMENTS

| | | | |
|---|---|---|---|
| EP | 1147745 A2 | 4/2001 |
| EP | 2630938 A1 | 8/2013 |
| EP | 3332731 A1 | 12/2016 |
| WO | 2014044783 A2 | 3/2014 |

OTHER PUBLICATIONS

Schindler et al., "The therapy of masticatory muscle pain with oral splints", Z Evid Fortbild Qual Gesundhwes. 107(4-5):297-301 (2013).

* cited by examiner

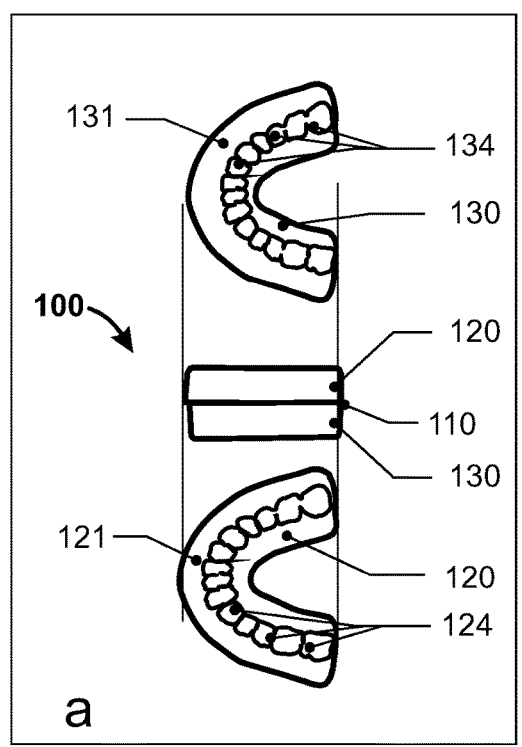
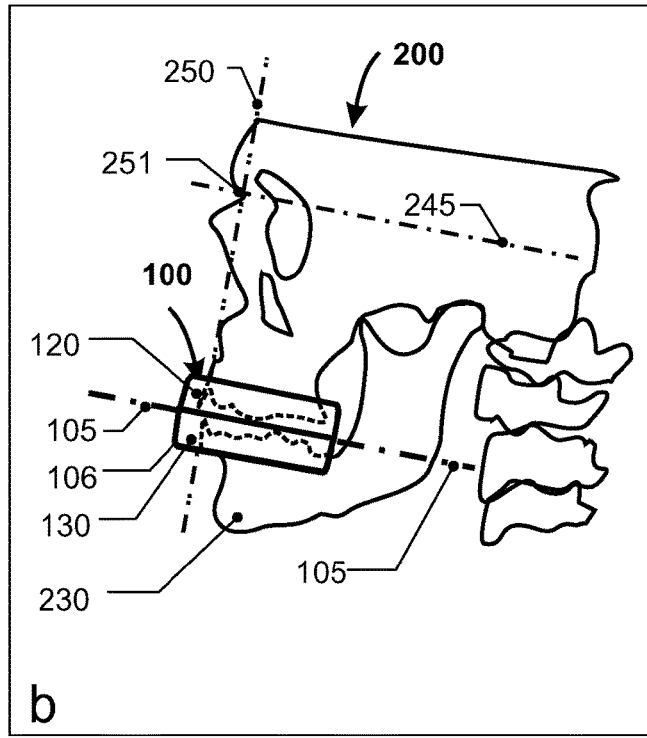
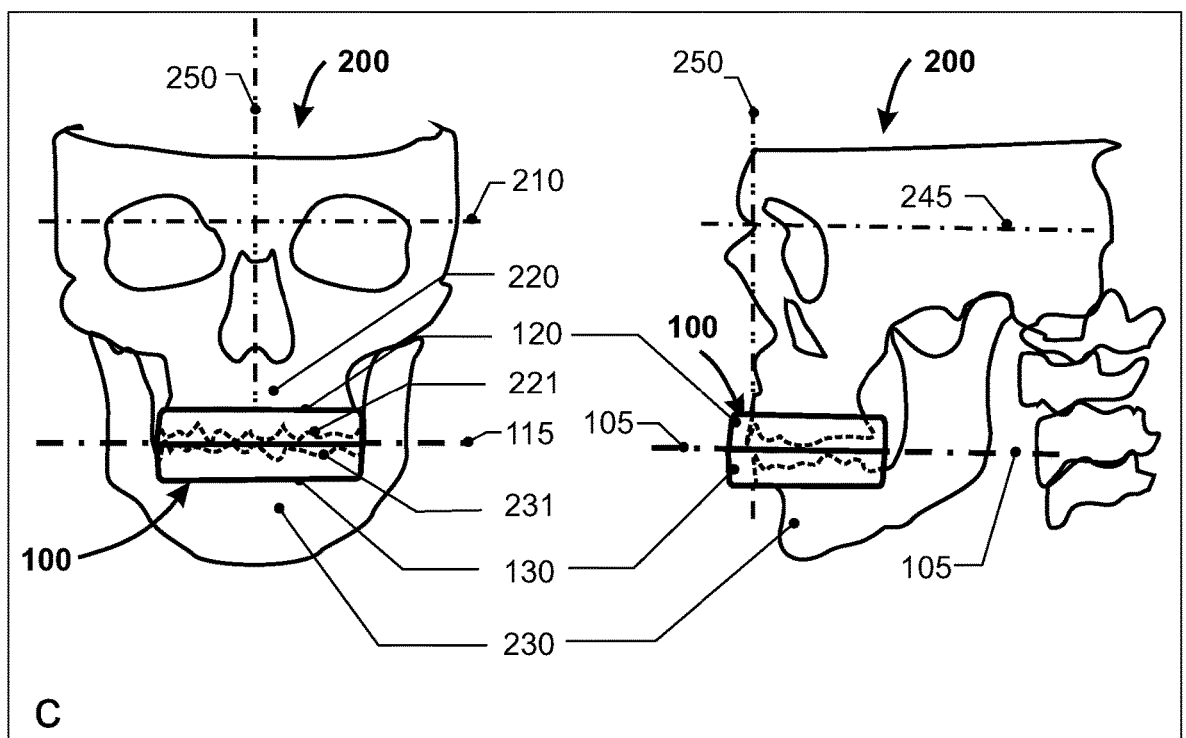
Fig. 1

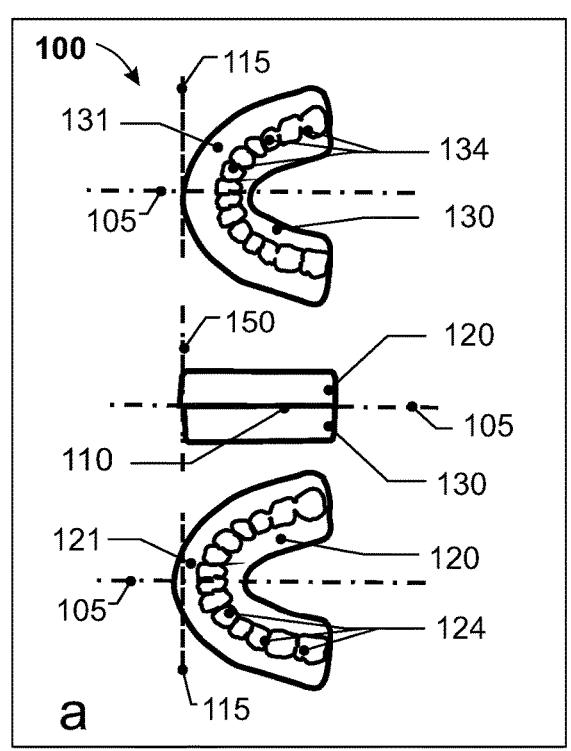
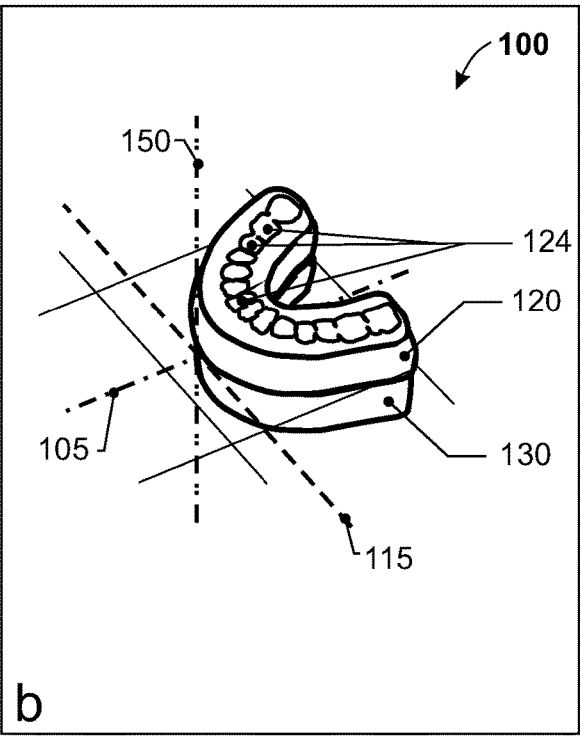
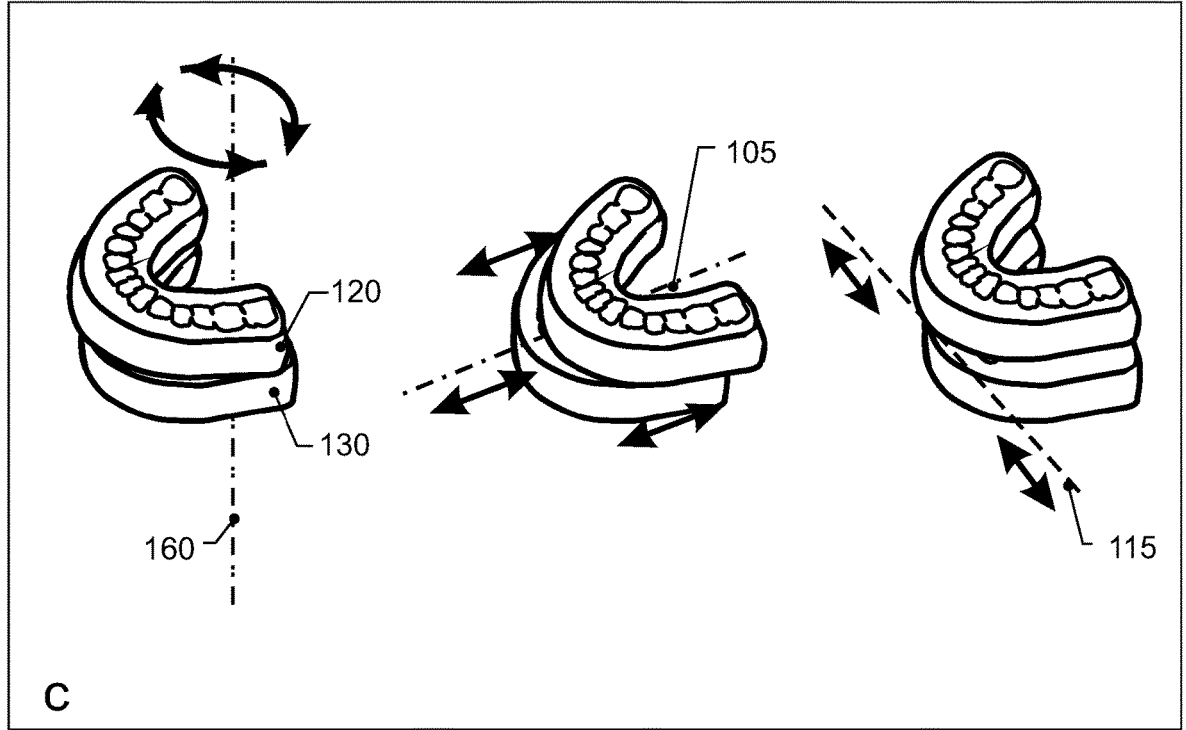
Fig. 2

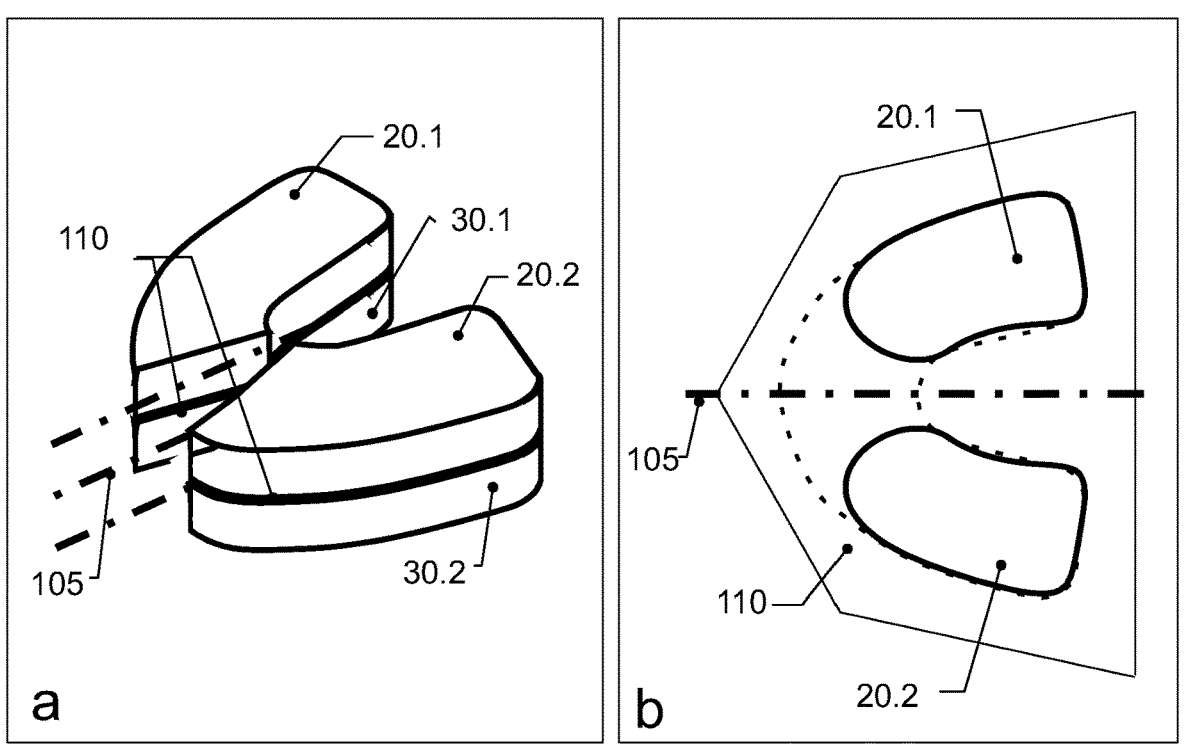
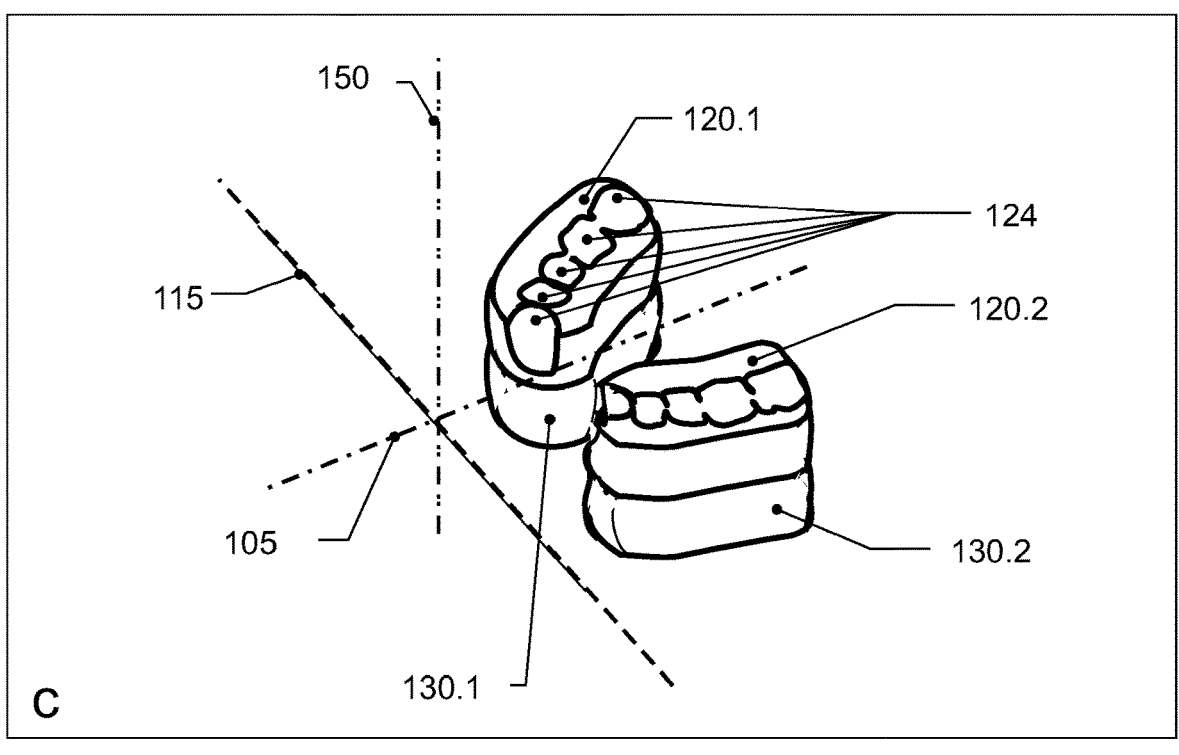
Fig. 5

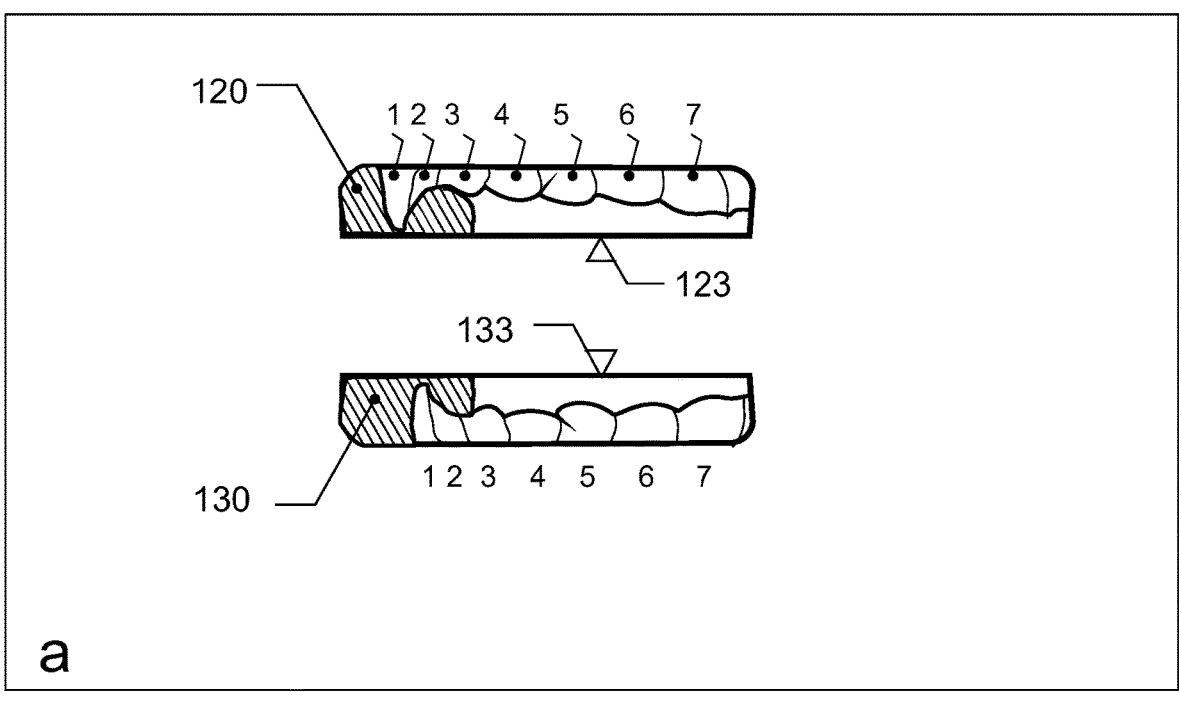
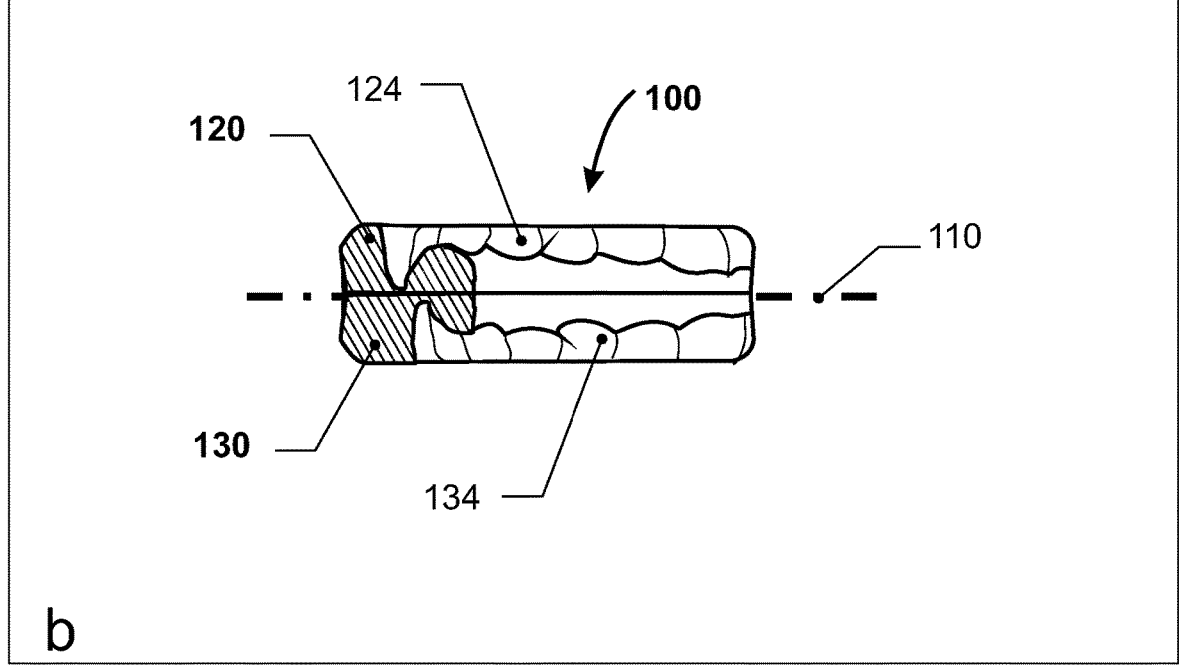
Fig. 10

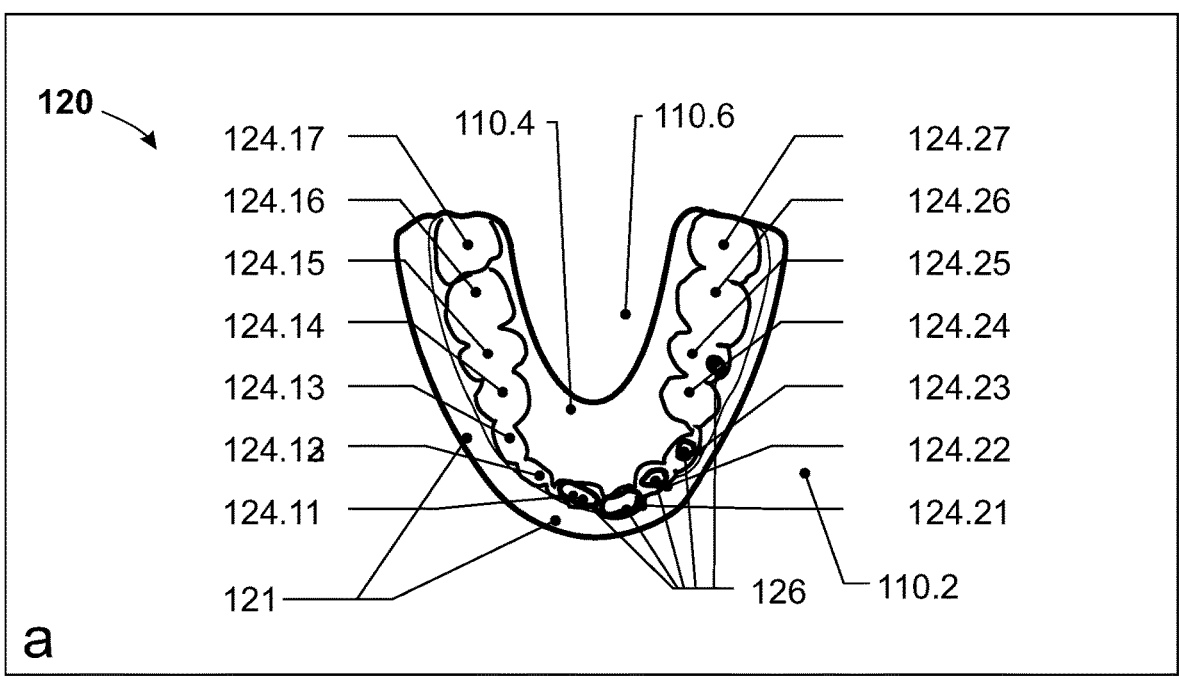
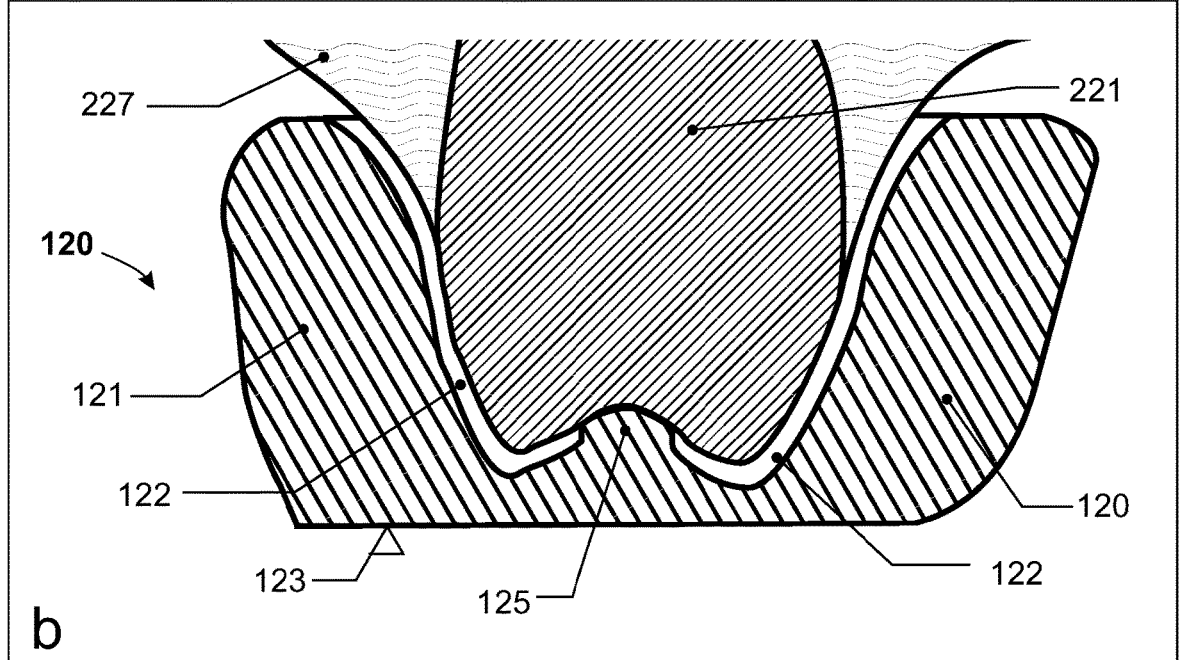
Fig. 11

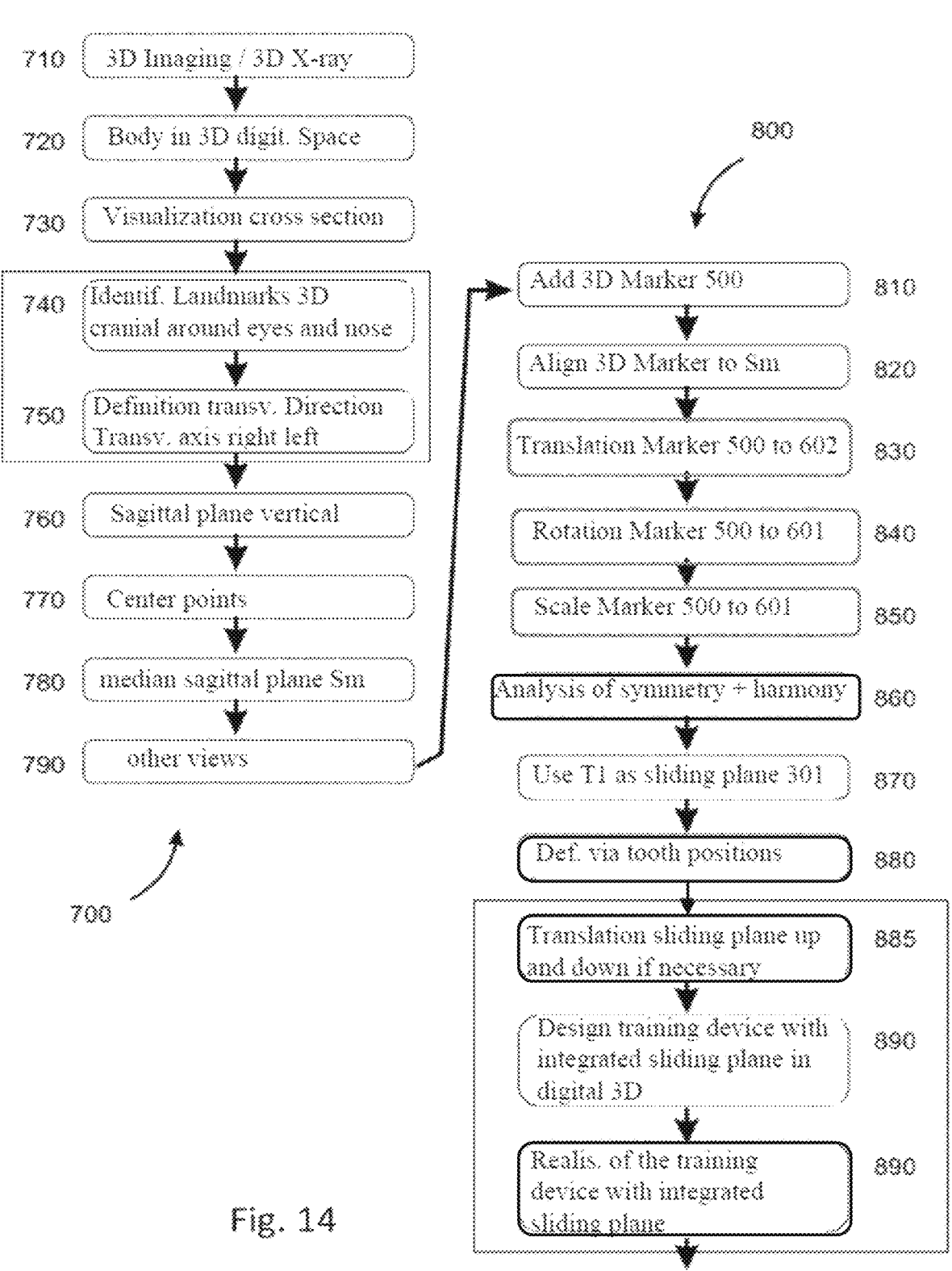

710 — 3D Imaging / 3D X-ray

720 — Body in 3D digit. Space

730 — Visualization cross section

740 — Identif. Landmarks 3D cranial around eyes and nose

750 — Definition transv. Direction Transv. axis right left

760 — Sagittal plane vertical

770 — Center points

780 — median sagittal plane Sm

790 — other views

700

800

810 — Add 3D Marker 500

820 — Align 3D Marker to Sm

830 — Translation Marker 500 to 602

840 — Rotation Marker 500 to 601

850 — Scale Marker 500 to 601

860 — Analysis of symmetry + harmony

870 — Use T1 as sliding plane 301

880 — Def. via tooth positions

885 — Translation sliding plane up and down if necessary

890 — Design training device with integrated sliding plane in digital 3D

890 — Realis. of the training device with integrated sliding plane

Fig. 14

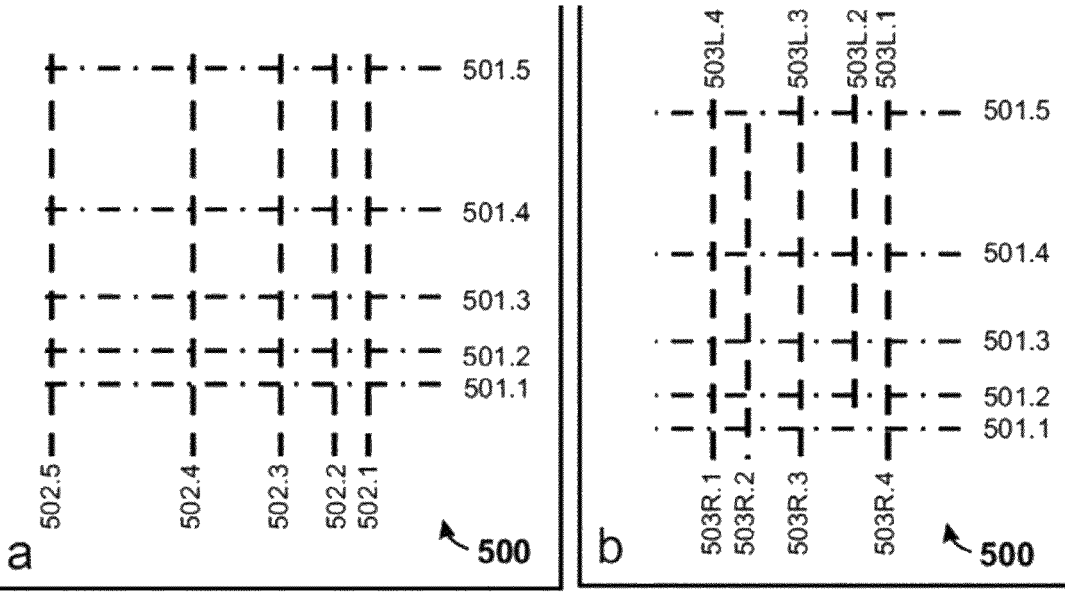
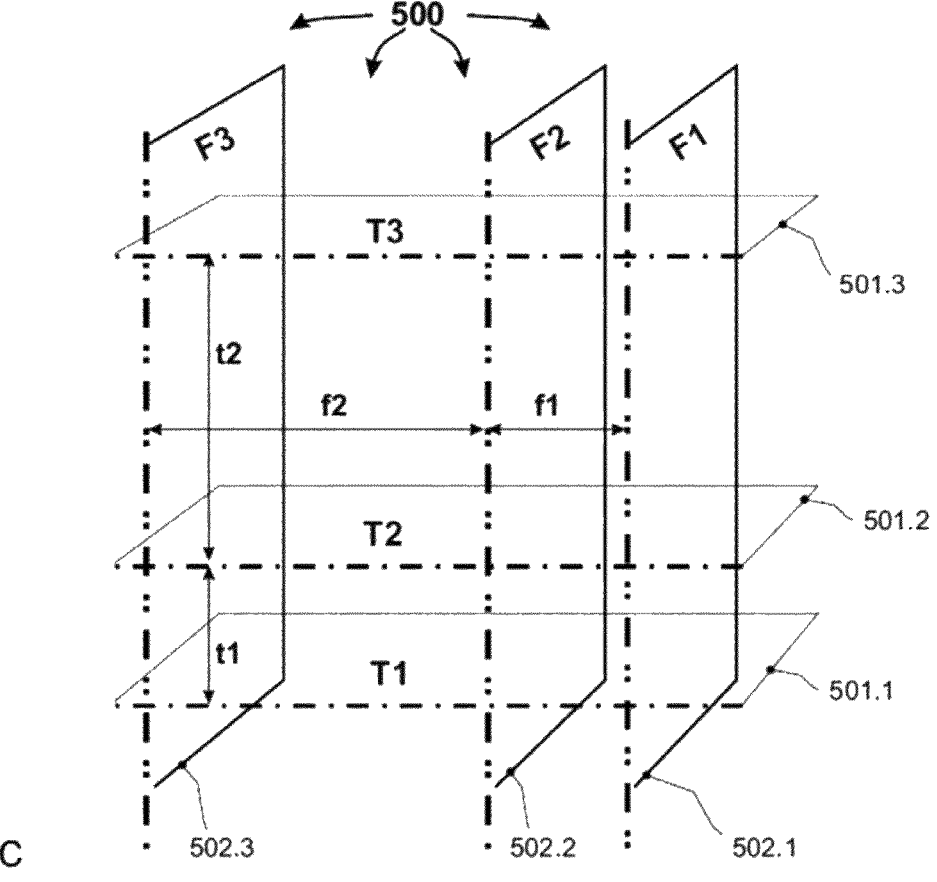
Fig. 15

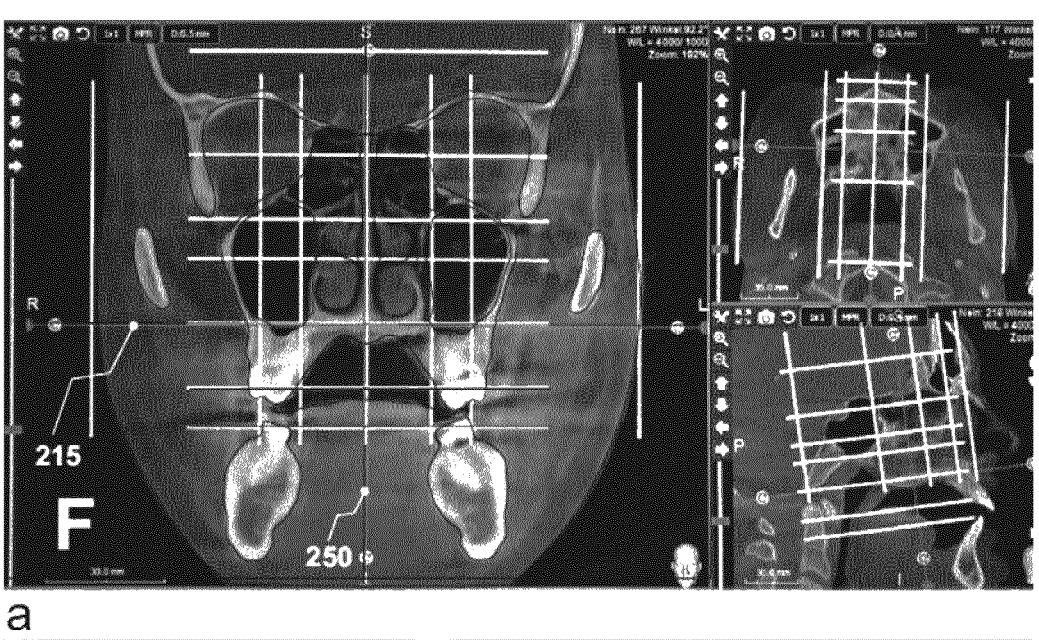
a
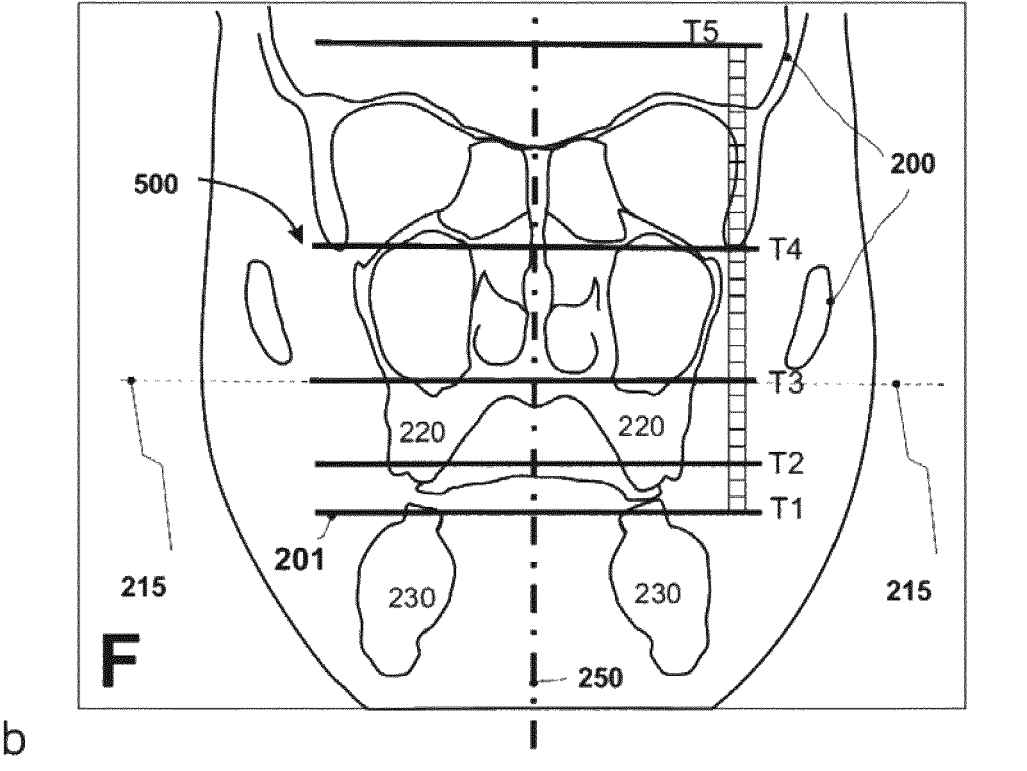
b
Fig. 29

BIOMECHANICAL TRAINING DEVICE FOR THE TEMPOROMANDIBULAR JOINT

FIELD OF INVENTION

The invention relates to an individually manufactured apparatus for training physiologically and biomechanically advantageous jaw positions and jaw movements, in particular for dental medical and orthodontic applications. The apparatus comprises an upper jaw module for the dental arch of the upper jaw and a lower jaw module for the dental arch of the lower jaw. The apparatus is inserted into the mouth of the user and allows a forward and lateral sliding movement of the lower jaw in two dimensions. There is an almost frictionless plane and predominantly exactly transversely sliding separating surface between the upper jaw module and the lower jaw module. The lower jaw can thus be moved by the force component pointing sideways, and the force component of the biting force perpendicular to the separating surface presses the two modules against each other in the separating surface. In particular, the field of application of the present invention is biomechanical neuromuscular training of the muscles that move the lower jaw relative to the upper jaw.

STATE OF THE ART

The patent specification DE102012220054 A1 (Dirk Wiechmann, 2012) describes an orthodontic apparatus for displacing the lower jaw of a patient. It uses two telescopes to exert a force transversely that results in displacement. Such apparatuses have the glaring disadvantage of creating biomechanically and neurophysiologically very unfavorable conditions in the jaw, even when they produce a cosmetically pleasing position of the teeth. The result is severe disturbances in the biomechanics and neurophysiology of the jaw muscles and the temporomandibular joint, up to and including massive discomfort and degenerative diseases.

EP1147745A2 (Thomas Egli) mentions an apparatus that allows transverse displacements. However, the forces have a stretching effect on the lateral areas of the upper dental arch and the upper jaw and are therefore proposed for palatal expansion. The aim is to orthodontically correct an insufficient width of the palate. Although the apparatus is at least two-part, a biomechanical and neurophysiological improvement cannot be achieved with it.

In US 2018/0078344 A1, a splint with a sliding contact surface is shown in which contact occurs between the upper jaw part and the lower jaw part. However, the sliding plane does not depend in any way on the cranial symmetry but on the dental conditions in the dental arch. In particular, the sliding plane is not inclined relative to the chewing plane because of the cranial orientation. The splint also sits firmly on the teeth and creates lateral pressure on the teeth. In this way, it is made impossible for the therapeutically effective pressure stimulus to be applied to the dental arch in the correct cranial orientation.

EP 3 332 731 A1 prescribes an orientation on the inner ear axis, but this transverse axis right-left alone does not define the exact position of the separating in its oblique inclination as seen from the front and the side. Nor does it define the position of the support points 125.1 right-left or 125.2 right-left for the support areas 125 (see FIG. 9, present application). The document mentions the design of aligner splints in such a way that they exert a laterally acting force to bring the teeth of the dental arch in their imaginary transverse axis more and more into the orientation of the inner ear axis. In contrast, the apparatus according to the invention uses a marginal gap to avoid precisely these forces acting laterally on the teeth.

The publication by H. J. Schindler et al ZEFQ, 2013, Vol. 107, Issue 4-5, Page 297-301 entitled: "Therapy of masticatory muscle pain with occlusal splints" shows an overview of the state of knowledge of therapy with oral splints. There are a variety of oral splints that create an altered spacing of the articular cartilages in the temporomandibular joint, especially to relieve compressed temporomandibular joint sides. However, this lacks a training apparatus for muscularly stabilized transverse movement, which can improve neuromuscular control of the jaw muscles with high efficiency.

The usual bite splints prescribed for temporomandibular joint tension have the unfavorable property that they are worn permanently and can even provoke forceful permanent biting. Therefore, patients often complain of even more severe neuromuscular tension when wearing these bite splints. The biomechanical and neurophysiological function of the apparatuses available to date is therefore very inadequate.

All the apparatuses and solutions proposed to date lack the decisive aspect of being able to influence the neuromuscular control of the temporomandibular joint musculature in a suitable way that is advantageous and acts quickly. In addition, prior art apparatuses do not neurophysiologically realign and stabilize the relative position of the lower jaw to the upper jaw in a suitable manner. Rather, there is often even a continuation of the biomechanically and neurophysiologically unfavorable situation. Therefore, the therapeutic successes achieved by oral splints or by other apparatuses to be worn temporarily or permanently are very inadequate.

Task of the Invention

The task of the present invention is to provide a fast, gentle and sustainable training apparatus to achieve neurophysiological, biomechanical and orthodontic improvements. Thereby, the apparatus shall allow a time-limited training of a few minutes without having to wear the apparatus permanently. The effect of the training should be that after training, especially after repeated training, the neurophysiology and biomechanics of the temporomandibular joint are more favorable than before. An additional goal is to create a trained improved state with the aid of the apparatus according to the invention in order to then be able to carry out further therapy steps more efficiently and with even better results.

Solution According to the Invention

The task is solved by the subject-matter of the independent claims. Advantageous developments of the subject-matter of the independent claims are identified in the subclaims. The wording of all claims is hereby made to content of this description by reference. The use of the singular is not intended to exclude the plural, which is also to apply in the reverse sense, unless otherwise disclosed.

Individual apparatuses and process steps are described in more detail below. In the description of the apparatus, the reference to the upper jaw OK and lower jaw UK can be interchanged because the transverse sliding plane TSP is of particular interest.

Apparatus According to the Invention

An individually manufactured apparatus 100, in particular for training the jaw musculature, is proposed to solve the task at hand. In its contact surfaces to the teeth and gums, it is based on the individual 3D data of the tissue, but on the body tissue side it deviates characteristically from the pure 3D digital impression geometry known to the skilled person in a manner according to the invention in order to achieve the training effect. It also has an inventive and functional shape outside the dental arches to support the training effect.

In particular, the training apparatus makes it possible to generate a force exactly perpendicular to the separating-sliding surface and to introduce the chewing pressure into the dental arches in the OK and UK regions at defined contact points, with as few or no laterally acting forces on the teeth as possible. This serves to generate a neurophysiological signal in the masticatory apparatus that is effective for training and to achieve suitable training effects in the sensorimotor area that is responsible for jaw movement and for building up chewing forces.

The apparatus comprises at least one upper jaw module 120 and at least one lower jaw module 130, which are separated by a slidably smooth separating-sliding plane 110. In this regard, the upper jaw module 120 and or the lower jaw module 130 may be a single piece or may be multi-part and comprise multiple pieces. The pieces of the multi-part module, if any, together form a planar separating-sliding plane TGE 110. The separating-sliding plane 110, when the apparatus 100 is in place, is oriented primarily horizontally when viewed from the front, or in the transverse axis parallel to the transverse axis between right-left symmetrical landmarks of the facial skull, such as the zygomatic bone, orbital arch, and so forth. Viewed from the side, the separating-sliding plane 110 slopes downward at an angle between 5° and 25° from the transverse leading backward. The separating-sliding plane 110 is created by superimposing the two modules HJM 120 and UKM 130 exactly between the contacting modules. The surface has a low roughness, preferably with RZ below 5 micrometers, particularly preferably without visible grooves and RZ below 2 micrometers.

PREFERRED EMBODIMENTS OF THE INVENTION

This separating-sliding plane 110 of the training apparatus is not parallel to the chewing plane 111 in patients requiring therapy, but is inclined in two tilting directions left-right and back-front. This separating-sliding plane 110 is parallel to a cranial symmetry plane oriented to landmarks of the anterior facial skull, whereby it is individually oriented according to the geometry of the cranium and is thus inclined to an individual extent against the individual chewing plane 111. The chewing plane 111 of the patient's dentition, on the other hand, is different from the separating-sliding plane 110. The training apparatus comprises clearances for the teeth of the dental arches of the upper and lower jaws, these clearances being locally purposefully designed to be wider or broader than the corresponding width of the teeth, so that no laterally acting forces are exerted on the teeth of the dental arch, because the supporting forces are only effective perpendicular to the separating-sliding plane 110. In the absence of laterally acting forces between the training apparatus and the dental arch, the training apparatus differs quite substantially from all other splints and braces which are used in particular for a tight fit and for the force-mediated lateral displacement of the teeth backwards or forwards and or to the right or to the left.

The chewing plane 111 can be determined by a rigid and flat object, such as a metal blade, which is clamped between the upper jaw and lower jaw when the denture is closed. In the clamped position, the plane of the blade corresponds to the chewing plane 111.

Due to the smooth and especially preferably polished sliding surface, almost frictionless sliding of the lower jaw module 130 relative to the upper jaw module 120 (see FIG.

1) in two dimensions is possible even under pressure, as is rotation about an axis 160 perpendicular to the separating-sliding plane (see FIG. 2). Tilting of the modules 120 and 130 relative to each other in the sense of rotational movements about axes 105 and 115 that are parallel to the separating-sliding plane 110 is not possible once the modules are held together by the bite force. The physical consequence of the slidably smooth and low-friction separating-sliding plane 110 is that the contact force is perpendicular to this plane with negligible frictional force as long as the freedom of movement between the lower jaw module 130 and the upper jaw module 120 is not restricted by lateral stops. Therefore, marginal gaps 122 or 132 are used to ensure the small-scale but important lateral mobility in the sliding direction. Following the respective dental arch 221 or 231, the modules 120 or 130 have several recesses 124 in the upper jaw module or 134 in the lower jaw module. Predominantly in the region of the incisors, but sometimes also in the region of the molars, the recesses 124 of the upper incisors 221 pass through the upper jaw module 120 and reach the lower jaw module 130, where they form small reciprocal depressions in the otherwise planar and smooth separating-sliding plane 133. Conversely, the teeth of the lower jaw 231 may also require recesses 134 in the lower jaw module 130, breaking through the lower jaw module 130, creating shallow recesses 122 in the overlying upper jaw module, which also have a marginal gap, i.e., are without contact with the teeth passing through.

These penetrating depressions 132 in the lower jaw module and 122 in the upper jaw module do not result in mechanical interlocking of the upper jaw module 120 with the lower jaw module 130, because they are characterized by a circumferential marginal gap of sufficient width, which gives the tooth extending into this shallow recess freedom of lateral movement in each case. The marginal gap between the edge of the shallow recess and the tooth is preferably greater than 0.3 mm, and is particularly preferably between 0.4 and 1.4 mm. The freedom of movement of the lower jaw relative to the upper jaw along the plane of separating-sliding 110 is thus restricted to this important marginal gap of the shallow recesses as soon as such penetrating recesses 122 or 132 are present. The biomechanical and neurophysiological effect of the apparatus 100, which can be used as a training apparatus, is unimpressed by the restricted transverse range of motion, because the effect is based on the lateral mobility existing in the equilibrium position, which is indeed present due to the marginal gap.

A marginal gap is also present in the area of the chewing surfaces of the teeth and in the area of the gums. In order to maintain this marginal gap even under compressive load, the modules are supported on locally limited cusp-like or plateau-like projections 125 or 135 which, viewed superficially, appear approximately round or oval, with a diameter of 800 to 6000 micrometers and a height of preferably less than 800 micrometers. The contact force is transmitted only at these protrusions 125 or 135 between module 120 or 130 and the respective dental arch. The projection 125 or 135 itself is adapted to the tooth in the contact area to the tooth in a form-fitting manner. If true openings 126 or 136 must be present in the recesses 124 or 134, the contact points 125 or 135 are arranged next to them. In total, each module is held in a position with marginal gaps 122 by at least 3 contact points 125 or 135 even under pressure load during biting. The marginal gaps 122 surround all teeth and are at least large enough to ensure that the placement and removal of the modules is free of undercuts and that there is additional mobility on a small scale of preferably less than 1200 micrometers between module and dental arch, particularly preferably less than 600 micrometers.

The biomechanical function of the apparatus 100 with training effect results after the upper jaw module 120 is placed on the lower jaw module 130 and both modules are brought into contact with the dental arches of the upper jaw 221 and lower jaw 231 as a package in the mouth by closing the mouth. Now the lower jaw 230 and the upper jaw 220 are brought into a relative position defined by the individually manufactured 3D geometry of the modules. At the same time, however, the sliding movement right-left and back-front as well as the rotation about the axis 160 perpendicular to the separating-sliding plane is freely given within certain limits and possible almost without friction. This begins the action of the orthogonality condition for the contact force between the upper jaw 220 and lower jaw 230. The equilibrium is biomechanically comparatively unstable or metastable because the retentions of the teeth are eliminated by the sliding surface 110. And precisely this unstable or metastable force state with rudimentary possible transverse sliding of the lower jaw forward or backward as well as to the left or right means in detail a mechanical instability which must be stabilized neuromuscularly similar to the upright gait. This activates the sense of balance and this causes a training of the neurophysiological and sensorimotor structures of the temporomandibular joint and the masticatory apparatus up to the muscles of the head and neck.

The suitable orientation of the separating-sliding surface is of particular importance for the optimum training effect. The 3D position of the separating-sliding plane 110 relative to the upper jaw determines in detail how the lower jaw can move along the separating-sliding plane with the lower jaw module in place. Analysis of hundreds of 3D X-ray image data of the head has shown that the biomechanically favorable plane of motion is rarely located where the current chewing plane becomes apparent. The current chewing plane is where a thin bite plate would lie with its spatial orientation and position if it were wedged between the teeth of the upper jaw and those of the lower jaw. The biomechanically favorable plane of movement, on the other hand, depends on the symmetry of the facial skull in the upper region, i.e. hardly on the lower jaw, much more on the bony area around the eye sockets on the right and left.

Surprisingly, it turned out on the basis of a large number of practical application tests that the biomechanically favorable exact orientation of the slidable separation plane 110 between OKM 120 and UKM 130 deviates clearly measurable by a tilt angle kappa 112 from the current chewing plane AKE 111 of the dental arches in most cases with training requirements. For the fabrication and for the positioning of the apparatus 100 according to the invention, the separation plane 110 is not aligned on the basis of the dental arches in upper jaw 220 and lower jaw 230, but on the basis of the anatomical transverse symmetry axes in the facial skull 200 (in the facial cranium). The skilled person finds the transverse symmetry axes in the facial skull e.g. in the X-ray image or in the 3D DVT image by means of the clearly recognizable bony feature points at the zygomatic bone arch and or at the bony edge of the orbit. Since the modules for the upper jaw and lower jaw are positioned in the digital virtual 3D model on this separating-sliding plane, the recess for the teeth that is then to be fabricated results from the position of the upper and lower jaw relative to the respective dental arch. After fabrication of the apparatus, insertion of the modules on the dental arches in turn results in the planned position and alignment of the separating-sliding plane relative to the upper jaw and the facial skull, which is anatomically connected to the upper jaw. Practice shows a more or less clear and very individual deviation of the separating-sliding plane TGE derived from the facial skull from the existing current chewing plane AKE. In these cases, there is a corresponding asymmetry of the lower facial skull, the upper jaw and the lower jaw. Part of the asymmetry of the lower jaw UK relative to the upper facial skull is neuromuscular and the result of tension and poor posture in the temporomandibular joints. This is where training with the apparatus according to the invention comes in, in order to restore symmetry step by step.

A neurophysiologically important contribution to the training effect is achieved by the bead-thick shape of the modules. The modules bear thick material beads 121 or 131 outside the boundary of the dental arch in marked contrast to aligner splints or bite splints, which are suitable for stretching the soft tissue in the lip area. This stretching due to the apparent oversize of the modules, which barely fit in the mouth, leads to increased neuromuscular feedback to the sensorimotor system of the jaw and the mimic musculature. Since the possible stretches vary greatly from person to person, the mass of the surrounding material beads 121 on the upper jaw module and 131 on the lower jaw module are individually adapted to the available soft tissue and to the training requirements and training condition.

The apparatus according to the invention is manufactured by 3D processing of suitable hard materials. During the shaping process, the OK parts and UK parts are given the individually characteristic spaces to accommodate the teeth, preferably with a marginal gap. The position of the separating-sliding plane relative to the chewing plane of the dental arches results from the individual symmetry of the cranium, i.e. the facial skull and the skull up to the base of the patient's skull. This symmetry can preferably be seen on the basis of radiographs. According to the invention, this cranial symmetry is used to align the separating-sliding plane 110 in positional relation to the chewing plane 111.

The numerous tests with test persons have shown that the apparatus is suitable for achieving extensive relaxation of previously tense and painful temporomandibular joint muscles after only a few minutes in the mouth with actively variable chewing pressure.

Another important application is that the effect of training provides a better baseline condition for measuring temporomandibular joint kinematics, and thus a biomechanically and dentally far more favorable basis for acquiring physiologically relevant motion data of the lower jaw relative to the upper jaw.

The foregoing has broadly explained the features and technical effects of the invention. Additional features and technical effects of embodiments of the present disclosure will be explained below, e.g., the subject-matter of the claims. It should be recognized by those skilled in the art that the conception and specific embodiments may be used as a basis for modifying or designing other structures or processes which have the same or similar purposes as the conception specifically explained herein. It should also be recognized by the skilled person that equivalent designs do not depart from the spirit or scope of the disclosure as defined, for example, in the appended claims.

For a more complete understanding of the disclosed concepts and their technical effects and advantages, reference is now made to the following description in conjunction with the accompanying figures. The figures are not drawn for scale. In the drawings show.

LIST OF FIGURES

Further details and features result from the following description of preferred exemplary embodiment in connection with the figures. The respective features can be implemented individually or in combination with one another. The possibilities of solving the task are not limited to the exemplary embodiments.

The exemplary embodiments are shown schematically in the figures. Identical reference numbers in the individual figures denote identical or functionally identical elements or elements that correspond to one another in terms of their functions.

FIG. 1a to c show the contours of the apparatus 100 and its position based on the bony contours of a head 200.

FIG. 2a to c show the possible relative movements (2×translation and 1×rotation) between the lower jaw and the upper jaw within the separating-sliding plane TGE.

FIG. 3 shows a mouth with apparatus 100 in place with the dental chewing plane 111 significantly inclined compared to the separating-sliding plane 110.

FIGS. 4a and b show the preforms 20 and 30 for the fabrication of the modules 120 for the upper jaw and 130 for the lower jaw for material-removal fabrication.

FIGS. 5a and b show variants with multipart upper jaw module 120 and multipart lower jaw module 130, where the separating-sliding plane 110 is the contact surface.

FIG. 6 shows a transverse sectional view through an individual upper jaw module 120 with the recesses 124 for corresponding teeth of the dental arch of the upper jaw.

FIG. 7 shows the bony contours of the skull with its axis of symmetry 215 and, preferably parallel thereto, the transverse axis 115 of the separating-sliding plane 110 of the apparatus 100 used in the mouth, which is tilted obliquely to the dental chewing plane 111.

FIG. 8 shows the sectional view AB through the apparatus 100 with the recesses 124 and 134 for the corresponding teeth, where partially the recesses 134 break through the module 130 and recesses 129 are also formed in the otherwise flat and smooth sliding surface 123 of the module 120. Here, the marginal gaps 122 are visible.

FIG. 9 shows an upper jaw module 120 with, in the example, 4 support points 125, whereby marginal gaps 122 are present on the other teeth without support points. This means that the modules are only supported at points on the support points 125.

FIG. 10 shows a sectional view of the apparatus 100 in the preferred embodiment with the sliding surfaces 123 and 133 machined to be slidably smooth, wherein the separating-sliding plane 110 is created by joining the modules for the upper jaw 120 and lower jaw 130.

FIG. 11a shows the recesses 124 with the dental tooth positions 11 to 17 and 21 to 27 of the upper jaw in the upper jaw module 120 as well as the breakthrough recesses 126. FIG. 11b shows in detail from above the tooth of the dental arch 221 with the surrounding gum 227 and the upper jaw module 120 with sliding surface 123 and support point 125 as well as marginal gap 122.

FIG. 12 shows DVT 3D radiographs of a head 200 with upper jaw 220 and lower jaw 230 and symmetry axes 250 bottom-top, 105 front-back, and 115 right-left based on bone features in the upper facial skull.

FIG. 14 shows a schematic of the procedure for the individual application of 3D structural marker.

FIG. 15 shows the combination of at least two plane packages to a 3D structural marker.

FIG. 29 shows a frontal sectional view through the molar region with the chewing plane lying too high.

FIG. 34 shows the structural marker in sagittal sectional view with the separating-sliding plane drawn in.

Figure 37:
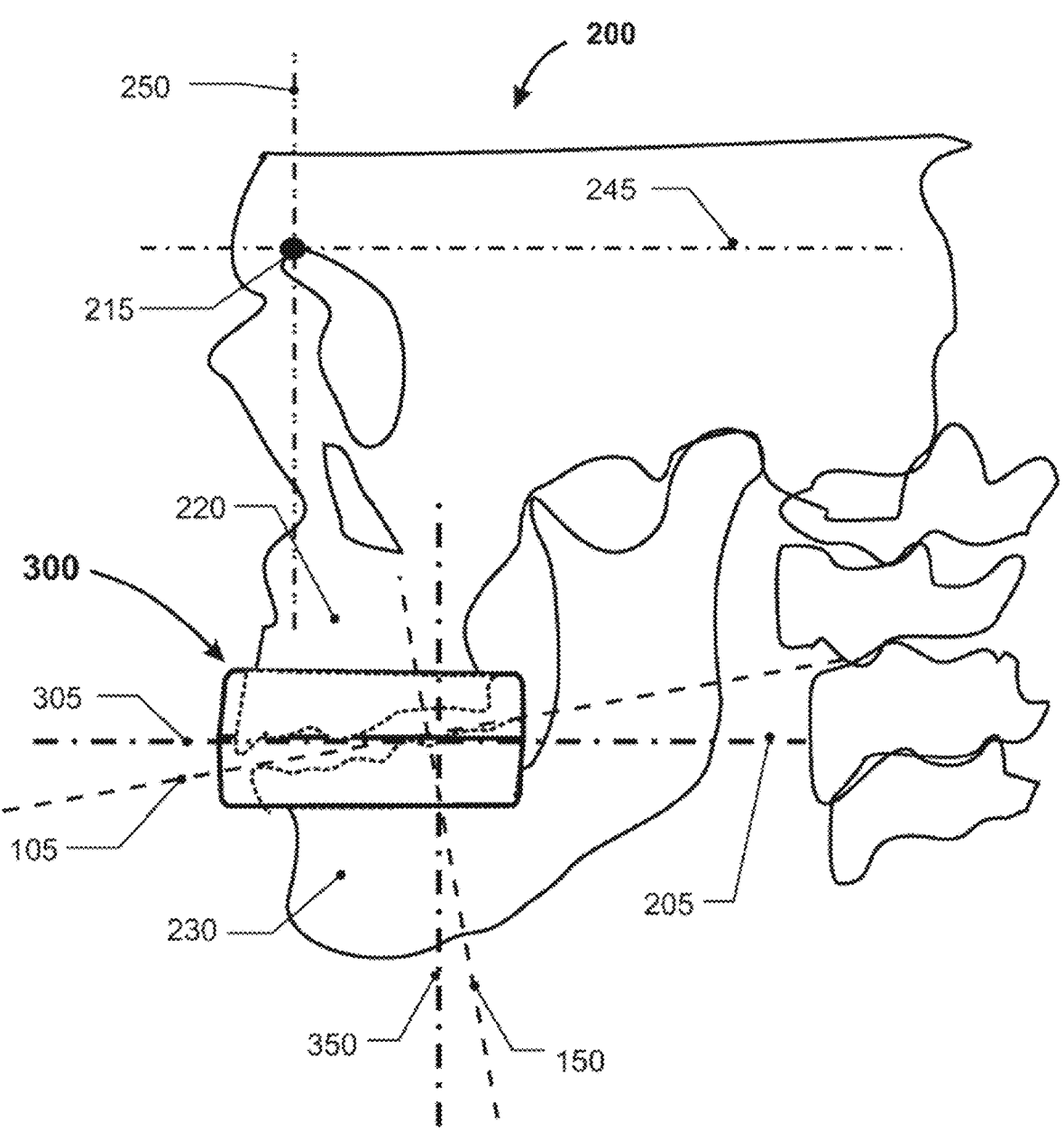

FIG. 37 the head schematically from the side with a spatial orientation in which the coordinate system of the skull is perpendicular.

FIGURES AND EXEMPLARY EMBODIMENTS WITH DETAILS

FIG. 1

To be taken into account in FIG. 1a is the folding direction of the illustrated apparatus, which results in the view of the lower jaw module 130 from below in FIG. 1a being above. Correspondingly, the view of the upper jaw module 120 from above is drawn below. The side view is shown in between, with the upper jaw module 120 in direct contact with the lower jaw module 130. The apparatus 100 has an upper jaw module 120 and a lower jaw module 130.

Between the modules 120 and 130, the smooth, flat and slidable separating-sliding surface 110 is formed. The relative movements possible there are described in FIG. 2.

FIG. 1b shows the inserted apparatus 100 in the mouth, whereby the apparatus 100 is only drawn in a highly schematized manner and the head is also only indicated by the bone contours 200. The axis 250 runs from top to bottom, and when the head is held normally, it runs at a slight angle with usually 5° to 15° of inclination. A preferred anchor point for the position is the nasion point 251 at the root of the nose. The front-to-back axis 245 at the top of the skull is perpendicular to this. The axis 105 for orientation of the apparatus runs parallel to 245 through the overlap area of the incisors, called the incision point. These points are known to the skilled person in dentistry and orthodontics. The upper jaw 220 carries the dental arch 221 and the lower jaw 230 carries the dental arch 231. The separating-sliding plane 110 is defined by the axes 105 falling obliquely from front to back and the transverse axis 115 right-left.

FIG. 1c shows the skull in vertical orientation. The vertical axis 250 is exactly perpendicular with respect to the front-back axis 105, which is exactly horizontal. The apparatus 100 is oriented exactly parallel to the right-left axis 115, and the separating-sliding plane 110 is oriented strictly horizontally transversely. This orientation of the apparatus 100 with upper jaw module 120 and lower jaw module 130 results in the relative position of all teeth and thus the position of the recesses 214 for the corresponding teeth.

FIG. 2

FIG. 2a shows the apparatus of FIG. 1a with orthogonal axes 105, 115 and 150.

FIG. 2b shows the three orthogonal spatial axes of the apparatus 100, The vertical top-bottom axis 150, the transverse right-left axis 115 and the front-back axis 105. The two axes 115 and 105 span the separating-sliding plane 110.

FIG. 2c shows the three degrees of freedom of movement that exist for the relative movement between the upper jaw module 120 and the lower jaw module 130, insofar as they are not limited by lateral stops. The marginal gaps of the recesses for the teeth allow the required freedom of movement around the unstable equilibrium point. Possible, given the biomechanics of the temporomandibular joint, are small rotational movements around a more backward vertical axis 160 parallel to axis 150, and superimposed on this, small translational movements along the front-back axis 105 and, furthermore, also along the right-left axis 115. These free movements around the unstable equilibrium position when the apparatus 100 is compressed between the upper jaw and lower jaw is important for the neurophysiological and biomechanical effect of the apparatus 100.

FIG. 3

Figure 3:
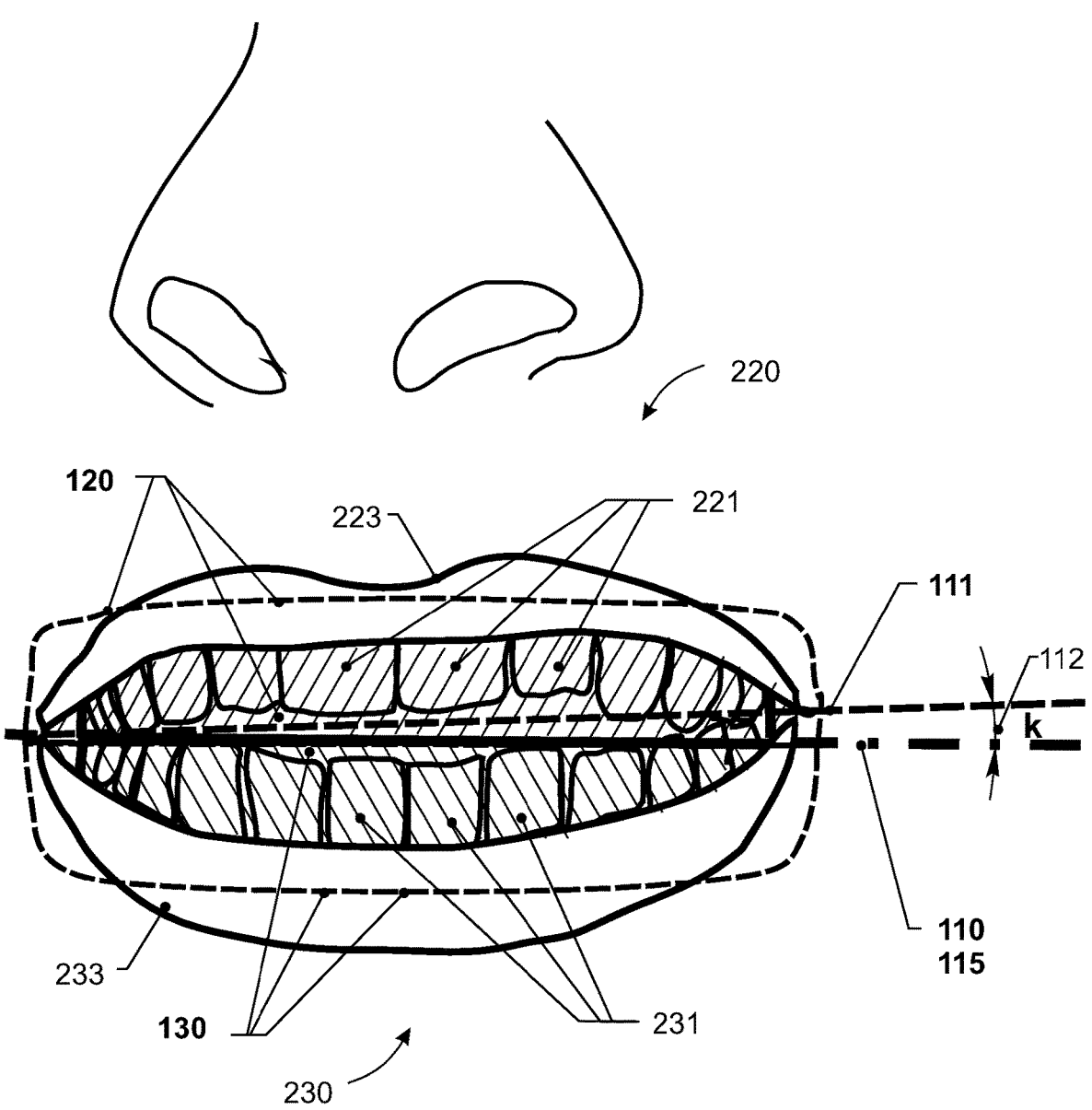

FIG. 3 shows the apparatus 100 with upper jaw module 120 and lower jaw module 130 partially visible, hatched there, made of transparent pressure-resistant material. The teeth 221 and 231 and their oblique dental chewing plane 111 can be seen through. The lips 223 and 233 hide the rest of the apparatus 100, which is indicated there by dashed lines. The location of the dental chewing plane 111 can be captured by biting into a plate or by placing a best fit plane between the dental arches of the upper jaw and lower jaw in the 3D digital image. An important measure of the asymmetry of the dentition relative to the upper facial skull is the small angle k 112 between the right-left axis 115 of the separating-sliding plane 110 and the dental chewing plane 111.

FIG. 4

FIG. 4a: In a preferred exemplary embodiment, horseshoe-shaped preforms are used to create modules 120 and 130 for further machining. Alternatively, the modules can be milled or additively manufactured, for example, from round plastic disks. The use of transparent plastics is preferred. The material must be pressure-resistant, dimensionally stable and slidable, and it is particularly preferred that it can be polished well in order to be able to produce a smooth, planar and almost frictionless sliding surface at each of the contact surfaces or the separating-sliding surfaces 23 or 33. PMMA, for example, is suitable.

FIG. 4b: The upper jaw preform 20 fits geometrically approximately or exactly to the lower jaw preform 30. If the two preforms 20 and 30 are placed against each other at the separating-sliding surfaces 23 and 33, they form a plane smooth sliding contact surface that defines the plane 110. This plane 110 is parallel to the symmetry axes of the skull front-back 205 and right-left 215. For digital 3D fabrication of modules 120 and 130, the preforms 20 and 30 are digitally positioned relative to the skull 200 and its three orthogonal axes 250, 215 and 205 such that the three orthogonal axes 150, 115 and 105 of the preforms 20 and 30 are parallel to the skull axes. The 3D position of the preforms in the skull is aligned based on skull symmetry so that axis 105 is approximately equidistant from the incisors of the upper jaw and lower jaw. The oblique inclination from the lateral view is obtained using other anatomical landmarks. After defining the position of the package of the two preforms 20 and 30 in the virtual 3D environment, the 3D contour of the dental arches and gums is superimposed on the preforms to obtain the necessary recesses in the modules 120 and 130. In addition to the geometric volume of the dental arches, the recesses for the teeth are made wider than on the basis of the direct 3D data of the teeth by creating a wider and deeper recess for each tooth in the preform and also creating recess areas for the gums that go slightly deeper than is necessary for the form fit on the basis of the direct 3D data of the gum tissue. The more extensive depressions in the preforms initially create continuous marginal gaps. In order to be able to maintain the marginal gap later in the real case even under pressure, contact points are worked out at which the marginal gaps are massively interrupted in small local areas by working out the recess there only exactly as far as it corresponds to the 3D shape of the tooth. Preferably, the contact points 125 (see FIGS. 7, 8, 9, 11) are located on selected occlusal surfaces of teeth, each in a small range of 1 to 5 mm in diameter, each module being supported under a biting force of at least 3 contact points with respect to the corresponding dental arch with a marginal gap of 0.3 to 1.3 mm.

FIG. 5

In a particular exemplary embodiment, multi-part preforms 20 and 30 are used to produce multi-part modules 120 and 130. FIG. 5a shows a pair of preforms that are each in two parts: Preforms 20.1 and 20.2 and 30.1 and 30.2. FIG. 5b. shows other shape variants. It is known to the person skilled in the art that the same result can also be obtained by machining a one-piece preform. FIG. 5c: In this particular exemplary embodiment, the modules are two-piece modules for the upper jaw 120.1 and 120.2 and for the lower jaw 130.1 and 130.2. A two-piece module at the top can also be combined with a one-piece module at the bottom and vice versa. In principle, multi-part modules are possible, although one-piece and two-piece modules are preferred. The arrangement of the 3 spatial axes 105, 115, 150 in the 3D digital manufacturing system relative to the skull follows the same conditions as for the one-piece modules.

Figure 6:
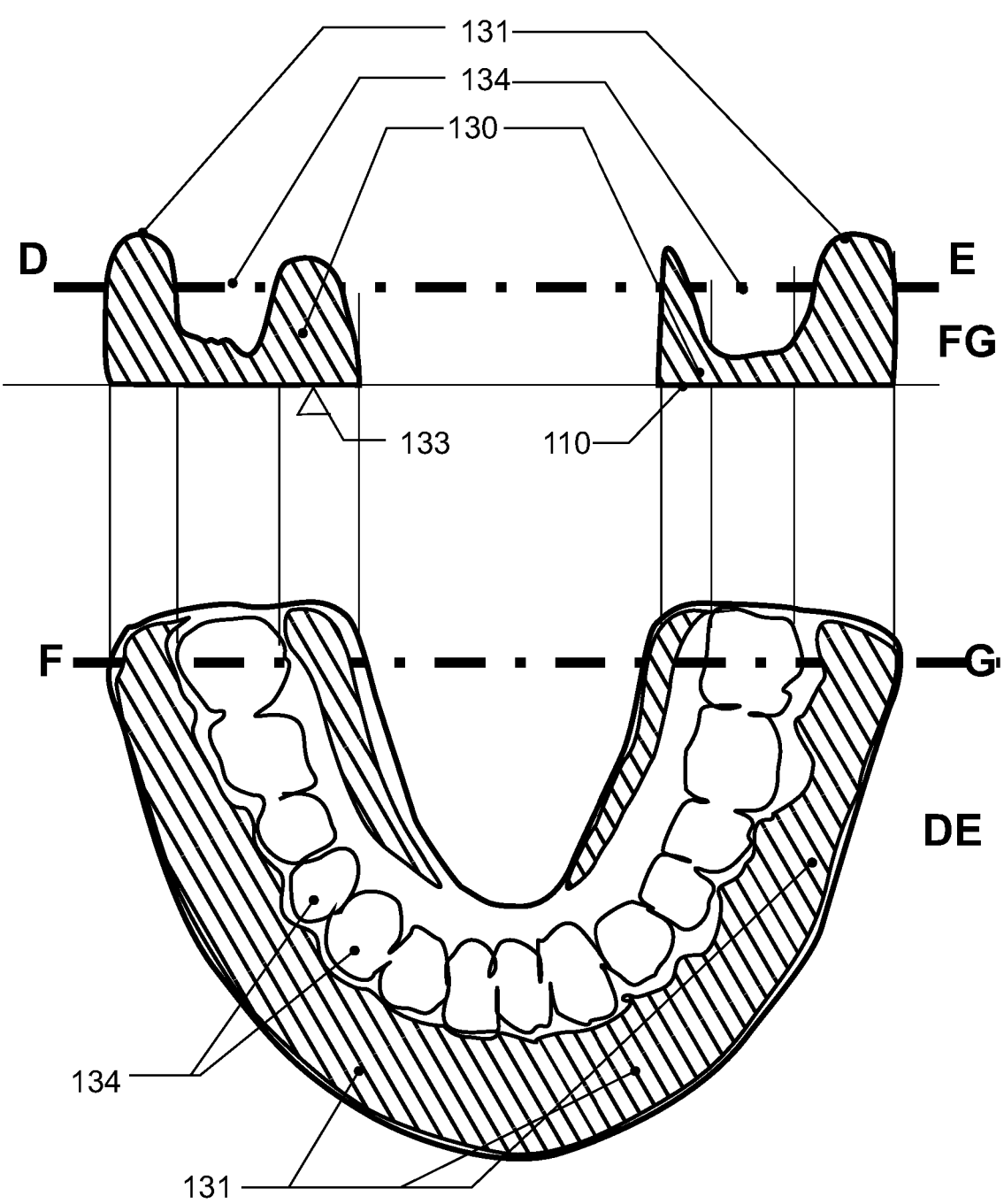

The preforms for parts 120 and 130 preferably already have the almost friction-free sliding surfaces and are then polished again. In the digital image space, these parts are available as 3D reference parts. First, the cranial principal axis system in the head is determined individually, which results in the principal axes of the cranium rear front 205, right left 215, top bottom 250. The two parts 120 and 130 of the training arrangement also have a coordinate system 305, 315, 350. To digitally generate the surfaces and volumes of the training apparatus, the reference objects 120 and 130 are arranged in the 3D manipulation system in the vicinity of the dental arches of the upper jaw and lower jaw in such a way that they are as exactly parallel as possible to the principal axes of the cranium in their main directions. Since the main axes of the cranium are not parallel but tilted to the main axes of the dental arches and thus of the dentition and the chewing plane, the slightly tilted and twisted arrangement of the preforms for 120 and 130 relative to the dental arches results in the free spaces 124 and 134 for the dental arches, plus the marginal gaps 122 and 132 being twisted and tilted relative to the preforms. This shows how far the cranial system of the main directions 205, 215, 250 is tilted and twisted against the dental system of the chewing plane 111 with the main directions 105, 115, 150 in the individual case.
FIG. 6

Figure 7:
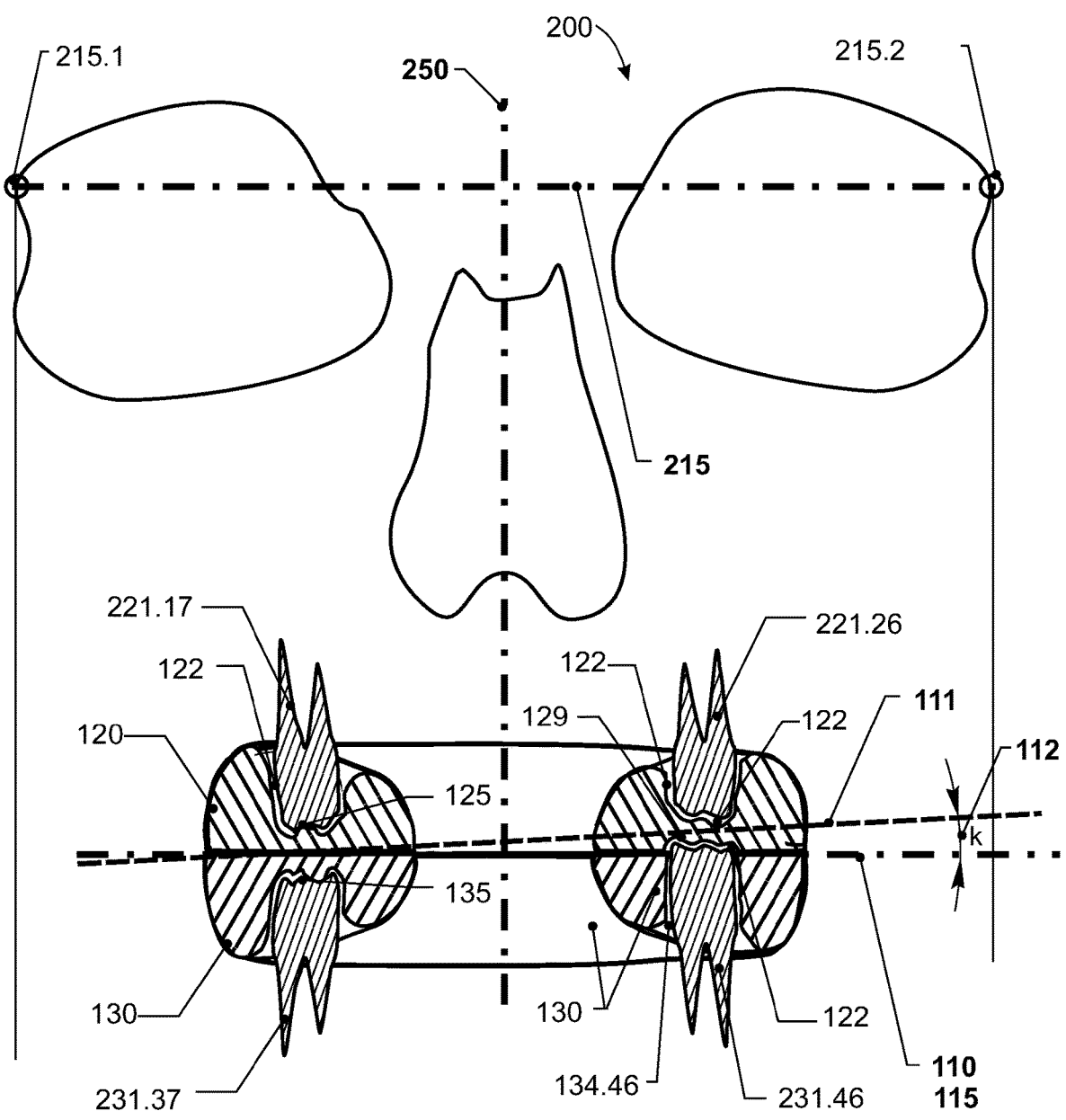

The exemplary embodiment shows a one-piece lower jaw module 130. In the example, it was milled from a one-piece preform 30, but the same result can be obtained by the skilled person using other manufacturing techniques, e.g. 3D printing or other additive manufacturing technologies particularly suitable for individualized products. The lower jaw module 130 shows in principle as the upper jaw module 120 a plurality of recesses 134 following the corresponding dental arch 231. The recesses 134 can also be shallower than shown here, e.g. if the gum extends close to the occlusal surfaces of the teeth. Importantly, in the preferred case, the recesses 134 are shaped wider than the teeth everywhere except at very few points, so that there is a marginal gap between tooth material and the material of the apparatus 100. In the transverse sectional view DE, it can be seen that large areas of the lower jaw portion 130 have deep recesses 134 to conform to gums. In the outer area, there is a biomechanically and neurophysiologically significant bead-like accumulation of material 131 that is not milled off. It is often even more pronounced in the lower jaw module than in the upper jaw module. This circumferential annular bead 131 in interaction with the corresponding annular bead 121 of the upper jaw module 120 serves in particular to symmetrically stretch and extend the soft tissue of the lips, the mimic facial musculature and the fasciae. The analogous annular bead 121 is found in the upper jaw module 120 (not shown here).
FIG. 7

Figure 8:
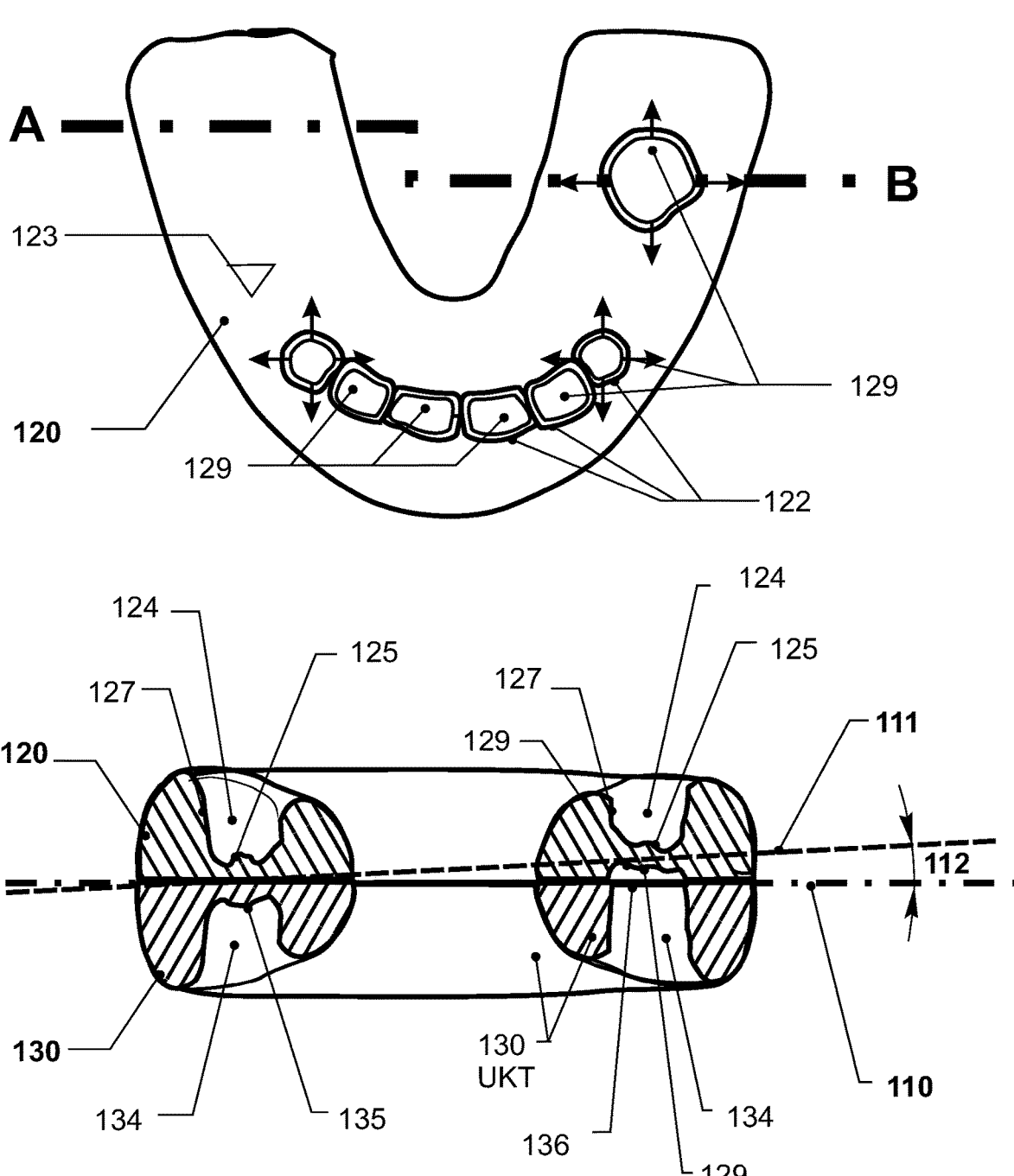

In a particularly preferred embodiment, the apparatus is used for preparatory training of the temporomandibular joint musculature if the initially existing dental chewing plane 111 is to be biomechanically corrected. In this case, the dental chewing plane is asymmetrically inclined to the transverse plane 110 and forms the tilt angle k 112 to it. In the front view, one can see the angular deviation between the drawn axes 115 right-left and the dental chewing plane which represents the planar best-fit chewing surface between the teeth. In practice, this means that the lower jaw is oblique relative to the skull. In the exemplary embodiment, because of the oblique position of the dental chewing plane 111, among other things, the recess 134.46 of tooth 231.46 completely penetrates the lower jaw module 130 because tooth 231.46 extends upward to the extent that its chewing surface extends into the upper jaw module 120. To make this possible, a shallow recess 129 is made from the separating-sliding plane 110, which has a clear marginal gap 122 to give the tooth 231.46 coming from below in the example lateral freedom of movement. Tooth 221.17 rests on contact point 125 and tooth 231.37 rests on contact point 135. Apart from these contact points, the marginal gap also prevails in these recesses.
FIG. 8

Figure 9:
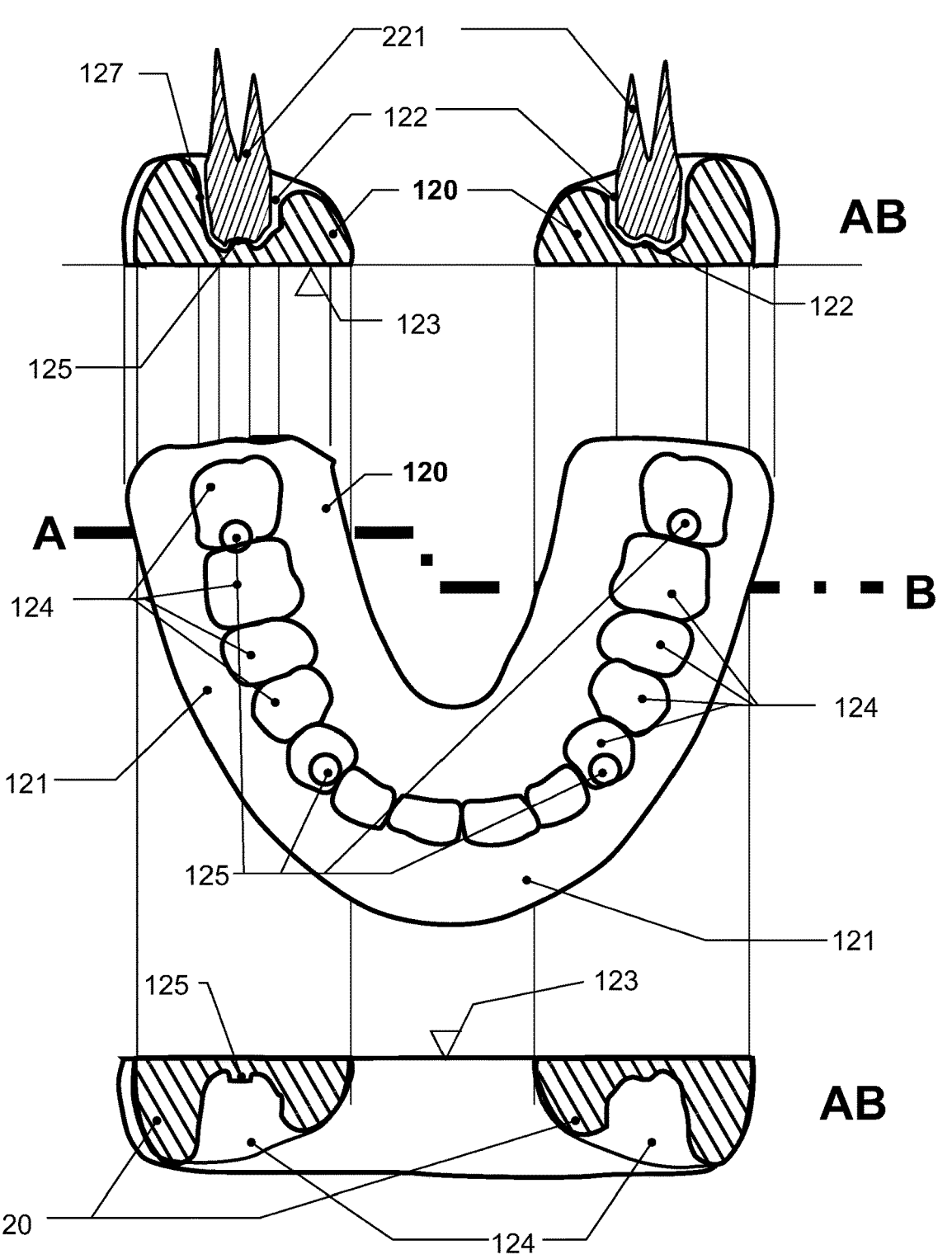

In the view from below on a first sliding surface 123 of the upper jaw part 120, for another exemplary embodiment, one sees a series of several breakthroughs of the teeth coming from below, which break through the lower jaw module 130 and get more or less shallow recesses 129 in the upper jaw module 120. These recesses 129 are widened by marginal gaps 122 which are at least 0.3 mm wide, towards the top the width of the marginal gap is practically limited only to the extent that the sliding properties of the separating-sliding plane 110 should not be affected by the recesses 129 and marginal gaps 122. A marginal gap of up to 3 mm is sufficient for the neurophysiological and biomechanical function of the apparatus, and particularly preferably the marginal gap 122 around the shallow recesses 129 is between 0.3 mm and 1.3 mm. The lower jaw module 130 has a complete opening 136 at the location of the shallow recess 129. The marginal gap in the recess 134 with opening 136 in the lower jaw module may be slightly narrower than the marginal gap 122 in the shallow recess 129. The same applies with interchanging of the upper jaw and lower jaw when teeth erupt from above into the lower jaw module 130.
FIG. 9

In another embodiment, there are no openings 136 or 126. The recesses 124 with marginal gap for the teeth of the dental arch and the contact points 125 can be seen, in this case 4 as an example, but there can also be more. At least 3, better 4 contact points 125 are required. The contact points 125 have an approximate circular shape when viewed from above or below and in the contact surface they have locally the contour of the corresponding tooth, without marginal gap. In this case, the sliding surface 123 is not interrupted by openings. The sectional view above shows the upper jaw module with teeth of the dental arch 221 from the front, the module is horseshoe-shaped open at the back. The sectional view below shows the same module 120 from behind, for clarity without the teeth. There you can see the contact point 125 clearly set off on the left. What is shown here for the upper jaw module 120 also applies analogously to the lower jaw module 130.
FIG. 10

In the particular exemplary embodiment shown in FIG. 10, the shape of the preform is almost preserved when the recesses for the teeth and gums are incorporated. The smooth, sliding first and second contact surfaces 123 and 133 are important. Taken together, the two one-piece modules 120 and 130 form the apparatus 100. The upper jaw module 120 and lower jaw module, lying directly against each other, form the separating-sliding plane 110. The separating-sliding plane 110 is particularly preferred to be so flat and so smooth that, when wetted with liquid, the familiar adhesive effect of two smooth plates can form. In this case, relative movements in the plane 110 are possible almost without friction, but the plates can be separated perpendicular to the separating-sliding plane 110 only with considerable force. This makes it easier to handle the modules, in particular, if they are moistened with water before insertion. Thus, in practice, if the two modules are sufficiently smooth, e.g., polished, moist, in the separating-sliding plane 110, they will not fall apart in the mouth, but they can be moved laterally. In the sectional view, the recesses 124 and 134 are only partially visible because the inner edge of the modules 120 and 130, which runs inside the respective dental arch, covers the chewing surfaces of the teeth. The tooth positions 1 to 7 correspond to the usual numbering in the dental field. FIG. 11

In another particularly preferred embodiment, the area of the incisors is clearly asymmetrical, corresponding to the individual condition of the dental arches. FIG. 11a shows the openings 126 through the upper jaw module 120 for the recesses of teeth 124.11, 124.21, 124.22, 123.23 and 124.25. Clearly visible is the functionally important wide margin 121 outside the dental arch with preferably more than 3 mm width, particularly preferably 3 to 10 mm width. The margin 131 in the lower jaw module 130 can be even wider than in the upper jaw module, particularly preferably 4 to 15 mm, especially in the front tooth region.

Figure 12:
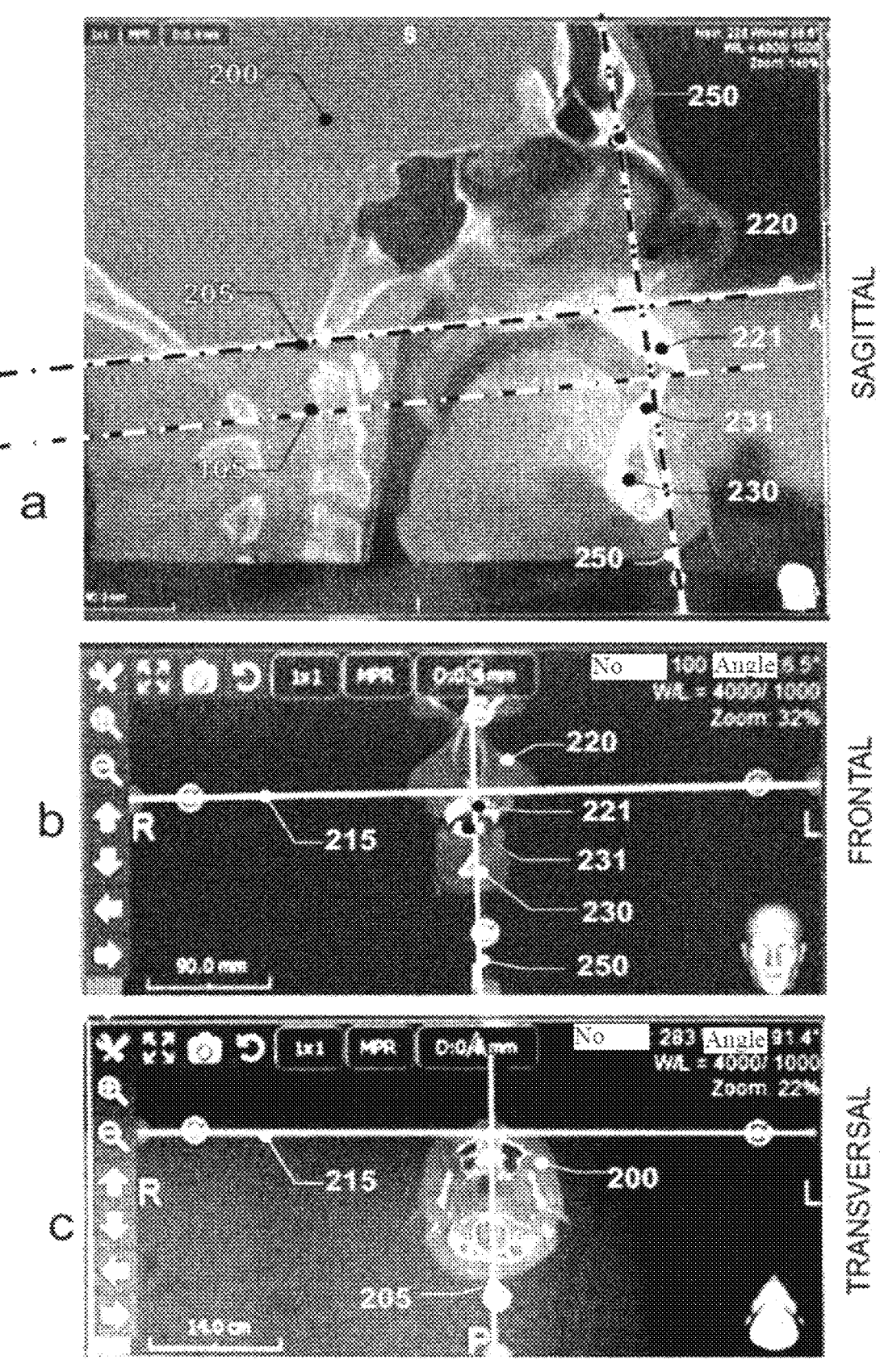

FIG. 11b shows a detail of a contact point 125 in the upper jaw module. The tooth of the dental arch 221 is surrounded by gum 227 at the top. The marginal gap 122 exists at the gum and at the tooth with the exception of contact point 125. At contact point 125, the material of the upper jaw module lies directly against the tooth, the shape corresponding to the 3D surface of the tooth at this point. The thickness of the marginal gap there is minimal, almost zero, depending on the load due to chewing pressure, etc. At the bottom of FIG. 11b is the plane first smooth sliding surface 123. The same applies to the lower jaw module 130 and its contact points 135, each mirrored approximately on the separating-sliding plane. FIG. 12

FIG. 12 shows DVT 3D X-ray images of a head 200 with upper jaw 220 and lower jaw 230 as well as the symmetry axes 250 bottom-top, 105 front-back and 115 right-left based on the bone features in the upper facial skull. Positioning the fixture in the 3D digital model of the skull is a prerequisite for producing the real 3D geometry of the fixture 100. The resulting geometry of modules 120 and 130 is as individual in detail as the dental arches of the subjects or patients. The position of the modules 120 and 130 relative to the skull 200, the upper jaw 220 and the lower jaw 230 determines how deep and at what location the recesses 124 and 134 for the teeth are created and how deep the recesses for the gums and soft tissues are elaborated, including marginal gaps. In the sagittal sectional view FIG. 12a, the nearly vertical axis 250 is seen running from top to bottom. The apparatus 100 is positioned so that its vertical axis 150 is parallel to axis 250 and preferably completely or almost exactly in axis 250. The frontal view from the front in the sectional view FIG. 12b shows the right-left axis of the skull 215, which is slightly oblique here. This is used as the reference axis and the apparatus 100 is digitally positioned in the 3D model so that the right-left axis 115 of the apparatus 100 is parallel to the axis 215. The transverse view FIG. 12c shows the position of the axis 215 as seen from above. The oblique inclination of axis 205 from front to back and leading obliquely downward results from the position of anatomical landmarks of the skull, as visible in the X-ray image. The orientation of the apparatus 100 is digitally adjusted in the 3D model so that the axis 105 of the apparatus 100 is parallel to the axis 205 and through the incision area, the overlap between the upper and lower incisors. If the digital 3D model is now used to digitally generate the recesses 124 and 134 for the teeth and for the gums together with the marginal gaps 122 and contact points 125, exactly these contours can be transferred to real workpieces. After production, the apparatus 100 corresponding to the 3D geometry of the model is then ready and can be used on the individual patient whose skull and teeth data was used. The apparatus 100 fits this patient as long as the tooth positions do not change significantly, i.e. as long as the mobility at the marginal gaps is sufficient.

The orientation or position of the modules 120 and 130, and thus the definition of the separating-sliding plane 110, can be advantageously and precisely determined by the following method.

The following figures show aspects of the invention in simplified and schematized form. As a preferred exemplary embodiment, the application of 3D structural marker is explained using the jaw and dental and orthodontic treatment planning as an example, and as a means of producing suitable apparatuses. However, the potential applications are not limited to this application but relate to biomechanics and neurophysiology of the body in general.

Figure 13:
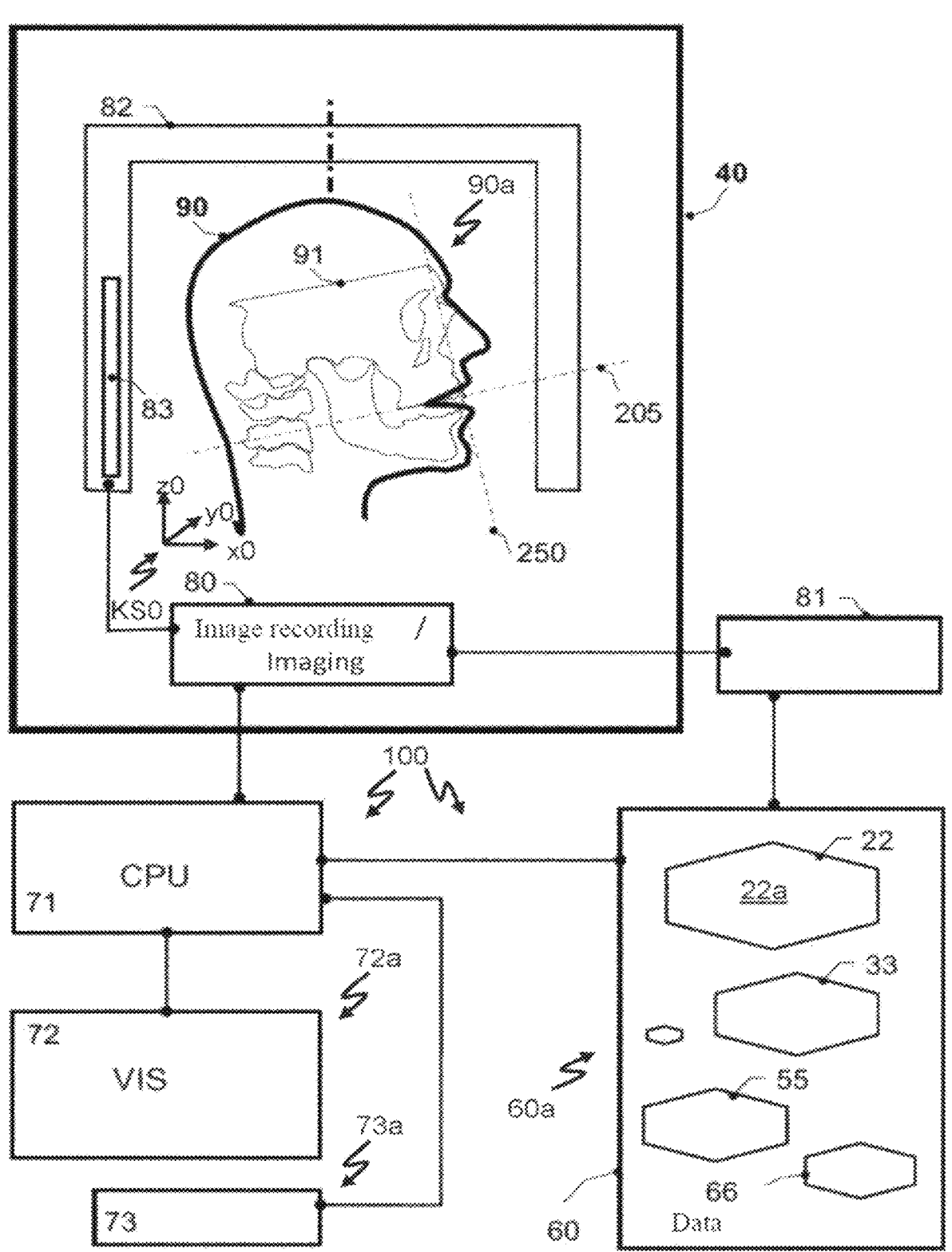
FIG. 13 shows the generation of digital or virtual 3D images of bone structures and 3D structural markers.

FIG. 13 shows a device for generating suitable X-ray images. The 3D X-ray images are transferred to a computer system, where reference objects can be copied into the image of the skull, superimposed and aligned therein. The generation of these reference objects results in virtual 3D images of bone structures and 3D structural markers. In a real 3D space 40, there is a real body with body part 90a, in the exemplary embodiment a head 90 of a patient. The bony structure 91 of the skull is located therein. An arm 82 moves a beam-sensitive array 83 that sequentially takes multiple images from different directions. A DVT (digital/dental volume tomography) imaging unit 80 receives the sensor information and passes it directly or indirectly to a computer system 81, which calculates a 3D image from the multiple beam-sensing images. Ultimately, a data set 22 is created in this way, which in particular shows the radiation-absorbing tissues and materials, in particular predominantly bone, teeth and/or implant materials. The data set 22 thus contains digital spatial data 22a. The data set 22 is stored in a data memory 60 or in a memory unit 60a, if necessary together with data sets of devices 33 and data sets of structural markers 55 as well as data sets of other aids 66, e.g. axes and planes, which can be positioned, aligned and faded in or out in the 3D image space. Via data transfer, a computing unit 71 can access the data sets 22, 33, and 55, etc., and generate visualized views 72 from the virtual 3D images, e.g., as perspective views or sectional views. Those skilled in the art understand how to suitably change the sectional planes and the views 72 and suitably fade in, relocate and combine data sets or data objects 22, 33, 55 and 66 etc. in the 3D space using the operating devices 73. Specified is the specific technology of the 3D structural marker, represented here by the data set 55, which is displayed in the visualized views 72 and can be moved, rotated and scaled using the control devices 73. The visualized views 72 are displayed, for example, on a suitable output unit 72a, such as a monitor or display. The operating devices 73 may also be referred to as input unit 73a and are, for example, a computer mouse, a keyboard, a trackball and/or a voice command input system (voice system).

Components of a data processing system 100 may include: computing unit 71, output unit 72a, input unit 73a, and storage unit 60a.

An optional Cartesian coordinate system KS0 can be defined in real 3D space. The coordinate system KS0 can have an x-axis x0, a y-axis y0 orthogonal to it and a z-axis z0 orthogonal to both axes x0 and y0. With reference to the coordinate system KS0, a first coordinate system KS1 can be defined in the image space, which can be structured like the coordinate system KS0 and whose coordinate axes point in the same direction as the corresponding coordinate axes x0, y0 and z0, see e.g. FIG. 20.

FIG. 14 shows a schematic of the procedure for the individual application of the 3D structural marker. First, the median sagittal plane can be defined in order to align the structural marker according to it. Since the 3D structural marker itself has transverse and frontal planes that define transverse axes 215 as intersecting lines, the 3D structural marker can essentially be used by itself to define the sagittal plane.

In the following, a preferred method is described to first determine the transverse direction based on landmarks in order to then perform the further adjustment steps. In doing so, the user can either apply an axis such as 215 to a landmark such as 281 in an image plane, or a plane that is perpendicular to the image plane, since in the sectional image this plane appears as a line.

Method 700: In a first step 710, imaging of a 3D image of the body part 90a, e.g., the head 90 of a patient, is performed. By processing the images, a digital or virtual 3D body is generated in step 720. In step 730, sectional images of this 3D body are displayed (see FIG. 19a). In step 740, landmarks of the bony structures are identified in suitably selected sectional images (see FIG. 19b, 281L and 281R). In step 750, at least one transverse direction connecting two symmetry-generating landmarks is defined (see FIG. 19b, 215). This can be done by an axis (215 in the embodiment example) or by a plane and a second plane crossed thereto. In step 760, the position of the sagittal planes 503 (Sm) whose normal orthogonal thereto is the transverse axis 215 is defined. In step 770, the centers 211 between appropriate landmarks 281 are determined to accurately define the median sagittal plane Sm of the upper facial skull (see FIGS. 19 and 27). This may not be entirely clear because the skull in the back region often has an orientation that is as much as 2 degrees different from the front upper facial skull (see FIG. 27). In step 790 or a variety of such steps, other sectional views are taken to check positions and directions or to perform other tasks and questions. The order of the steps may be changed as long as the result is to use the landmarks to define the sagittal plane orientation.

Method 800: In a first step 810, the 3D structural marker 500 is introduced into the 3D image space and superimposed so that it can be seen in the display. The layer packages now appear as parallel lines. In a step 820, the structural marker is aligned with its inner sagittal plane structure 503 perpendicular to the transverse axis 215 of the bony structures. In an independent step 830, the 3D structural marker 500 is placed on an anchor point 602 in the median sagittal plane, in the exemplary embodiment with the intersection of the lines or planes T3 and F5 in the median sagittal plane on the base point BP. In a step 840, the 3D structural marker 500 is oriented by rotation about an axis parallel to the transverse axis 215 such that, in the sagittal sectional image, the transverse planes 501 are in the direction of the link line 602-603, that is, in the direction of the BP-GP axis. In the exemplary embodiment, the rotation takes place around the fixed point 602, on which the intersection point T3 and L5 is located. The rotation brings the line T3 in a position that it passes through anchor points 602 and 603. Thus, the 3D structural marker 500 is aligned in the angle.

In a step 850, the size of the 3D structural marker 500 is adjusted so that a frontal line passes through a suitably selected anchor point 601. In the exemplary embodiment, the anchor point 601 is the nose point NP, see FIGS. 20, 21, 22. In the exemplary embodiment, the individually correct size is achieved when the frontal line F1 and thus the frontal plane 502.1 passes through the nose point NP. In a subsequent step 860, the symmetry and harmony of the proportions in the body part can now optionally be analyzed. This often reveals tilts of, for example, the jaws and the current chewing plane (see FIGS. 27 and 28). In a further step 870, the transverse plane 501.1 (T1) is used as an idealized occlusal plane, e.g. to align dentures or apparatuses according to it. In the case of separable apparatuses 300 with upper part 320 and lower part 330, the separating plane 301 between the parts is particularly preferably designed as a separating-sliding plane 301, without retentions (protrusions) and with very low friction. The position of the separating-sliding plane 301 is placed as precisely as possible on the position of the idealized occlusal plane 201 in digital or virtual 3D space during planning and shaping of the apparatus.

In a step 880 following the process step 870, the clearance for the teeth and or dental implants of the upper and lower dental arches is created so that the apparatus later fits precisely on the individual dental arches without jamming or damaging the gums. In this process, completion of the mold in step 880 with a planned form fit between the apparatuses and dental arches creates an exact definition of the position of the apparatus 300 with its parts 320 and 330 in the mouth (see FIG. 32). In a subsequent step 890, the apparatus 300 is manufactured in its parts 320 and 330 for exactly this individual case and can then be used for this patient.

FIG. 15. shows the application of a reference object 500 as a 3D marker consisting of 3 stacks of perpendicular parallel planes, where the distances between the parallel planes follow a harmonic distance relationship. This is a particularly preferred exemplary embodiment of a reference object that is used to detect the cranial symmetry and orientation in the 3D image space and, using the individually adapted reference apparatus, to precisely align the separating-sliding plane of the training apparatus individually, even if this may then be at an angle to the individual chewing plane, which is the case in the vast majority of cases requiring therapy.

FIG. 15 shows the combination of at least two plane packages to form the 3D structural marker 500. FIG. 15a shows the view of the 3D structural marker 500 in a sagittal sectional view. FIG. 15 shows the 3D reference object 500 in a sectional view and FIG. 15c in a semi-perspective view. While the upper transverse plane T3 is aligned based on the anatomical landmarks in the region of the orbits, the location of the lower transverse plane T1 defines the location of the separating-sliding plane. Because the sagittal planes are in the image plane, only the intersection lines with the transverse planes of plane packet 501 and the intersection lines with the frontal planes 502 appear. The preferred exemplary embodiment has 5 planes per plane package, i.e., T1 to T5 and F1 to F5. The drawn distances obey the Fibonacci sequence in the particularly preferred exemplary embodiment and t1=3, t2=5, t3=8, t4=13, each in scalable units. The analogous applies here to the distances f of the frontal planes F. In the claims:

T is a first plane, i.e. a transverse plane,

F is a second plane, i.e. a frontal plane, as well as

S is a third plane, i.e. a sagittal plane.

FIG. 15b. shows the structure 500 in the frontal view from the front. Again, the sequence of transverse cut lines 501.1 to 501.5 of the transverse plane package 501 (T1 to T5) can be seen. The vertically running intersection lines are the sagittal planes of the double plane package 503, composed of a sub plane package 503R and a part plane package 503L, where only 4 planes per part package are drawn here, i.e. 8 planes in total. Because of the Fibonacci sequence with the numbers 3+5=8 and 5+8=13, the planes coincide at least partially identically. Only the two planes 503R.2 and 503L.2 stand alone. Otherwise, e.g. plane 503R.4 is identical to plane 503L.1. In the particularly preferred exemplary embodiment, the sagittal plane package 503 is symmetrical to the median sagittal plane 503R.3=503L.3.

FIG. 15*c* shows an embodiment of a 3D structural marker 500 in perspective view. Three transverse planes 501.1 (T1), 501.2 (T2) and 501.3 (T3) form the plane package 501. Three further planes 502.1 (F1), 502.2 (F2), 503.3 (F3) perpendicular to it form the plane package 502. The plane distances are denoted with lower case letters as f1 between F1 and F2 and f2 between F2 and F3, correspondingly as t1 between T1 and T2 and t2 between T2 and T3. These distances are characteristic and their ratio does not change when the 3D structural marker 500 is scaled. In the sagittal sectional view, one sees the sectional lines T1 to T3 and perpendicular to them the sectional lines F1 to F3. The distances of the planes correspond to the distances of the section lines in the orthogonal section.

An optional Cartesian coordinate system KS2 can be defined with respect to the 3D structural marker 500. The coordinate system KS2 may have an x-axis x2, a y-axis y2 orthogonal thereto, and a z-axis z2 orthogonal to both axes x2 and y2. A plane spanned by the x-axis x2 and by the y-axis y2 may be parallel to the transverse planes 501.1 (T1), 501.2 (T2) and 501.3 (T3) of the plane package 501. A plane spanned by the y-axis y2 and by the z-axis z2 may be parallel to the frontal planes 502.1 (F1), 502.2 (F2), 503.3 (F3) of the plane package 502. A plane spanned by the x-axis x2 and by the z-axis z2 can be parallel to sagittal planes S or 500R.1 to 500R.5 of the sub plane package 503R and to sagittal planes S or 500L.1 to 500L.5 of the sub plane package 503L, respectively.

Figure 16:
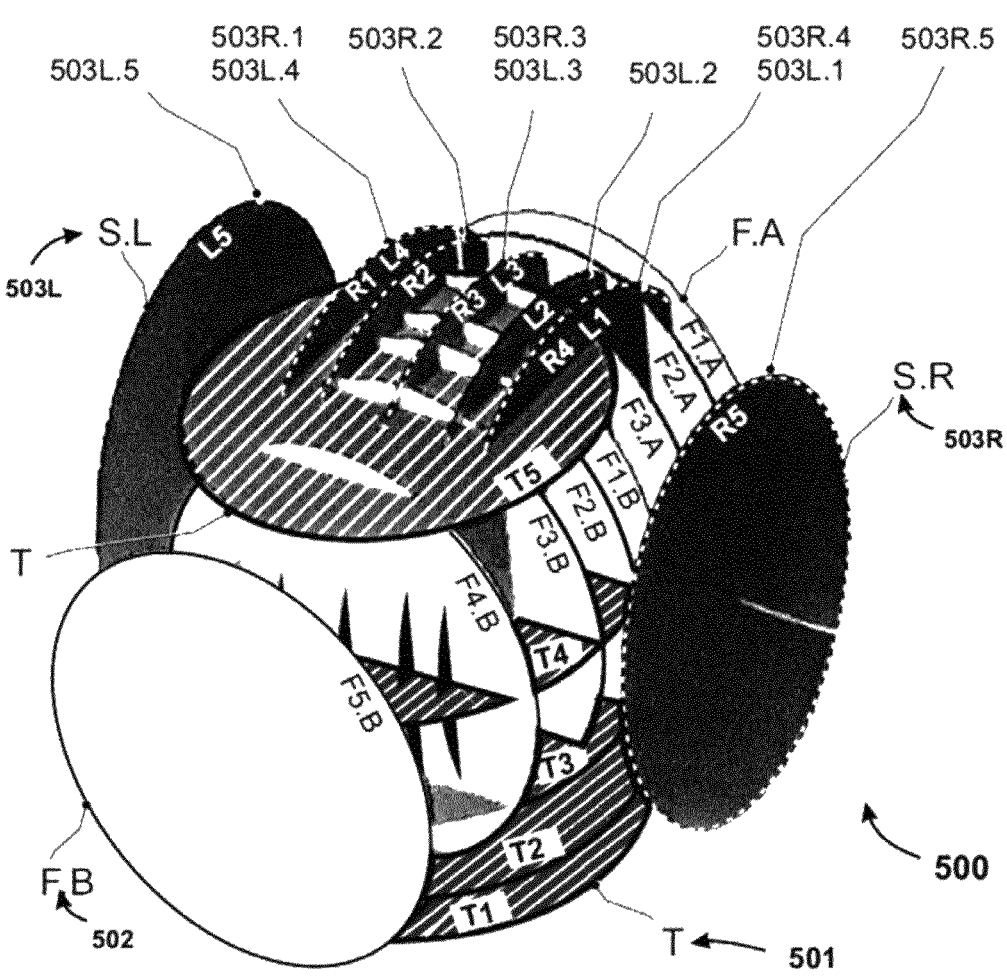
FIG. 16 shows representations of the 3D structural marker with additional sagittal plane package.

FIG. 16 shows representations of the 3D structural marker with additional sagittal plane stack 503. FIG. 16. shows the complex semi-perspective representation of the three crossed plane stacks 501, 502 and 503, which is adapted quite individually to define the position of the separating-sliding plane, without the harmony of the spacing ratios being changed by the stretching and rotation and displacement. The harmony of the spacing ratios of the planes also concerns, in particular, the position of the frontal planes F, each of which intersects the transverse planes T in a line running from right to left. These intersecting lines provide the orientation of the connecting line between the support points 125.1 right and left and the support points 125.2 right and left in FIG. 30. The perspective view of a particularly preferred exemplary embodiment of the 3D structural marker shows the orthogonal arrangement of the plane packets 501, 502 and 503, with the individual planes each shown as circular disks that appear elliptical in perspective. Each of the plane packages has a different pattern. Ascending horizontally from bottom to top, transverse planes 501 (T1 to T5) are drawn, with a black and white striped pattern. On the far right, in black, you can see the fifth plane R5 of the partial plane package 503R running to the right, and opposite it the last plane L5 of the partial plane package 503L running to the left. Again perpendicular to this are the frontal plane packages, here two packages A and B are superimposed. Here, too, the Fibonacci series 3, 5, 8, 13, 21, etc. applies to the distances within the sub packages. For application in the region of the bony skull, the diameter of the plane packages is at least 6 cm (centimeters) to 30 cm. A maximum for the diameter of the plane packs for application in the bony skull region may be in the range of 35 cm to 50 cm. For other applications to other parts of the body, such as the neck and back, the plane packages are larger. However, the circular borders have only graphical meaning for better visualization. Mathematically, the planes have no boundary. In FIG. 16, a left side L of the skull or cranium would be on the left side. A right side R of the skull or cranium would lie on the right side.

Figure 17:
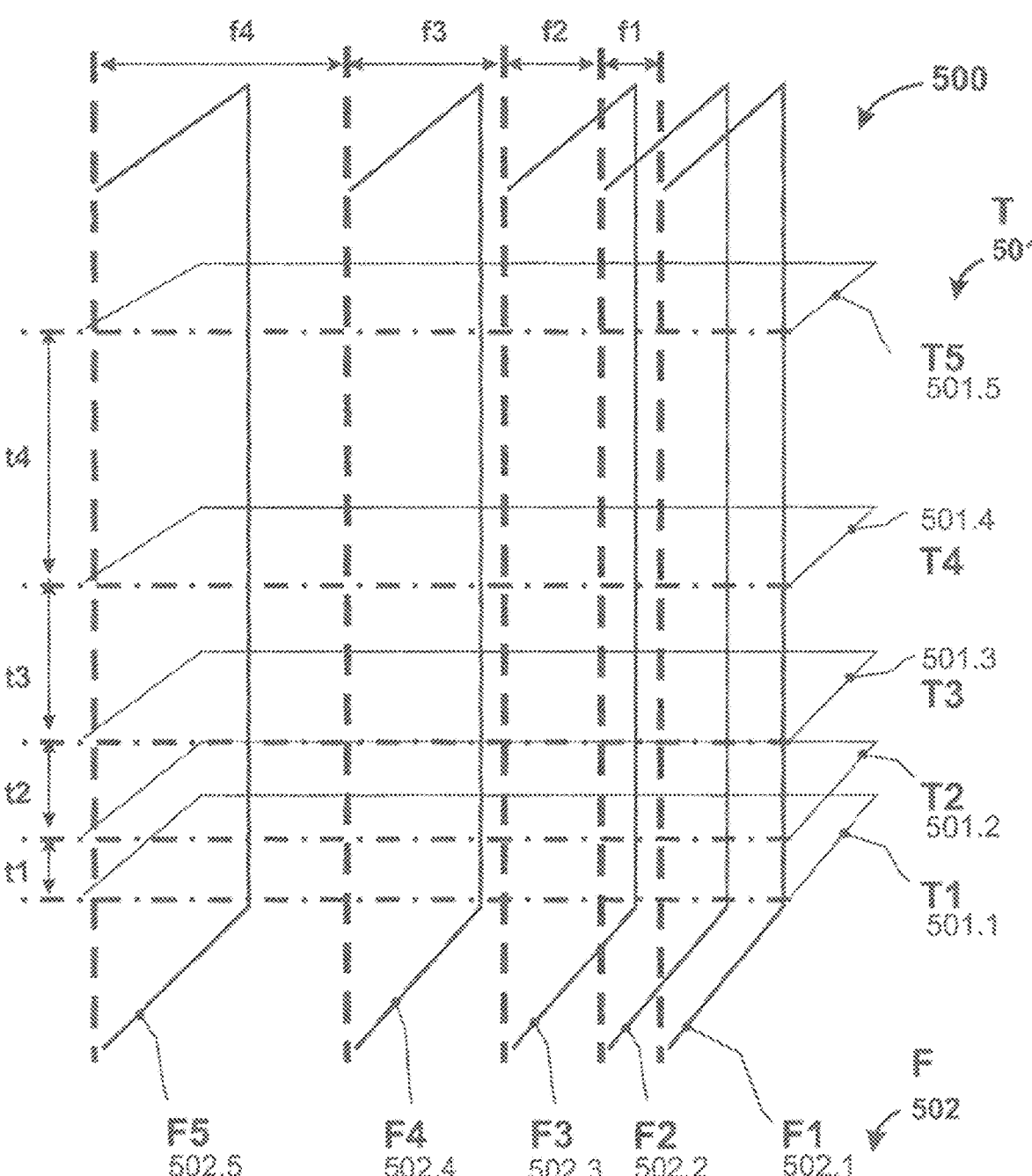
FIG. 17 shows a particularly preferred isotropic design of the five level stacks.

FIG. 17 shows a particularly preferred isotropic embodiment of the five plane packages 501 and 502 each. In a particularly preferred embodiment, the plane package 501 (T) comprises five transverse parallel planes 501.1 (T1) to 501.5 (T5). Orthogonally crossed to this, the plane package 502 (F) consists of five frontal parallel planes 502.1 (F1) to 502.5 (F5). Optionally, further plane packages are added and together form the 3D structural marker. The spacing of the planes behaves particularly preferentially in a harmonic relationship of equal proportionality, the spacing sequence shown here is t1=3, t2=5, t3=8, t4=13 and analogous for f1 to f4. Other spacing ratios or other spacing patterns can also be used. Characteristic are the orthogonally crossed plane packages. Dashed lines are the orthogonally crossed lines shown in the sagittal sectional view. Cut in the sagittal plane direction perpendicular to 501 and 502, the sagittal plane packages are not seen.

Figure 17A:
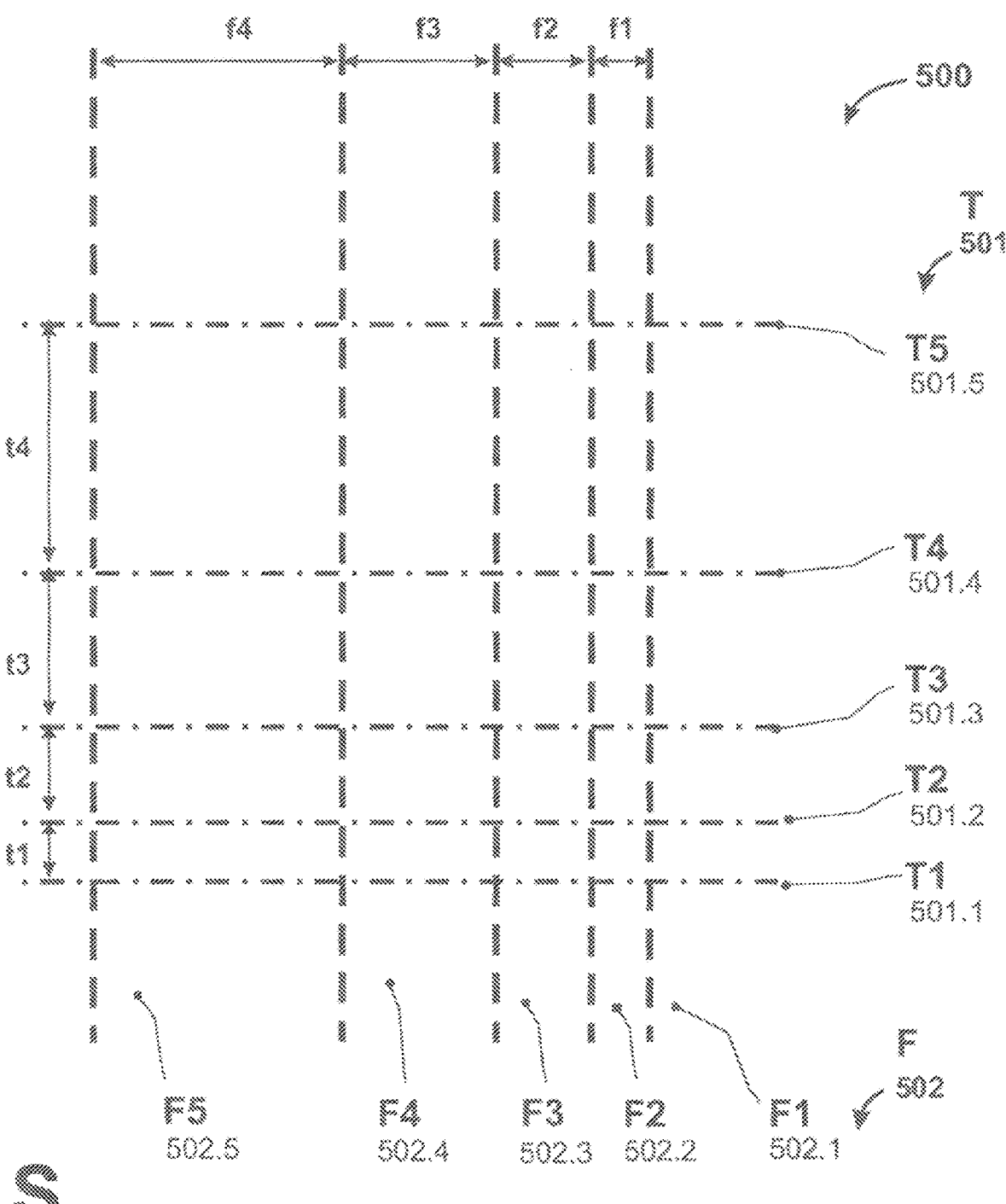
FIG. 17a shows a front view of FIG. 17.

FIG. 17*a* shows a front view of FIG. 17, in which the five transverse parallel planes 501.1 (T1) to 501.5 (T5) are shown. Orthogonally crossed to this is the plane package 502 (F) consisting of five frontal parallel planes 502.1 (F1) to 502.5 (F5). Furthermore, the distances of the planes t1, t2, t3 and 4 are shown.

Figure 18:
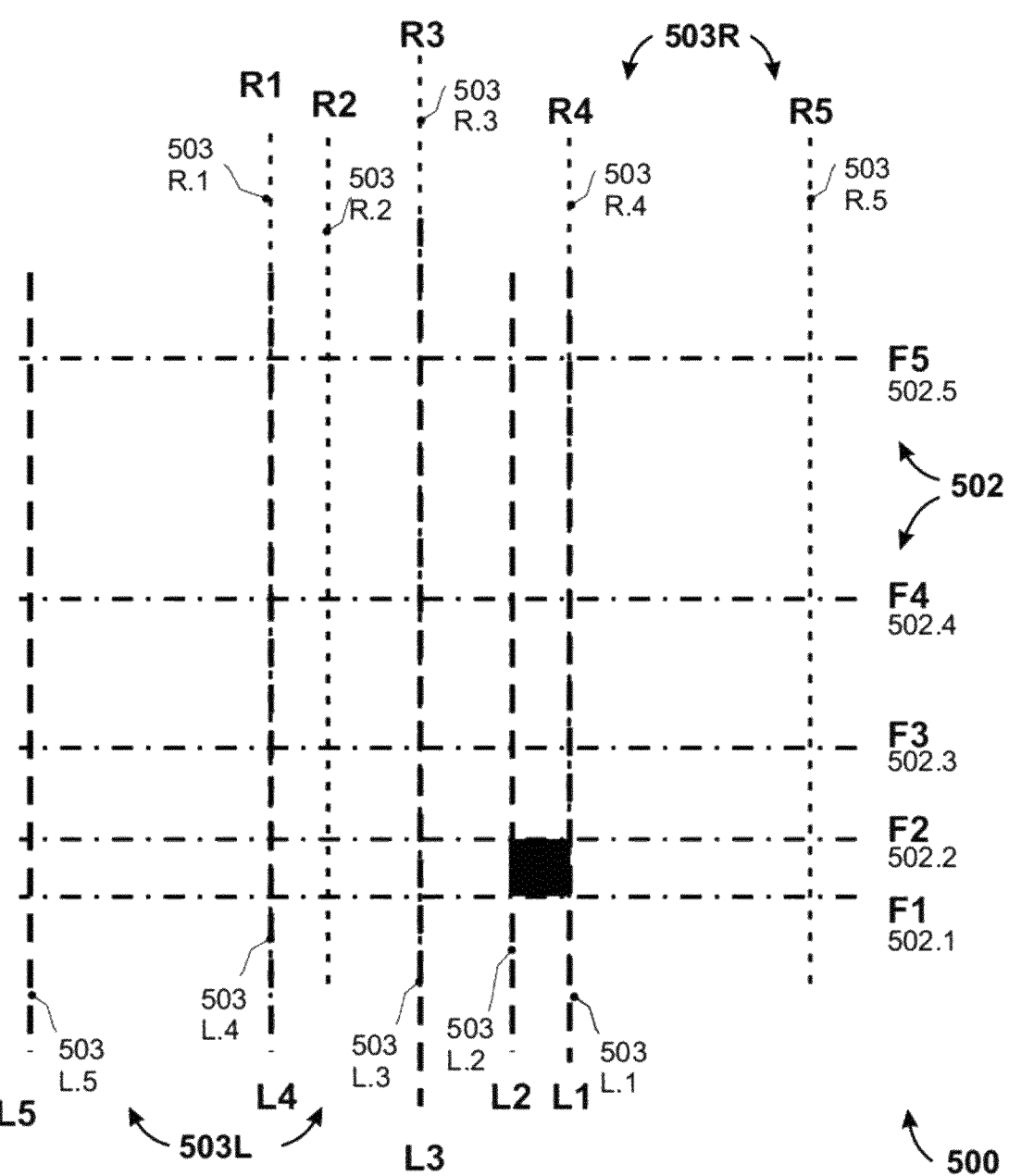
FIG. 18 shows the addition of a double plane package to the plane packages.

FIG. 18 shows the addition of a double plane package 503R and 503L or partial plane packages 503R and 503L to the plane packages. The arrangement of the sagittal planes in the transverse sectional view shows the frontal planes 502 (F1 to F5) running in the right-left direction and, perpendicular to them, the two sub plane packages 503R (R1 to R5) and 503L (L1 to L5) running in the anterior-posterior direction as intersecting lines of the plane-parallel sagittal planes. The sagittal planes L3 and R3 form the median sagittal plane in the preferred exemplary embodiment shown here. The spacing of the planes behaves particularly preferably in a harmonic relationship of equal proportionality, the spacing sequence shown here is l1=3, l2=5, l3=8, l4=13. Other spacing ratios or other spacing patterns may also be used.

Figure 19:
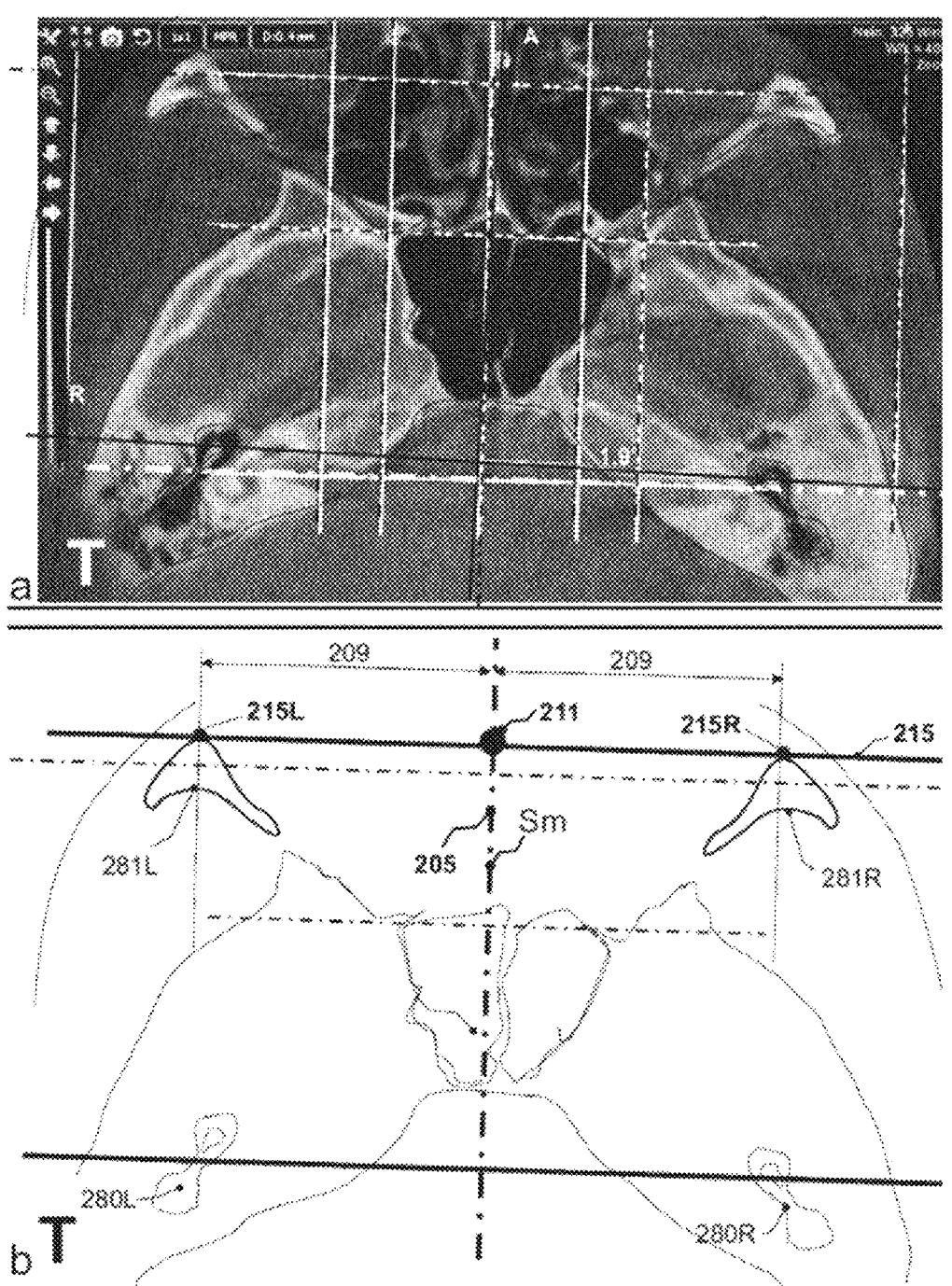
FIG. 19 shows the transverse sectional view through the bony structure of a skull and shows how the transverse axis 215 is aligned with landmarks and thus the sagittal plane Sm is defined.

FIG. 19 shows the transverse sectional view through the bony structure of a skull or cranium 200 and shows how the transverse axis 215 is aligned with landmarks and thus the sagittal plane Sm is defined. FIG. 19 shows an exemplary embodiment of how the position of the reference body 500 is individually aligned using anatomical landmarks 215L and 215R in the region of the outer orbits using 3D X-ray imaging, and then how the alignment of the separating-sliding plane 110 115 and the position of the occlusal support regions are determined using the adapted reference body 500. FIG. 19*b* shows by example that the cranial symmetry in the orbital region shows a transverse axis 215 that is not parallel to the inner ear axis. If one shifts the cranial transverse axis 215, used in the further, parallel to the inner ear, one sees that the inner ear is not intersected equally on the right and left. Thus, the transverse axis 215 is not equal to the inner ear axis according to Hornung. At the top of FIG. 19*a*, a radiographically generated transverse sectional view through the skull or cranium 200 of a person is shown. The contours are approximately drawn in superimposed. The contour determination can preferably be performed by 3D image software. Below this in FIG. 19*b*, the bony contours of the cranium 200 are shown and therein the appropriate landmarks 281L and 281R showing a transverse sectional view through the zygomatic bone arches. In the case shown, the points marked 215L and 215R are tangential points suitable, for example, for aligning the axis 215 in the transverse image plane. A similar alignment can or should also be done in the frontal plane so that the position of the axis is defined. In the frontal plane or in a frontal section, the zygomatic bones may also serve as landmarks or features for aligning the axis 215. Alternatively, other landmarks may be used, for example, the lower edges of the orbits. With the direction of the axis 215 running transversely between right and left, the direction of the sagittal planes is indeed defined. However, the definition of the coordinate position of the median sagittal plane Sm requires the additional specification of the center point 211, which can be determined, for example, metrologically as the center of the distance between 215L and 215 R or as the center point of comparable landmarks on the right and left, as can also be found, for example, further back in the region of the middle ear 280 L and 280R.

Figure 20:
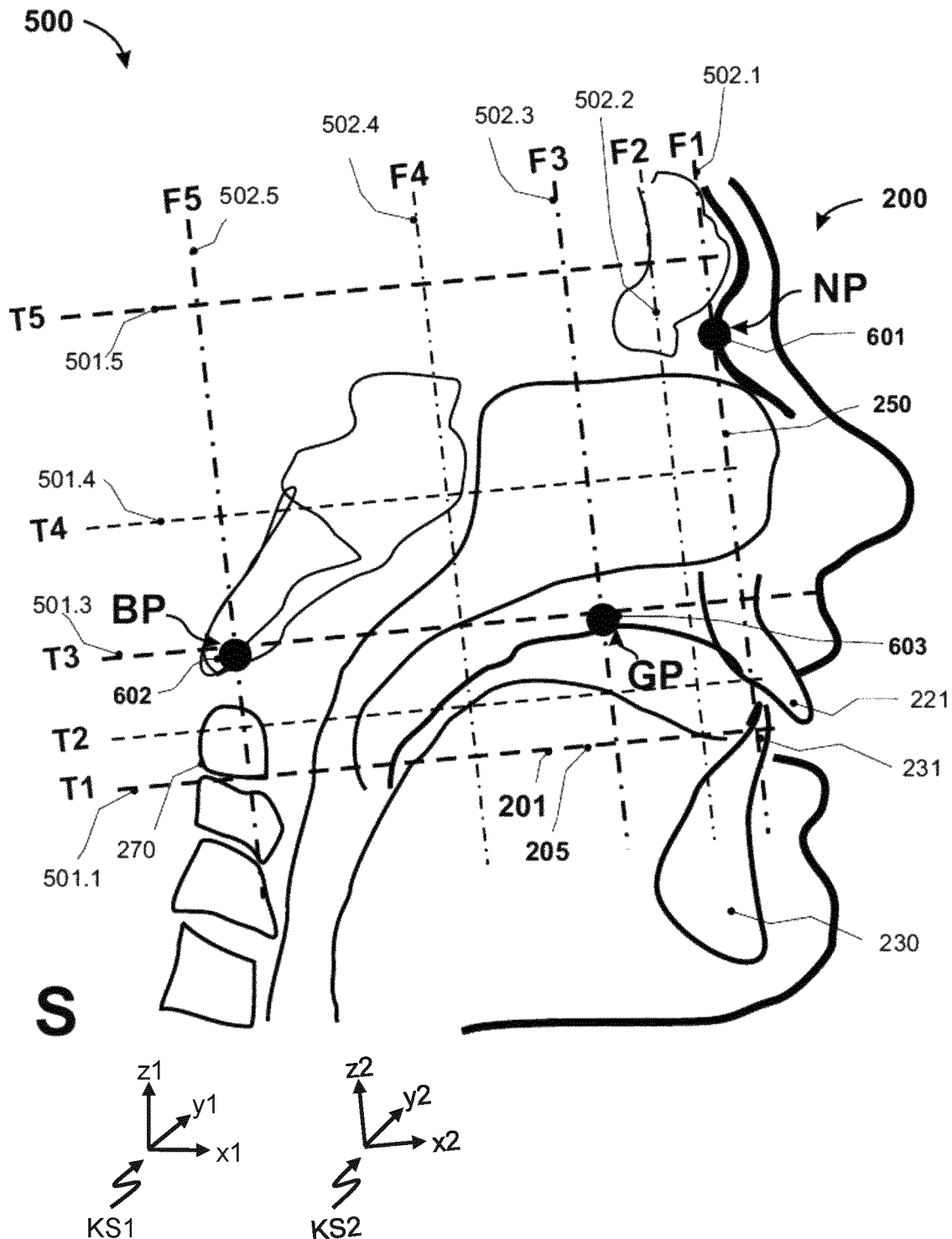
FIG. 20 shows the median sagittal sectional view through the radiographically displayed head with anchor points as well as with fitted 3D structural marker.

FIG. 20 shows an exemplary embodiment for the orientation of the reference body 500 seen from the side in sagittal sectional view. Again, the definition of the tilt angle of the separating-sliding plane now visible from the side, which usually deviates from the inclination of the chewing plane, is done by the reference body 500 by individually adjusting it to the base point BP and to the palatal roof point GP and to the nasion point NP, as shown in FIG. 20. This defines the relative orientation and position of the transverse plane, which is perpendicular to the sagittal plane or image plane through line T1. Shown is the median sagittal sectional image through the head radiographed in a digital or virtual space 50 with anchor points 601 (NP), 602 (BP) and 603 (GP) and with 3D structural markers fitted. The sagittal sectional image also passes through the 3D structural marker 500 after individual fitting into the bony structures of the cranium 200 of an individual head 90, see FIG. 1. The anchor points 601 (nasal point NP) and 602 (base point BP) and 603 (palatal point GP) are used to correctly position the 3D structural marker 500 at the bony landmarks. In the claims applies:

Anchor point 601 (nose point NP) is a third anchor feature,

Anchor point 602 (base point BP) is a first anchor feature, as well as.

Anchor points 603 (palate point GP) is a second anchor feature.

In order to set the sagittal plane correctly, an alignment of the transverse axis has already taken place beforehand, which is basically perpendicular to the sagittal plane. The sagittal plane is the image plane. It is spanned by the perpendicular axes 205 and 250 of the cranium 200. The nose point 601 (NP) designates the vertex above the root of the nose. It is defined three-dimensionally by simultaneously considering the apex of the curvature of this area in the transverse sectional view. Palatal point 603 (GP) is defined by the highest point of the bony dome of the palate seen from the side in sagittal sectional view and from the front in frontal section. More precisely, palatal point 633 (GP) is located in the slightly less dense cancellous bone (spongy inner tissue of the bones) between the compact margins of the palatal vault and the base of the skull. The base point 602 (BP) is defined as the apex of the bone surrounding the foramen magnum. It can be seen clearly in sagittal sectional view and also in transverse sectional view. Below the base point 602 (BP), one can see the contours of the uppermost spurs of the cervical spine 270. The grid lines are created by intersecting the plane packages T1 to T5 and F1 to F5 with the median sagittal image plane. The 3D structural marker is positioned and scaled so that the following anchor points are fixed: Intersection of line (plane) T3 with line (plane) F5 lies on base point BP line T3 runs through base point BP forward through palatal point GP line F1 runs vertically upwards through the nose point NP.

the position of GP is by chance on the line F3, but it doesn't have to be.

The present situation in FIG. 19 shows that the lower jaw 230 tends to be too small, consequently the teeth of the lower jaw 231 are rather too far up and the current occlusal plane is slightly too far up. The physiologically optimal occlusal plane is directly on T1, which coincides with the principal axis 205. Training apparatus 300 for this patient get the separating-sliding plane in the position of plane T1 to achieve physiologically best possible results.

FIG. 20 shows an optional first coordinate system KS1 of the digital image space 50 and the optional coordinate system KS2 that may be associated with the structural marker 500. The coordinate system KS1 may have an x-axis x1, a y-axis y1 orthogonal thereto, and a z-axis z1 orthogonal to both axes x1 and y1. FIG. 19 shows the result of an orientation of the structural marker 500, which can also be referred to as a second reference system, at the anchor points 601 to 603. The individual steps of this orientation are explained in more detail below with reference to FIGS. 20 (alignment/positioning), 21 (rotation/orientation) and 22 (optional scaling). After the orientation of the structural marker 500, the optional coordinate system KS2 would have the position shown in FIG. 8 with respect to the optional coordinate system KS1. Both coordinate systems KS1 and KS2 would be fixed in their relative position to each other when, at the end of the orientation of the structural marker 500, the structural marker 500 is fixed with respect to the digital image data or spatial data 22*a*.

Figure 21:
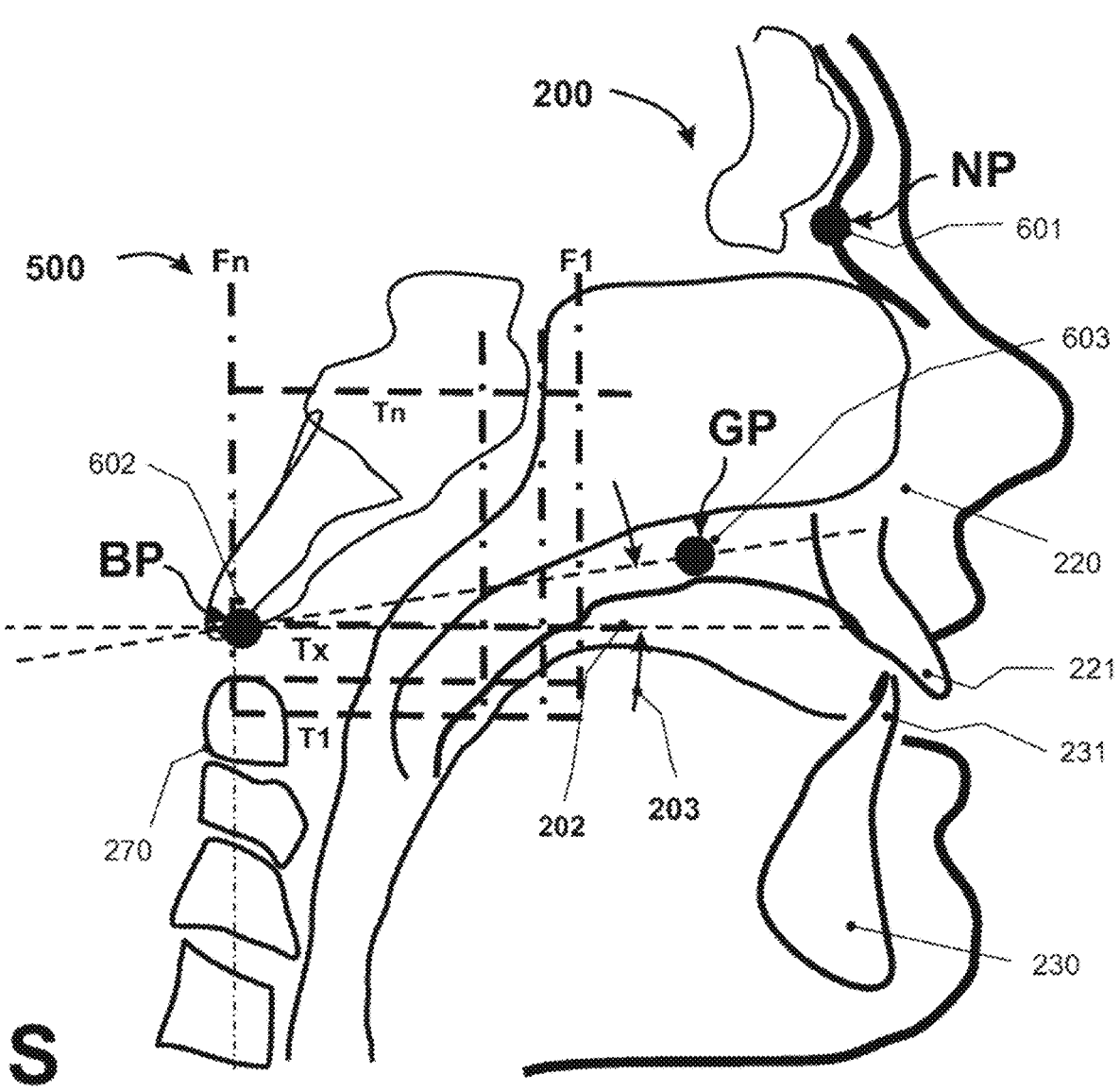
FIG. 21 shows the structural marker in sagittal sectional view before rotation and scaling, etc.

FIG. 21 shows the structural marker 500 in sagittal sectional view before rotation and scaling, etc. The structural marker 500 is here in a simplified form because only a few planes are required to describe the process of positioning, orientation and scaling. The transverse plane package 501 includes at least planes T1, Tx and Tn, and F1 and Fn. In the preferred embodiment of FIG. 21, n=5 and x=3. Preferably, positioning or orientation is performed by translational motion such that the intersection point between Tx and Fn is placed on the rear anchor point 602 (BP). The front anchor point 603 is referred to as the palate point GP in the exemplary embodiment. The upper anchor point 601 is referred to as the nose point NP in the exemplary embodiment. The 3D structural marker 500 is preferably displaced in the median sagittal sectional image in such a way that here, for example, the intersection of the lines Tx and Fn lies as a pivot point in the anchor point, i.e. here in the base point BP. If one takes the particularly preferred embodiment of the structural marker with five planes each from FIG. 18 and FIG. 21, the pivot and anchor point is the intersection of line T3 with line L5. An angle 203 shows the inclination of a line through anchor points 602 and 603 with respect to the horizontal plane in coordinate system KS1. Specifically, the inclination of the separating-sliding plane 110 in the above exemplary embodiment results from the location of the cranial points BP basion point and GP palatal roof point once one adjusts the 3D reference object 500, which can be individually adjusted by stretching and rotation, to the cranial anatomy of the individual head in 3D digital space. For example, if the palatal roof is higher, the separating-sliding plane 110 slopes more steeply upward. In an alternative embodiment, other planes are created, with the cranial orientation remaining in the transverse axis and sagittal plane, resulting in different positions and angles of rotation of the reference object 500, and consequently a different inclination of the separating-sliding plane 110.

Figure 22:
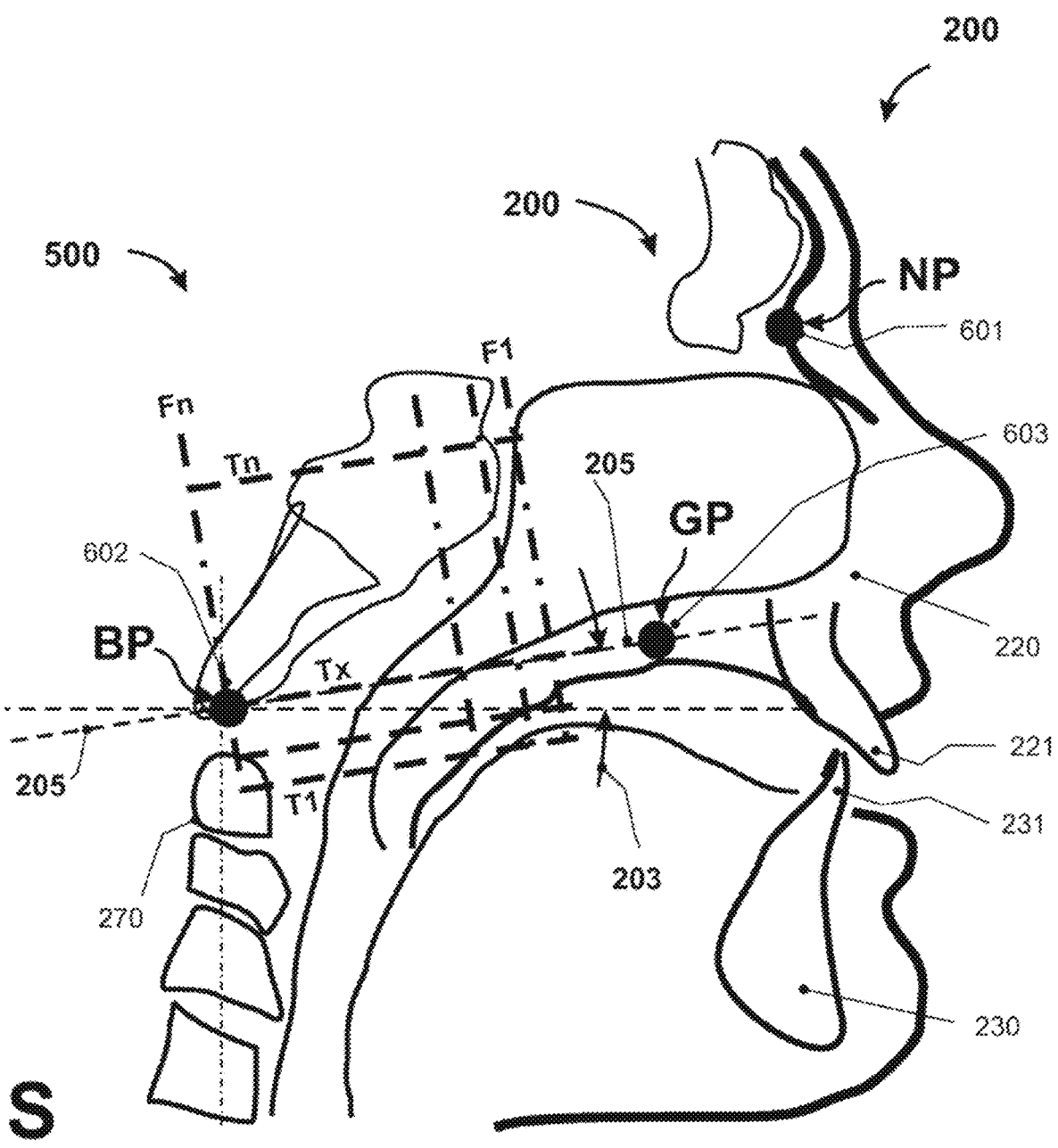
FIG. 22 shows the structural marker in orientation along the BP-GP axis.

FIG. 22 shows the structural marker 500 in orientation along the axis through the anchor point 602 (BP) and the anchor point 603 (GP). Preferably, the structural marker 500 is rotated about the anchor point 602 after this positioning or orientation, which changes the spatial direction 205 of the transverse lines T1 to Tn in the digital or virtual 3D space. More precisely, the structural marker is rotated by an angle of rotation W1 or 203 and about an axis of rotation D resulting from the intersection of the transverse plane Tx with the frontal plane Fn, i.e., for example, the transverse plane T3 and the frontal plane F5. The rotation comes to an end as soon as the T-line runs from the pivot point 602 through the front anchor point 603, here through the palatal point GP. Alternatively, you can also rotate until the transverse lines are parallel to the connecting line between the rear anchor point 602 and the front anchor point 603. This leads to the same intermediate result. Now the orientation of the structural marker 500 is correct, but the scaling does not yet fit because the vertical intersection line, here of the plane or line F1, does not yet run through the upper anchor point 601.

Figure 23:
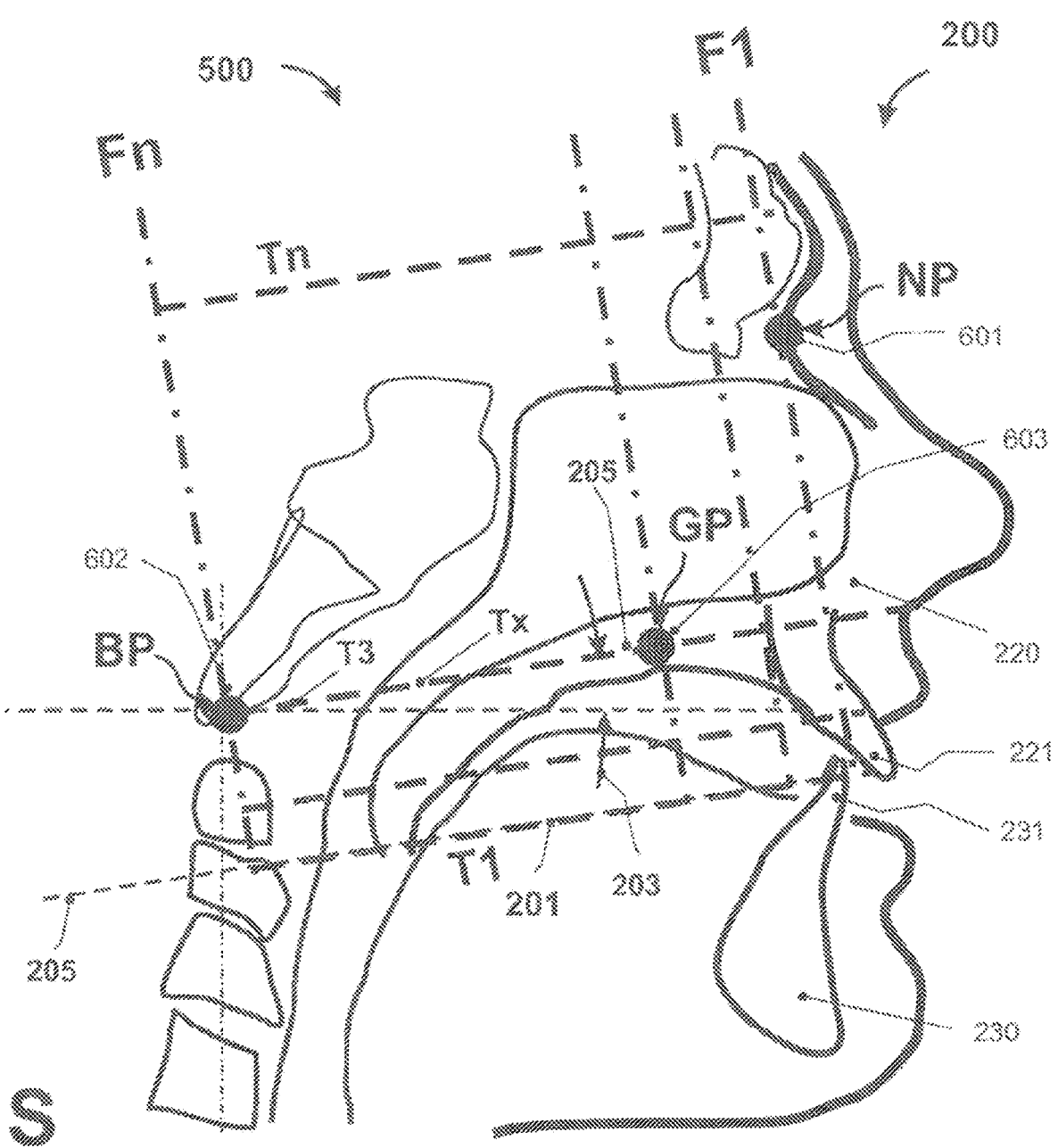
FIG. 23 shows the structural marker with the step of scaling to reach the anchor point NP with line F1 and how this defines the ideal incisal point IP.

FIG. 23 shows the structural marker 500 when scaled appropriately to use line F1 to reach the anatomical anchor point or landmark in the individual sectional view. In particular, the scaling can take place after the directional orientation, alternatively, multiple scaling steps can be used and combined with translations and/or rotations. In order to scale the size of the structural marker 500, in the particularly preferred exemplary embodiment, one increases or decreases the size of the structural marker 500 with the rear anchor point 602 as a fixed point, while keeping the position and orientation of the line T1 constant, until the line F1 leading perpendicularly upwards thereto passes through the upper anchor point 601, in the exemplary embodiment this is the nose point NP.

The scaling preferably affects the three spatial directions equally, thus scaling isotropically, enlarging the structural marker not only in the sagittal plane but also in its transverse extent. A tilt angle 203 lies between the cranial anterior-posterior axis 205 and the image horizontal. In particular, the tilt angle 203 is used to adjust the position of the anterior-posterior axis 205. An axis 205a is parallel to the anterior-posterior axis 205.

These operations lead to a unique and individual result. The coordinate position, spatial orientation and scaling of the 3D structural marker 500 are thereby determined. The sequence of the steps described above can be varied and supplemented. The same steps can also be carried out with the particularly preferred embodiment from FIG. 16 or differently designed 3D structural markers 500, as long as they have the intersection points T3 with F5 and the lines T1 and F1 in the sagittal section. The line T1 or the transverse plane T1 can be used as reference plane, see for example reference plane T1*a* in FIG. 32.

The special significance of this positioning and spatial orientation of the structural marker 500 (in physically six degrees of freedom of movement) relative to the individual skull of a patient is that the ideal positions of important biomechanical, anatomical and dental points can now be defined on the basis of the structural marker 500 and its intersection points of the lines that appear in the sectional image. One of these important points is the so-called incisal point 604 (IP), i.e. the point of contact between the two lower central incisors (mesial proximal contact). The incisal point 604 (IP) is the front anchor point through which the idealized chewing plane passes. The intersection line of the idealized chewing plane with the sagittal plane is marked as line 205.

Figure 24:
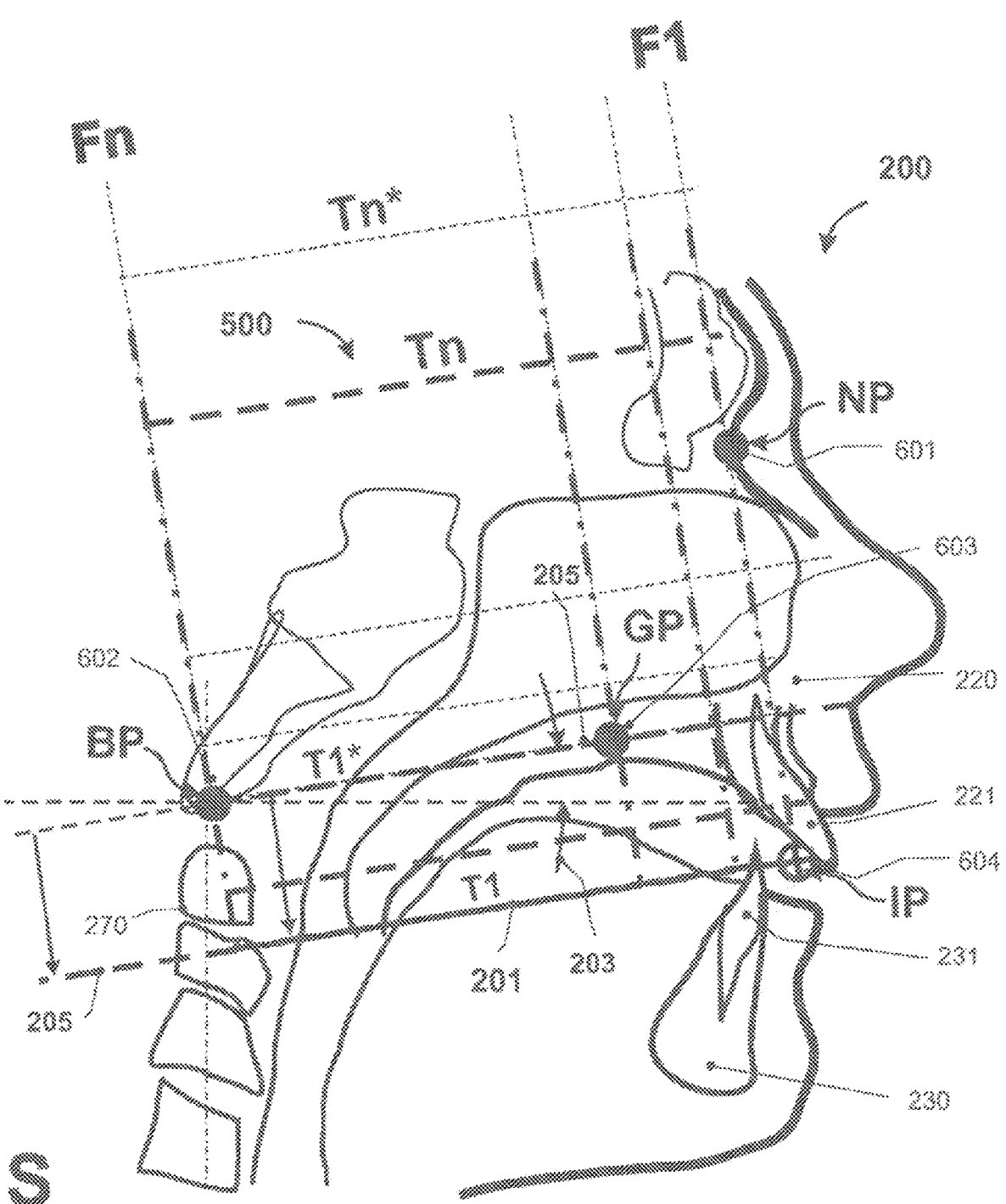
FIG. 24 shows an alternative way of achieving the same result as in FIG. 8, but on a patient with a receding chin.

Of course, the position of the teeth is not always as ideal as shown in FIG. 23; a person can, for example, also have a receding chin as shown in FIG. 24 and thus have teeth 231 in the lower jaw 230 that are too far back and/or teeth 221 in the upper jaw 220 that are in an unfavorable position. It should be noted that, as a result of the cranial reference points 601, 602, 603, which are not located in the region of the jaw, the points of orientation determined by means of structural marker 500 are independent of a malposition of the teeth or a malposition of the entire jaw region. The extensive independence of the determination of the ideal positions from the tooth position has the particular advantage that even in the case of severely incomplete dentition, in the case of injured or deformed jaws or even in the case of completely edentulous jaws, the ideal position of, for example, the incisal point 604 (IP) can be precisely defined for the first time by means of structural marker, so that a digital reconstruction and planning of a biomechanically, anatomically and neurophysiologically ideal jaw and dentition becomes possible for the first time. Of course, the planner or practitioner who plans a denture or orthodontics digitally with the aid of structural marker 500 can be guided by the overall cosmetic image. The decisive advantage that can be achieved for the first time with the aid of structural marker 500 is that the ideal position can now be determined digitally in advance and that the digital generation of apparatuses such as crowns, implants or braces and retainers (tooth stabilizer) can at least aim for the ideal condition. The importance of the most ideal state possible results primarily from the fact that then the loads in the temporomandibular joint are optimally distributed and because then the neuro-muscular coupling leads to an actively stable balance, which is physiologically very advantageous.

FIG. 24 shows an alternative way to achieve the same result as in FIG. 20, but in a receding chin case where the teeth 231 of the lower jaw 230 are much further back than ideal. For the positioning (translation) and orientation (rotation) and scaling (sizing) of the structural marker 500, there are several alternative ways that achieve the same result.

For example, one can also first place the intersection of line (plane) T1 and line (plane) Fn on the rear anchor point 602 and then rotate until line T1 passes through anchor point 603. After that, however, it is necessary to move the 3D structural marker 500 downward in the direction of the F lines until the transverse line or transverse plane T3 passes through the rear anchor point 602 and the front anchor point 603, see the downward pointing arrows in FIG. 24. Then the scaling can follow, for example, as described for FIG. 23. This alternative procedure is less direct and somewhat more cumbersome, but equally effective.

The positioning, orientation and scaling of the structural marker can lead to the same result in each case if the following condition is applied: The line of the frontal plane Fn in the median sagittal sectional view shall pass through base point 602 (BP), in the particularly preferred exemplary embodiment with a structural marker similar to FIGS. 16 and 17 and 20, Fn=F5. The line of transverse plane T3 in sagittal sectional view shall pass through base point 602 (BP) and through palatal point GP (603). And furthermore, the line of frontal plane F1 shall pass through nose point 601 (NP), which entails a defined individual size scaling.

The ideal incisal point 605 (IP) can therefore also be clearly defined here. However, it is not located exactly between the upper and lower incisors in the sectional view but further forward. The reason is that the lower jaw is too small, which is reflected in the receding chin. The structural marker is the same in the target position in FIG. 20 and FIG. 23 and FIG. 24 because the cranial region is the same. Thus, the incisal point is the same in relation to the upper cranial bone structures BP, GP and NP. The definition of the incisal point 604 (IP) is successful even if the lower jaw is no longer defined in shape, e.g. after a comminuted fracture, or if it had to be removed as a result of carcinoma involvement. If, at the same time, the upper jaw is damaged or deformed in its tooth curve, the application of the structural marker 500 according to the invention can, for the first time, offer the possibility of digitally producing anatomically, medically, physiologically and biomechanically correct reconstructions, in order to then realize them using apertures and implants.

Figure 25:
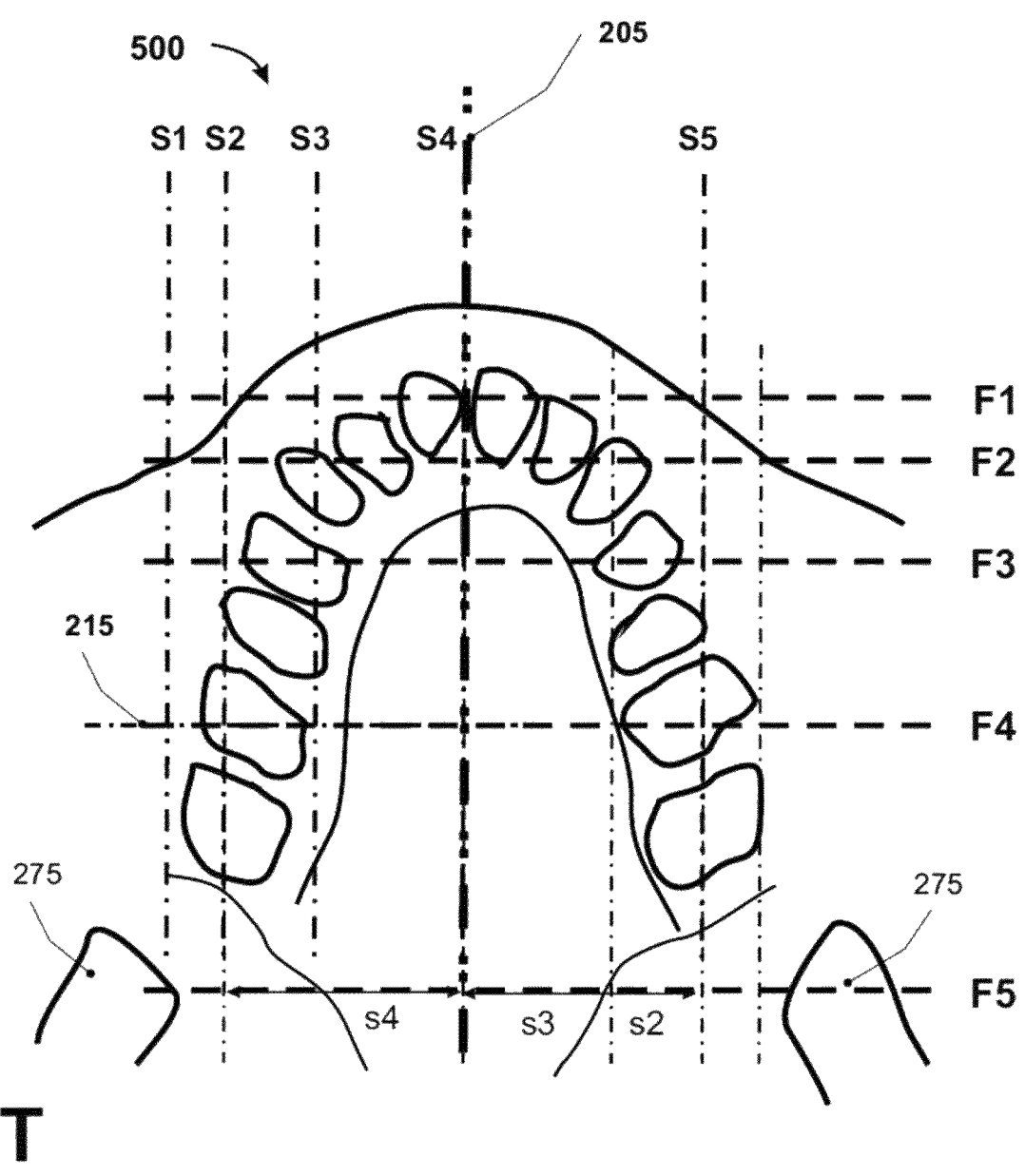
FIG. 25 shows a transverse sectional view through the dental arch of a symmetrical upper jaw with structural marker.
Figure 30:
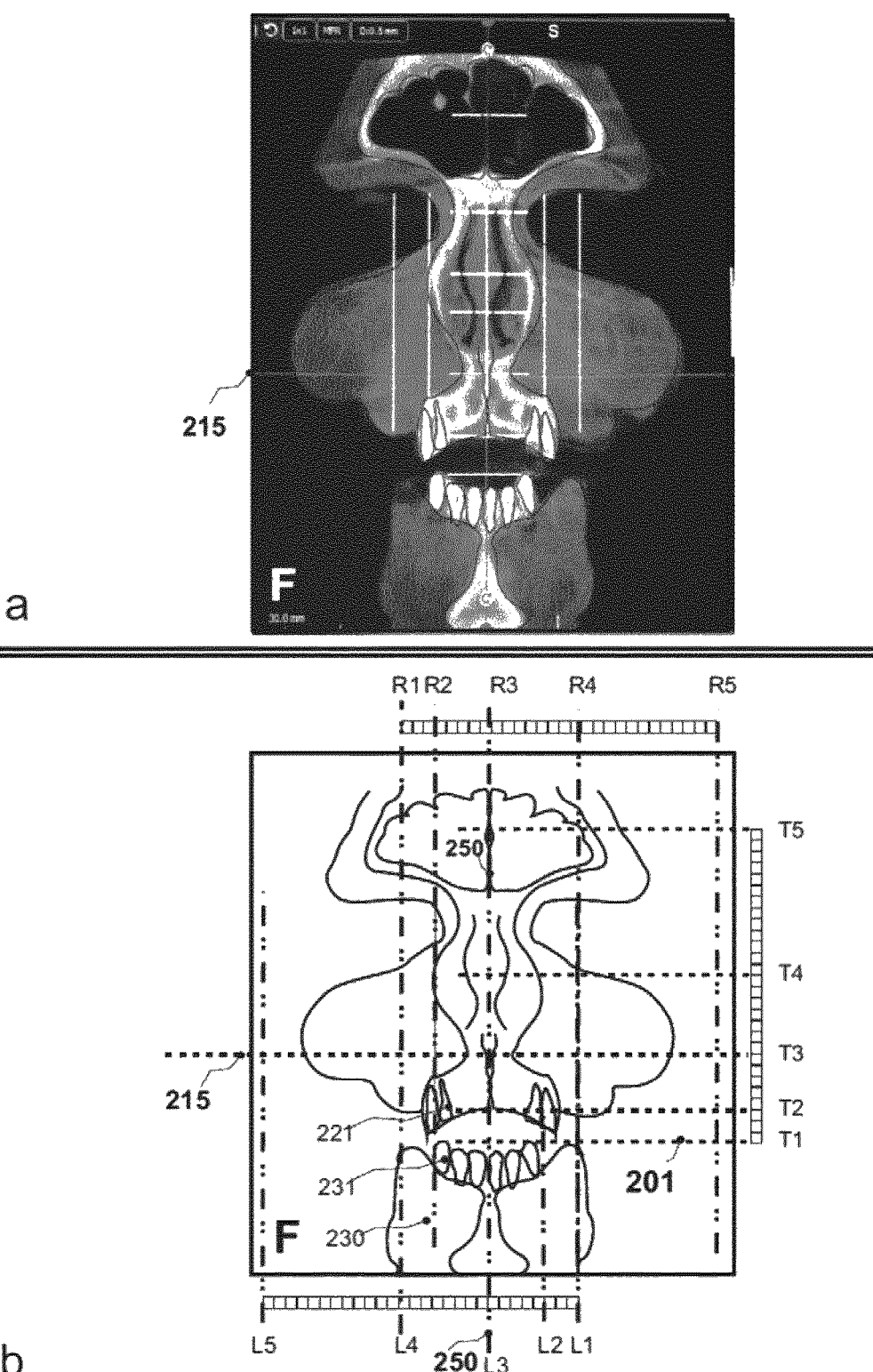
FIG. 30 shows a frontal sectional view through the lower incisors.

FIG. 25 shows a transverse sectional T through the dental arch of the upper jaw OK or through the region of the dental arch with the sagittal plane, with structural marker 500. FIG. 25 shows a rare almost symmetrical condition. Most patients requiring treatment, however, show significant deviations from this symmetry, so that the cranial sagittal plane S4 or 205 usually does not pass through the center between the incisors but the incisors are offset from the sagittal center, as shown in FIG. 30. This results in a transverse sectional view through the area of the dental arch in the upper jaw OK near the occlusal plane. In the present case, the dental arch is completely occupied by 7 teeth on each side; the wisdom teeth were extracted earlier. In the sectional image, the sections through the region 275 close to the joint can be seen at the bottom right and left and the approximate symmetry of the lower jaw can be seen in them. In the image, the sectional planes of the sagittal planes run, which are labeled S1 to S5 here, run vertically. In the image, the frontal planes F1 to F5 run horizontally. The frontal plane F5 or, in the sectional image, the frontal line F5 runs mostly through the area 275 near the joint. The line F4 runs transversely mostly near the molar with position 6, but not necessarily exactly on this position. The symmetry is quite good in the present example, but shows deviations. Line F3 runs transversely approximated through tooth position 4, i.e. behind the canines. For further details on the structure of the sagittal plane packages, see FIGS. 16 and 19.

Figure 25A:
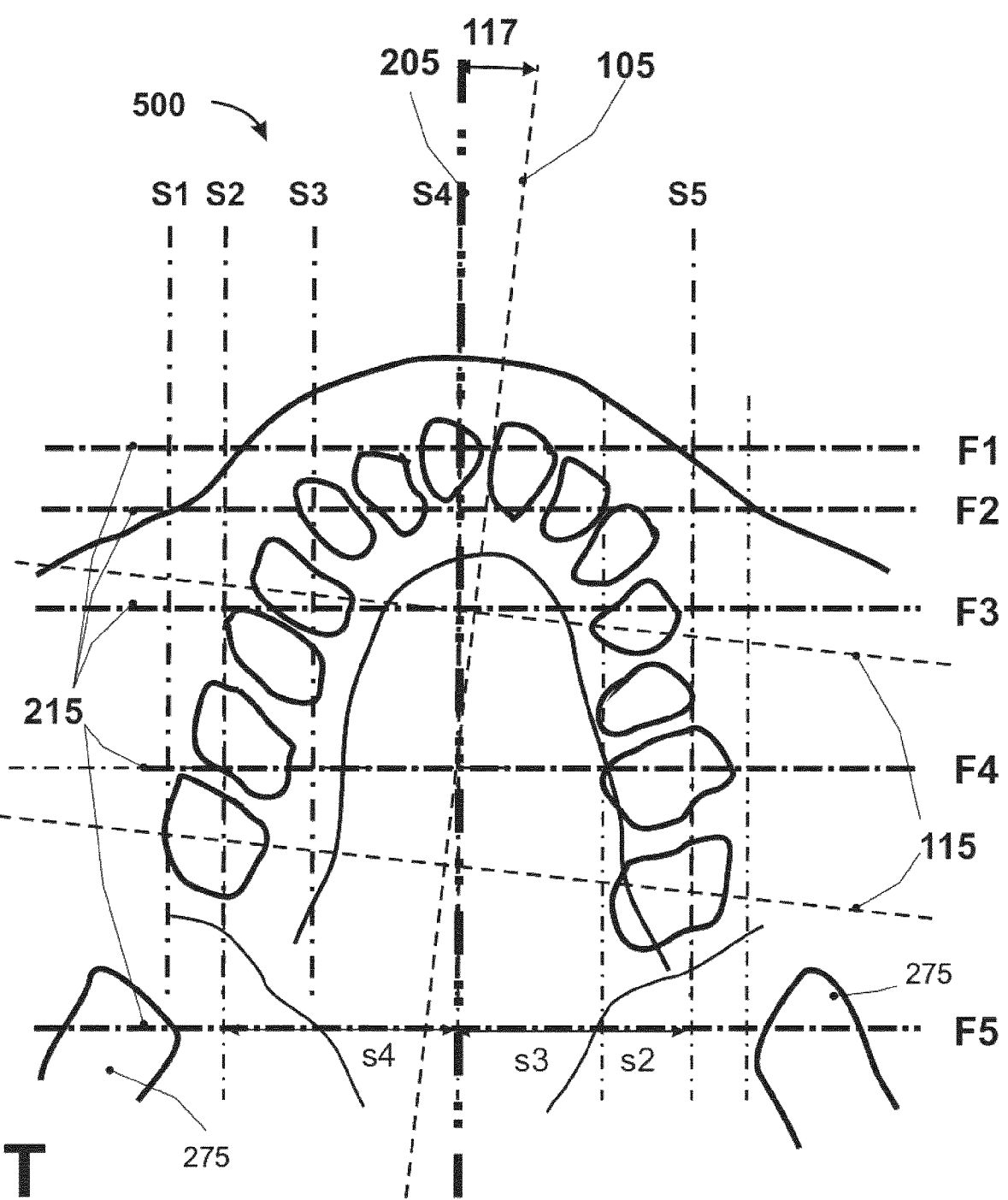
FIG. 25a shows a transverse sectional view through the dental arch of an asymmetrical upper jaw.

FIG. 25a shows the tilting by the angle 117 named, projected into the transverse plane T. The chewing plane is oblique in its line of symmetry 105 in the coordinate system of the training apparatus, here exaggeratedly clearly schematically drawn. The coordinate system perpendicular in FIG. 25a with the main directions 205 and 215 is oriented according to the alignment of the transverse axis 215, which is achieved by individually applying it in the 3D image space to anatomical symmetrical features in the patient's head. The angle 117 between direction 205 and direction 105 is the same as that between transverse direction 215 and 115.

Figure 26:
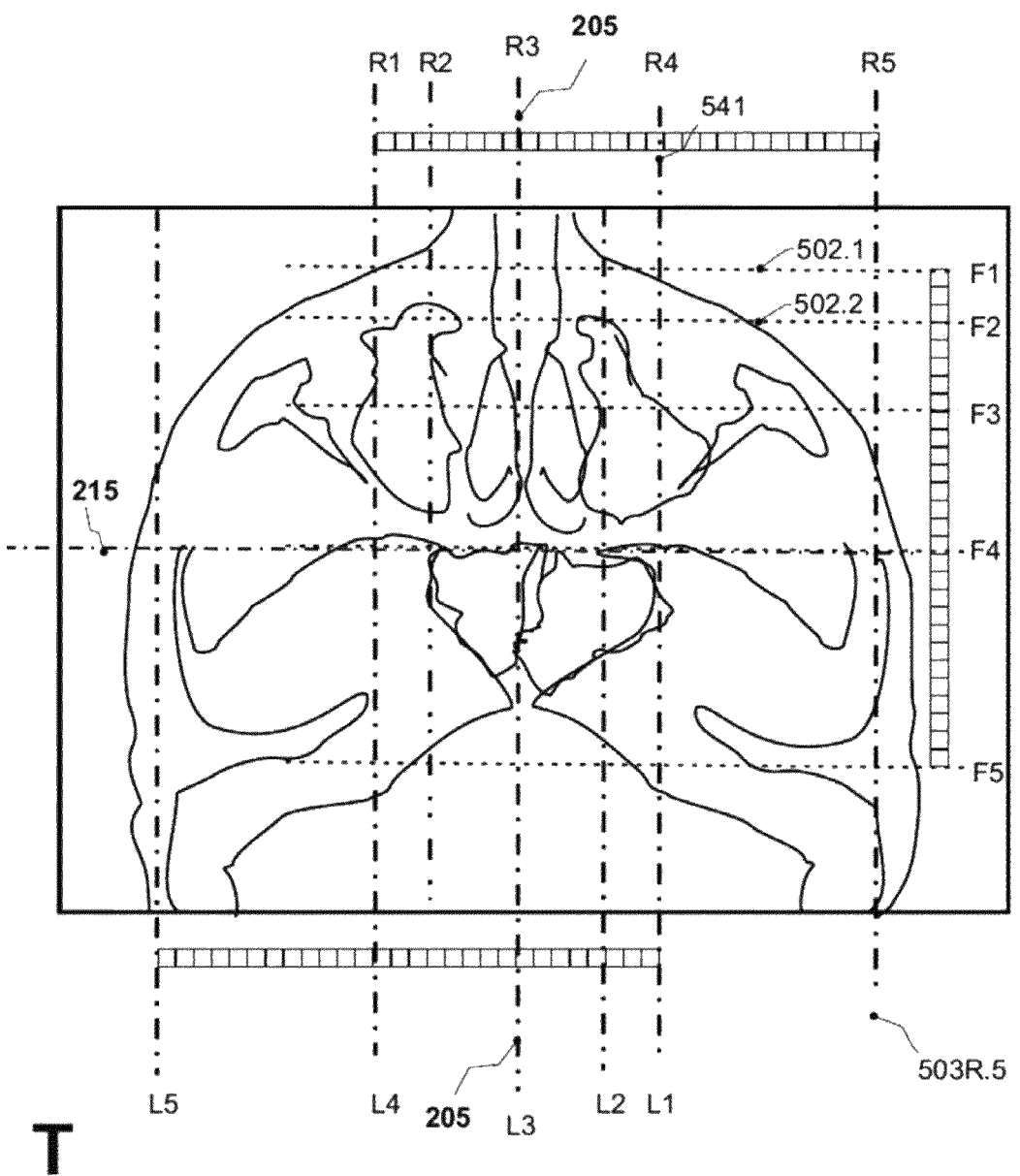
FIG. 26 shows a transverse sectional view through the region of the nasal septum with asymmetry.

FIG. 26 shows a transverse sectional view through the region of the nasal septum with asymmetry. FIG. 26 shows the visible contours of the skull schematically as lines. The lineal-like stripes above, below and to the right of the image show the harmony of the plane distances of the 3D reference body 500. In detail, the asymmetry of the cranium can also be seen despite apparent symmetry. The symmetry of the dental arch in the upper and lower jaw in its midplane can deviate significantly from the symmetry of the cranium, i.e. the chewing plane can be tilted and twisted. This is often the case, especially in cases requiring treatment. A transverse sectional image is obtained in the digital or virtual 3D image system through the digital or virtual 3D X-ray image of a head with a particularly preferred exemplary embodiment of the 3D structural marker 500 in the region of the lateral zygomatic bone arch. The image shows quite clearly the very asymmetric construction of the bony structures in the region of the nasal septum and pharynx. The exact alignment of the transverse principal axis 215 can be done in the 3D image system on several of these transverse sectional planes using several right-left pairs of landmarks. Plotted in the sectional image are the line packages R1 to R5 and L1 to L5 of the sagittal plane packages and the line packages F1 to F5 of the frontal planes of structural marker 500. Lines 520.1 and 502.2, etc., all run in the direction of the transverse right-left axis 215. Lines R and L of the sagittal planes all run in the direction of the anterior-posterior axis 205.

Figure 27:
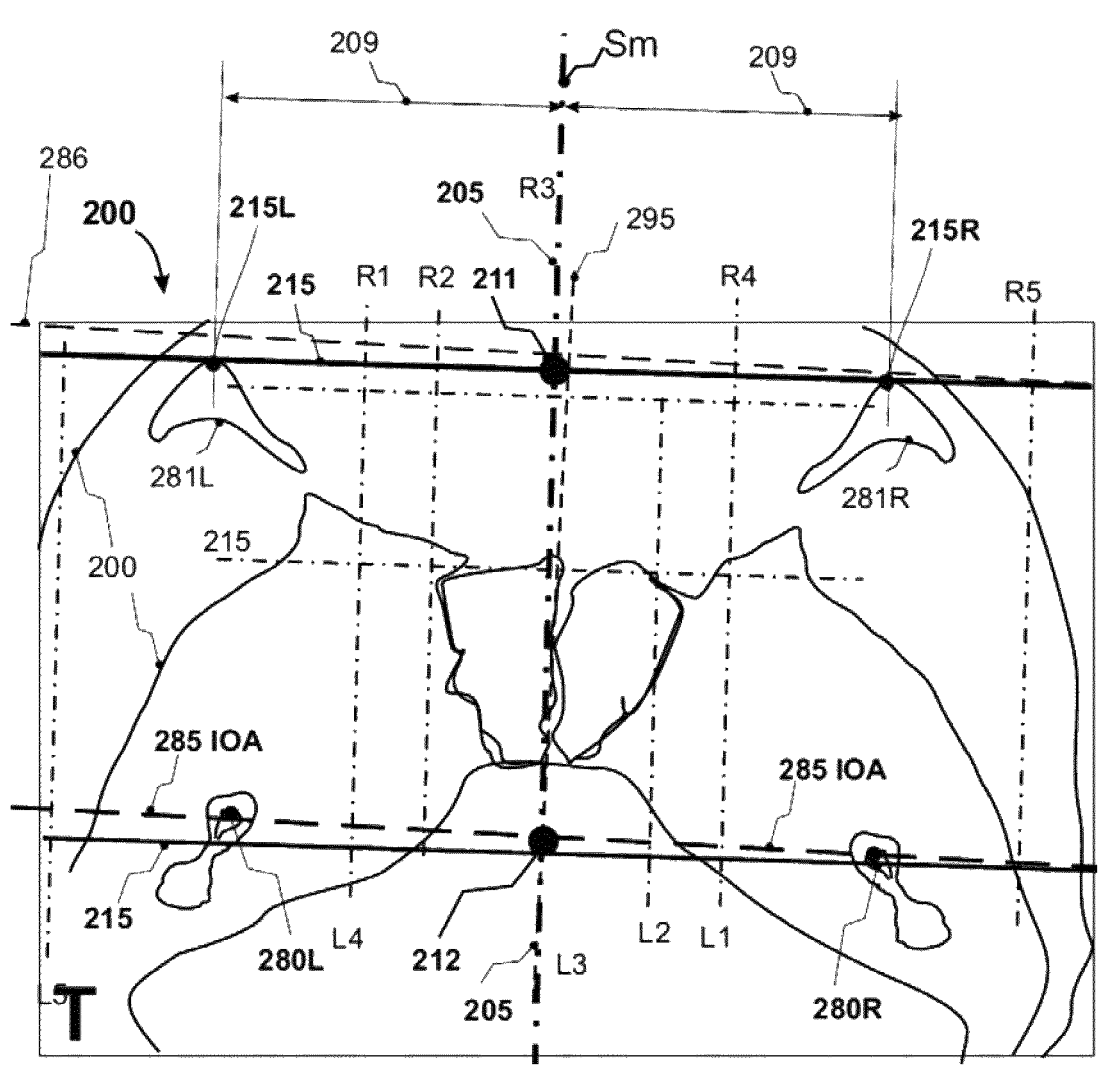
FIG. 27 shows a transverse sectional view through landmarks of the inner ear with the inner ear axis.

FIG. 27 shows a transverse sectional view through landmarks/features of the inner ear with the inner ear axis 285. FIG. 27 shows in one exemplary embodiment the position of the reference body 500 based on the visible axis 215 and the intersection axis of the sagittal plane 205 and in comparison the inner ear axis 285 IOA according to Hornung, which is not parallel to the transverse axis 215. Only in extremely symmetrically constructed special cases are the transverse axis 115 and the inner ear axis 285 parallel. A transverse sectional image is obtained in the virtual 3D image system by the virtual 3D X-ray image of a head with a particularly preferred exemplary embodiment of the 3D structural marker in the region of the lateral zygomatic bone arch and the inner ear, especially with sectional view through the vertically standing arch of the vestibular organ 280. The image shown in FIG. 27 clearly shows the connecting line 285 (IOA) as the inner ear axis between the landmark 280R in the inner ear on the right and the landmark 280L in the inner ear on the left. In the same image, one can see the orientation of the transverse axis 215 with its tangential landmarks 215L and 215R. With respect to the principal axis 215 of the front facial skull, the inner-ear axis 285 is obliquely inclined. The angle between the two axes is approximately 2.0 degrees. FIG. 15 thus illustrates the high level of precision that can be achieved for the first time with the 3D structural marker 500. This is because it had previously been assumed that the inner ear axis 285 and the transverse axes of the front facial skull were parallel. As a direct consequence of the angle between IOA 285 and transverse axis 215, there is a difference in the center of the nominal position of the incisors, depending on which axis is taken as the transverse axis. The method explained here does not use the inner ear axis as the transverse axis but the transverse axis 215 determined as shown above, which can be aligned with the front facial skull, as indicated by the points 215L and 215R. Thus, the position of the optimal center between the incisors in the frontal view for the dental arches can be determined to within about 0.5 mm to 1 mm precision. This center 211 is defined by the median sagittal plane, which is identical to the planes R3 and L3 in the exemplary embodiment shown. It should be noted here that in the progress of an effective therapy, the bony skull and the jaw may remodel in such a way that the two axial directions 215 and 285 become more and more parallel. Thus, the goal of therapy can be anatomically comparable to the orientation that results from the inner ear axis. However, as suggested here, the starting position of the appropriate therapy may result from the direction of the principal axes 215 and 205 and from the position of the median sagittal plane of the front facial skull determined here.

Figure 28:
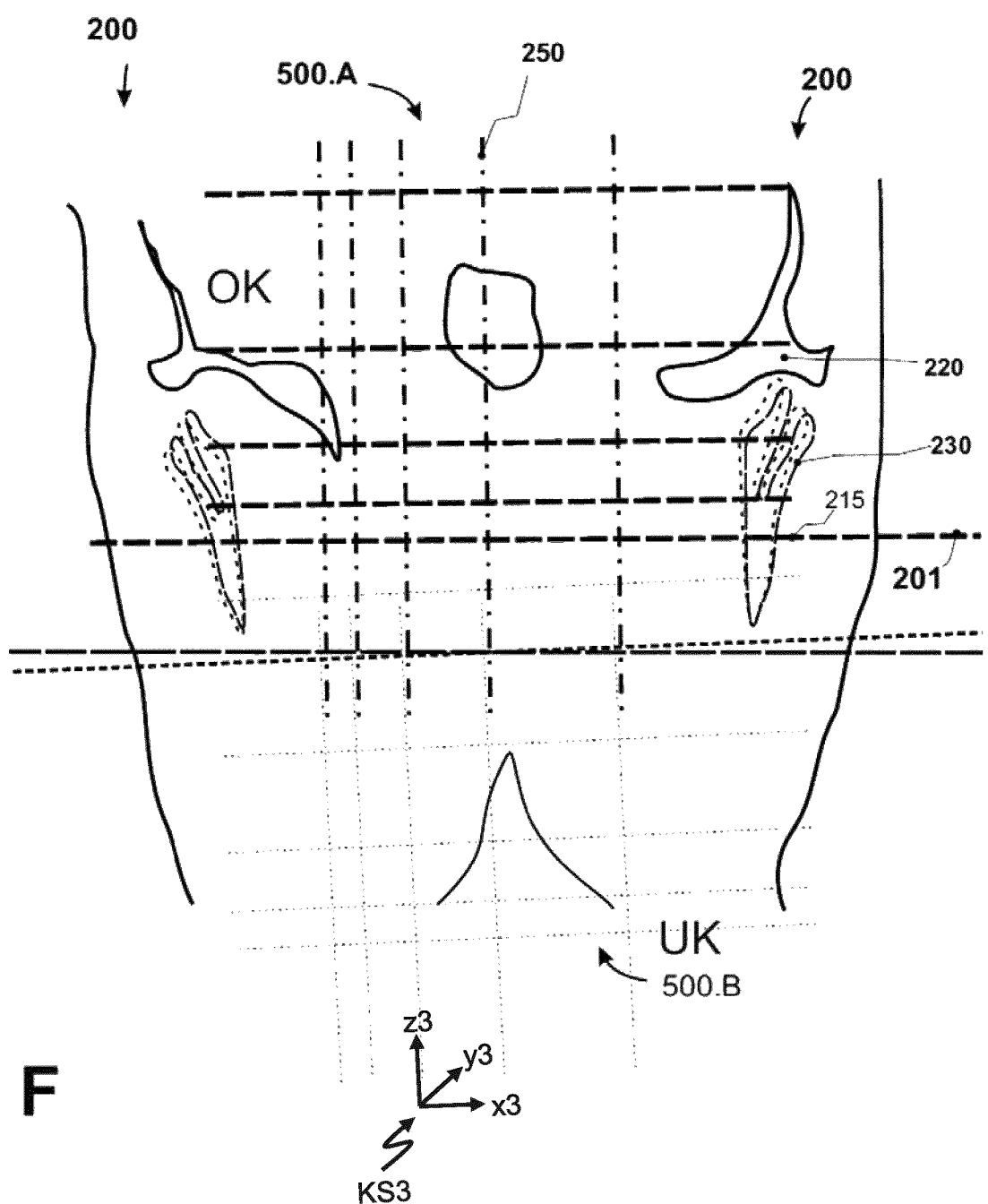
FIG. 28 shows a frontal sectional view through the temporomandibular joint with visible tilting of the lower jaw.

FIG. 28 shows a frontal sectional view through the temporomandibular joint with visible tilting of the lower jaw UK. FIG. 28 shows the oblique position of the lower jaw 230 in thin dashed lines in comparison to the cranial symmetry of the upper jaw 220, which is schematically shown in the thick dashed lines. A frontal sectional view through the upper jaw OK and lower jaw UK of a patient is obtained. The human head comprises the cranium 200 with the upper jaw OK, 220 firmly attached to the bone and the lower jaw UK, 230 hinged in the temporomandibular joint. The virtual sectional view runs through the temporomandibular joint and shows the digitally or virtually sectioned bone structures of the upper jaw OK at the top right and left and the digitally or virtually sectioned bone structures of the lower jaw UK standing elongated below. At the top, drawn with bold grid lines, you can see the plane packages of the structural marker 500.A of the cranium 200. The optional coordinate system KS2 can be assigned to the structural marker 500.A. The median sagittal plane lies in its orientation exactly in the direction of the vertical axis 250 of the cranium, the transverse axis 215 lies exactly in the direction of the transverse planes.

Below this, drawn in fine lines, a second structural marker 500.B lies tilted and slightly displaced, which is fitted into the lower jaw UK. The structural marker 500.B can also be referred to as the third digital reference system. If the second lower structural marker 500.B is aligned with the condyles (bony part of a joint) of the lower jaw UK in the temporomandibular joint on the right and left, this results in a tilt angle W2 between the structural marker 500.B of the lower jaw UK and the structural marker 500. A of the cranium 200. The 3D structural markers 500.A and 500.6 are used in this exemplary embodiment to make angular deviations between the upper jaw OK and the lower jaw UK relative to the ideal position precisely and clearly measurable. An optional coordinate system KS3 can be assigned to the 500.6 structural marker.

FIG. 29 shows a frontal sectional view F through the molar region with the chewing plane lying too high. FIG. 29 shows a 3D X-ray frontal sectional view through the head of a patient in frontal view and the 3D reference object 500 individually fitted therein with its transverse planes, which are visible in sectional view as straight lines T1, T2, . . . , T5. The lower transverse plane T1 forms the individual separating-sliding plane, which is taken into account in the 3D design of the training apparatus. The training apparatus is created in 3D with OK part and UK part in such a way that it contains the suitably supported separating-sliding plane. In addition, the marginal gaps around the teeth and the occlusal support areas are designed. Subsequently, the training apparatus, which is completely individually adapted to the dental arch and, moreover, to the cranial symmetry in the design, is manufactured, e.g. by milling or by additive manufacturing. At the top of FIG. 29a, the radiographic sectional view is shown in the three principal planes F, T and S. The large image window on the left shows the frontal sectional view F, the small window on the top right shows the transverse sectional view T and the small image window on the bottom right in the upper area shows the sagittal sectional view S. Below, FIG. 29b shows the frontal sectional view F schematically as bony contours. The bony structures 200a and the position of the transverse lines aligned with them are not directly visible because the anchor points and tangential points for them do not lie in the sectional plane. The T-lines T1 to T5 running horizontally in the image are created by the intersection of the frontal image plane with the transverse planes 501.1 to 501.5. Here, the vertical line grid of the sagittal planes S is hidden for clarity. To the right of the image is a superimposed scale of small squares to clarify the distance relationships between transverse planes T1 to T5. T2 is 3 boxes away from T1. T3 is 5 boxes away from T2. T4 is 3+5=8 boxes away from T3. T5 is 5+8=13 coxes away from T4. This is the well-known Fibonacci sequence, which has approximately proportional distance ratios. Strikingly clear between transverse planes T1 and T2 is the oblique lower jaw 230 and unilateral compression, in the image on the right side of the image. The image also shows the alignment of the 3D structural marker 500 on the bony structures in the upper frontal cranium, i.e. in the area of the lines/planes T4, T5 and above. There, the outer structures of the bones show symmetry, while the inner structures of the nasal septum and its surroundings are clearly asymmetric and useless or not preferred for alignment of the structural marker. The principal direction 215 in the transverse right-left direction is evident at each of the parallel transverse planes and their intersecting lines T1 to T5.

FIG. 30 shows a frontal sectional view F through the lower incisors. At the top of FIG. 30a is a radiographic sectional view of a frontal sectional view F through the lower incisors. One can see the horizontal T-lines as white lines and the vertical S-lines, symmetrically arranged around the median sagittal plane, also as white lines. The direction of the transverse axis 215 is drawn horizontally.

Below in FIG. 30b the contours of the frontal sectional view F are shown schematically. Here the T-lines of the transverse planes T1 to T5 are drawn and also the vertical intersection lines of the sagittal planes R1 to R5 and L1 to L5. For further details on the sagittal plane package, see FIGS. 3b, 4 and 6. The scales of squared boxes show the distance ratios between the planes, which in the present preferred exemplary embodiment are the same in both directions (horizontal or right-left versus top-bottom or vertical). Deviating from this, there is an alternative exemplary embodiment specifically for elongated head shapes, in which the boxes in the vertical direction are higher than the width in the transverse direction. The isotropy of the spacing of the plane packages 501 (T), 502 (F) and 503 (S and R and L, respectively) is not a necessity, but a highly preferred exemplary embodiment.

Figure 31:
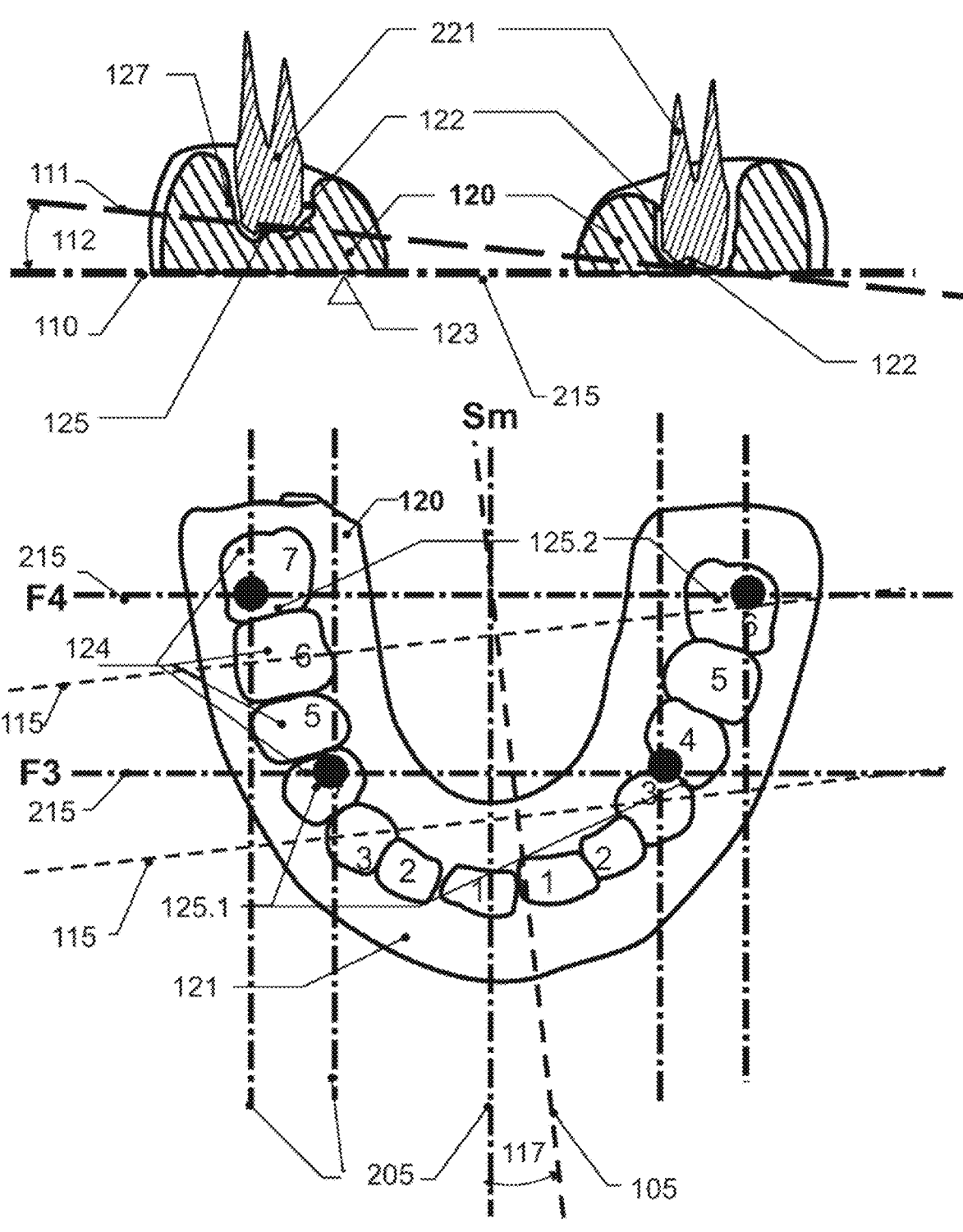
FIG. 31 shows a top view and a side view of the training apparatus.

FIG. 31 shows the frontal sectional view through the upper jaw part 120 at the top and the top view of the upper jaw part 120 at the bottom, in which the free spaces 124 for the teeth can be seen and the contact points 125. In this individually schematized case, we have no breakthrough from below. The back-front main direction 205 of the cranial system determines the back-front principal direction of the upper jaw part 120. The transverse right-left principal direction 215 determines the position of the separating-sliding plane 110. Due to the almost frictionless sliding smooth surface 123, the resulting force can only be perpendicular to the separating-sliding plane 110, especially as long as the teeth are not in contact laterally because of the marginal gap 122. The top view shows that the exact position of the contact points 125 is determined by the crossed plane system with the projection lines 215 and 205, in particular the frontal planes F3 and F4 are decisive. Since the dental symmetry system with the principal directions 105 and 115 is tilted by three solid angles, the free space 214 for the dental arch in the upper part 120 is oblique and the chewing plane 111 is inclined against the separating-sliding plane 110.

FIG. 31 schematically shows the first smooth sliding surface 123 which coincides as closely as possible with a cranially oriented transverse plane which is parallel to the axes 110 and 115. FIG. 31 also shows the chewing plane 111 inclined obliquely to the direction of the transverse axis 110 as seen in sectional view from the front. The chewing plane is usually also inclined obliquely to the first smooth sliding surface 123 as seen from the side in sagittal sectional view (not shown in FIG. 31). If the teeth are viewed with the numbering 1 to 7, which is usual in dentistry, starting from the central incisor, the clear asymmetry can be seen, which in the example is due to the fact that molar 7 is missing on the right side of the picture. The contact points 125 are still oriented on cranial symmetry planes, so the connecting line between the contact points 125.1 on the right 3 and on the left 3 does not run symmetrically to the dental arch but according to the cranial symmetry, which is positioned differently. Analogously, the rear connection line right-left between the support points 125.2 is not symmetrical to the dental arch but symmetrical to the cranial symmetry. The cranial symmetry determines the attachment points of the musculature in particular and is also decisive for the neuromuscular function. Looking at the mechanical contact points and the force transmission, one can see in the sectional view AB the marginal gaps 122 of preferably 0.4 mm width, which prevent a direct force transmission laterally to the teeth 221. Because of the edge gaps 122 with their partly arcuate shape and the free spaces 124 for the teeth, the apparatus according to the invention does not form a tight-fitting rail but a loose-fitting apparatus which, in the exemplary embodiment, rests only on the support areas 125.1 and 125.2. If the marginal gap 122 were omitted and the splint 120 were allowed to rest directly against the teeth, as other splints do, the teeth would be contacted laterally with force and the resulting forces on the teeth would no longer be perpendicular to the plane of separation. Since the occlusal surfaces of the teeth 221 would also represent a laterally acting interlock with the splint 120, they are not molded off but the marginal gap 122 extends to the support areas 125, which preferably do not transmit lateral forces but only compressive forces. From a neurophysiological point of view, the very low-friction transverse sliding surface 123 has the effect that the resulting force can only be perpendicular to it as long as there is no stop of the sliding surfaces of the upper jaw part and the lower jaw part. The force stimulus of this perpendicular pressure force is detected via the retaining fibers of the teeth and reported to the sensor system of the masticatory apparatus. At the same time, the muscle spindles and the ligament spindles also report the load and stretching of the muscles, ligaments and tendons. This changes the control of the musculature by the sensorimotor area of the brain. For this biomechanical and neurophysiological training functionality, it is of great importance that the separating-sliding surface is not located in the current chewing plane 111 but in the cranial transverse plane 110, 115. Due to the oblique position of the separating-sliding plane 123 compared to the chewing plane 111, there are often breakthroughs of some teeth of the upper jaw into the lower jaw part. In FIG. 11a, the openings 126 are shown schematically, but here on a dental arch that appears rather symmetrical from above.

Figure 32:
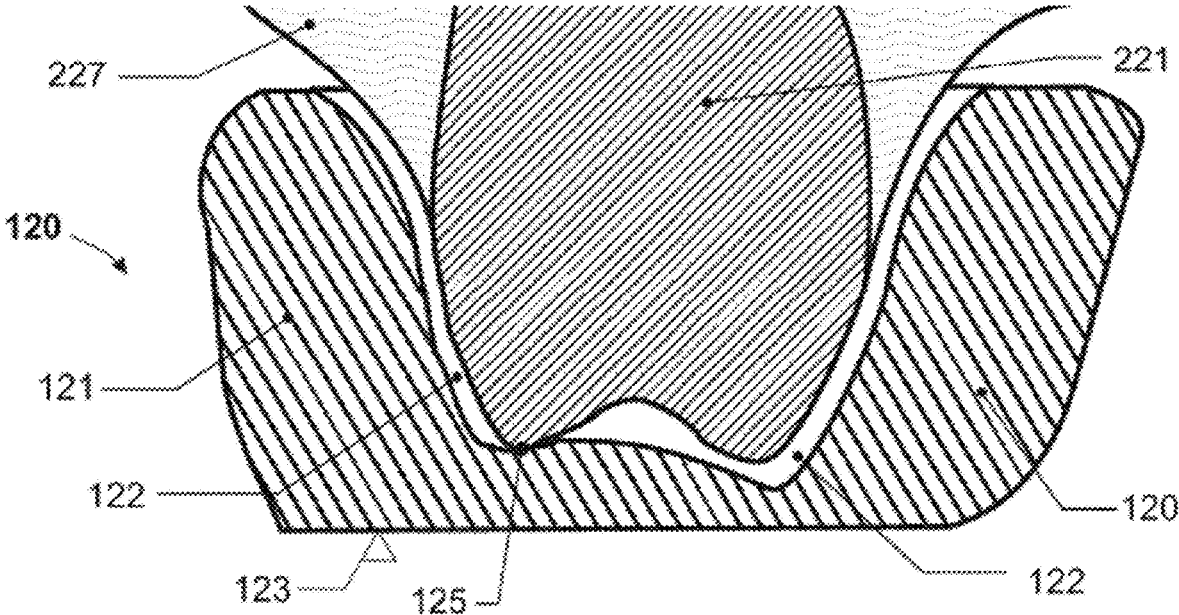
FIG. 32 shows the detail of a support area in the particularly preferred exemplary embodiment.

FIG. 32 shows a detail of a support area 125 in a particularly preferred exemplary embodiment. The position of the support area is based—as described in FIG. 31—on the cranial symmetry of the patient's skull, as can be extracted, for example, from a DVT image of the head. The support area is laterally scrambled as little as possible. In addition, there is a marginal gap 122. The support area does not necessarily have to be circular and it is designed in such a way that, as far as possible, no lateral forces are exerted. A preferred embodiment supports on a hump in a small area and the marginal gap begins around it. Thus, the support transmits forces that are perpendicular to the separating-sliding plane, but it does not clamp the teeth laterally, quite unlike a normal aligner splint that is used, for example, to shift the teeth. The pressure force due to the chewing pressure is only transmitted selectively in the rather very small area 125. Preferably, the support area has a diameter of less than 4 mm, particularly preferably less than 2.5 mm, and the marginal gap is preferably less than 1 mm, particularly preferably less than 0.5 mm.

Figure 33:
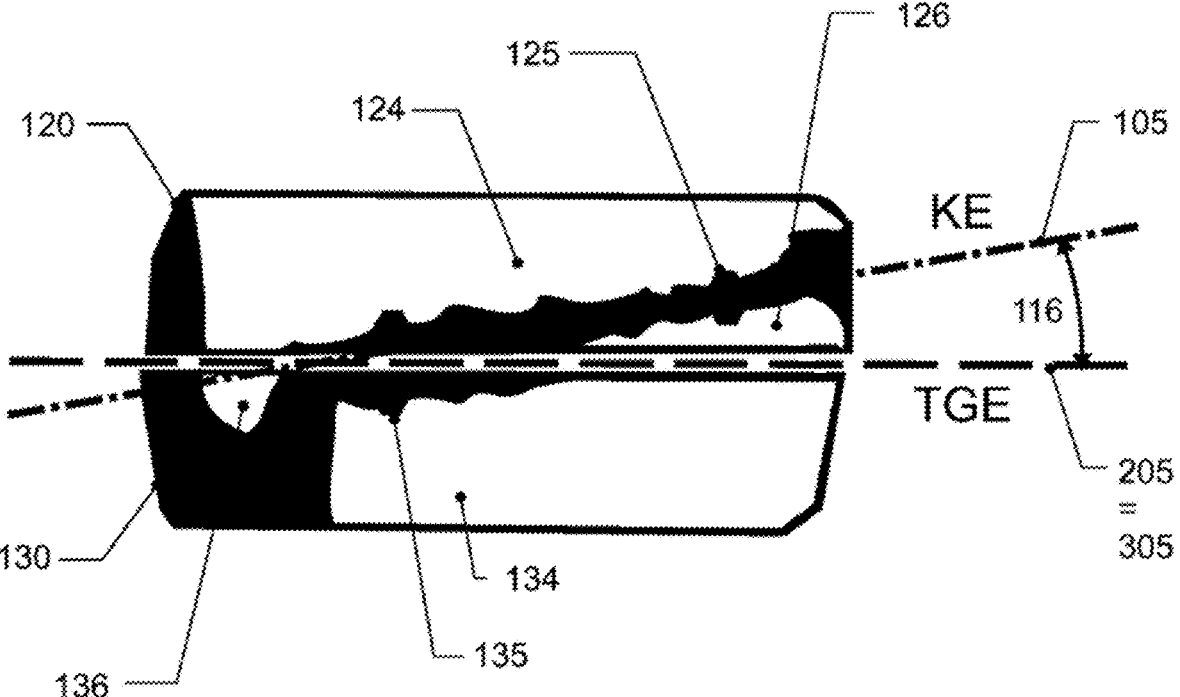
FIG. 33 shows the training apparatus from the side on the dentition with strong inclination

FIG. 33 shows the training apparatus from the side at the dentition with strong inclination. It is shown from the side that the separating-sliding plane 110 is exactly not in the chewing plane 111. Compared to the chewing plane 111, the separating-sliding plane 110 is lying lower at the back (right in the picture) on the molars. The molar teeth of the lower jaw therefore bore into the area of the upper jaw. Therefore, a correction of the training apparatus is required. The correction is a parallel shift of the transverse plane=separating-sliding plane 110 upward or downward, parallel to the plane T1, as also shown in FIGS. 16-18, in order to bring the wall thicknesses at the remaining remnants of the milled preforms to a feasible minimum value or so that the breakthrough of the teeth of the opposite side does not become too large or so that the wall thicknesses at the training apparatus become suitably thick. The sliding direction seen from the front and from the side does not change by shifting the transverse plane up or down.

FIG. 33 further shows a schematic sectional view through the apparatus 300 with OK part 120 and UK part 130. One can see in black the preferably solid material of the training apparatus and the clearances 124 and 134 including marginal gaps. The support points 125 and 135 are indicated. Since the chewing plane KE in the lateral sectional view with direction 105 is inclined by the angle 116 against the separating-sliding plane TGE with direction 205 or 305, one sees the solid filled free space between the teeth running diagonally from the lower left to the upper right in the picture. In the upper jaw part 120, there is consequently an opening 126 from below as free space for the molars of the lower jaw. In the lower jaw part 130, an opening 136 is found as a free space for the incisors of the upper jaw. The free spaces include a marginal layer for additional freedom of movement of the teeth to release the lateral sliding movement of the lower jaw part 130 relative to the upper jaw part 120.

Figure 34:
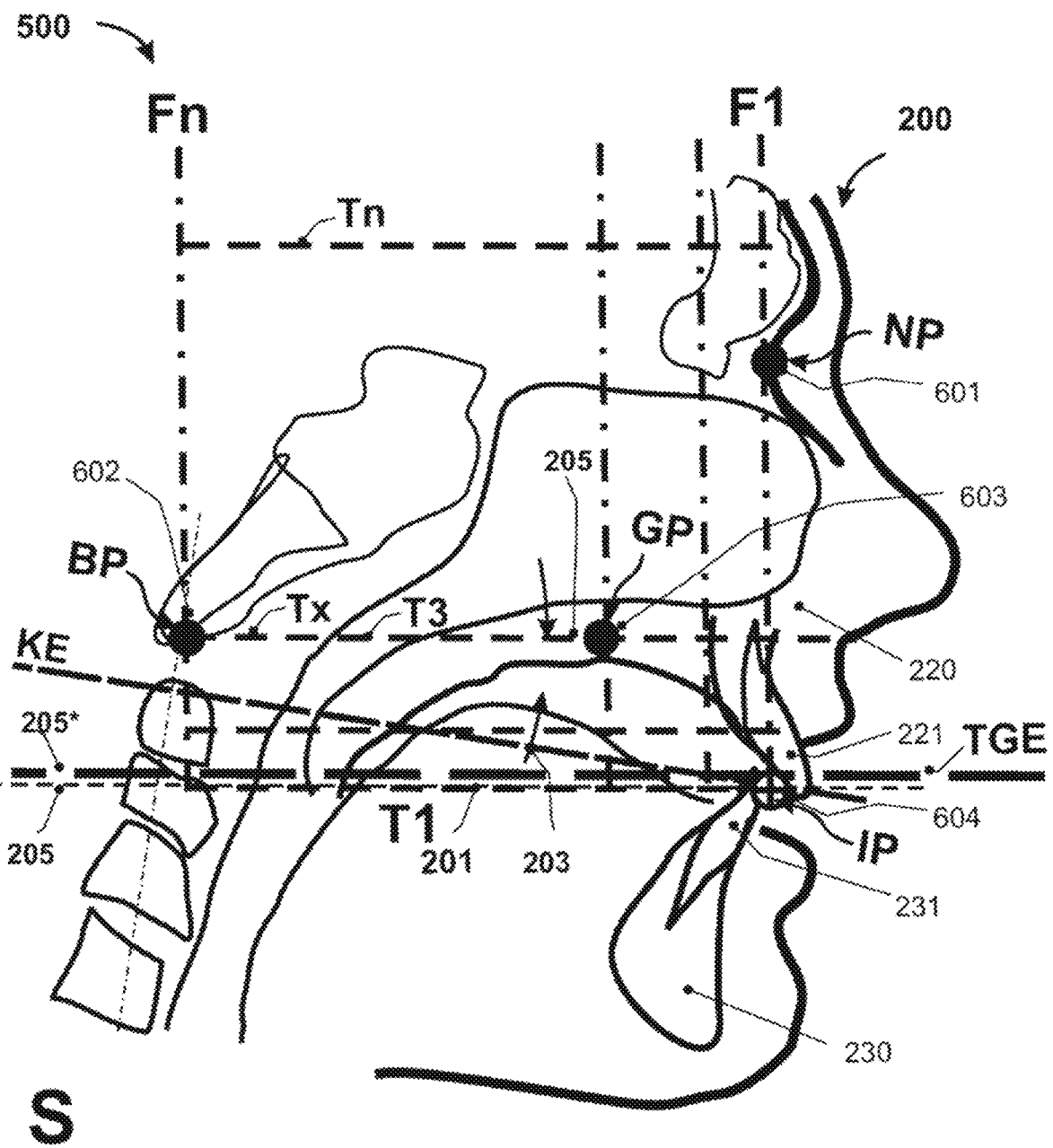

FIG. 34 shows the structural marker in sagittal sectional view with the separating-sliding plane TGE or 110 drawn in. The construction is shown from the side, with the optional displacement of the T1 plane e.g. by 2 or 4 mm upwards, in the figure correspondingly from axis 205 to 205\*, to obtain the separating-sliding plane TGE, which can also be built in real terms. The chewing plane KE or 111 is drawn at an oblique angle to this.

Figure 35:
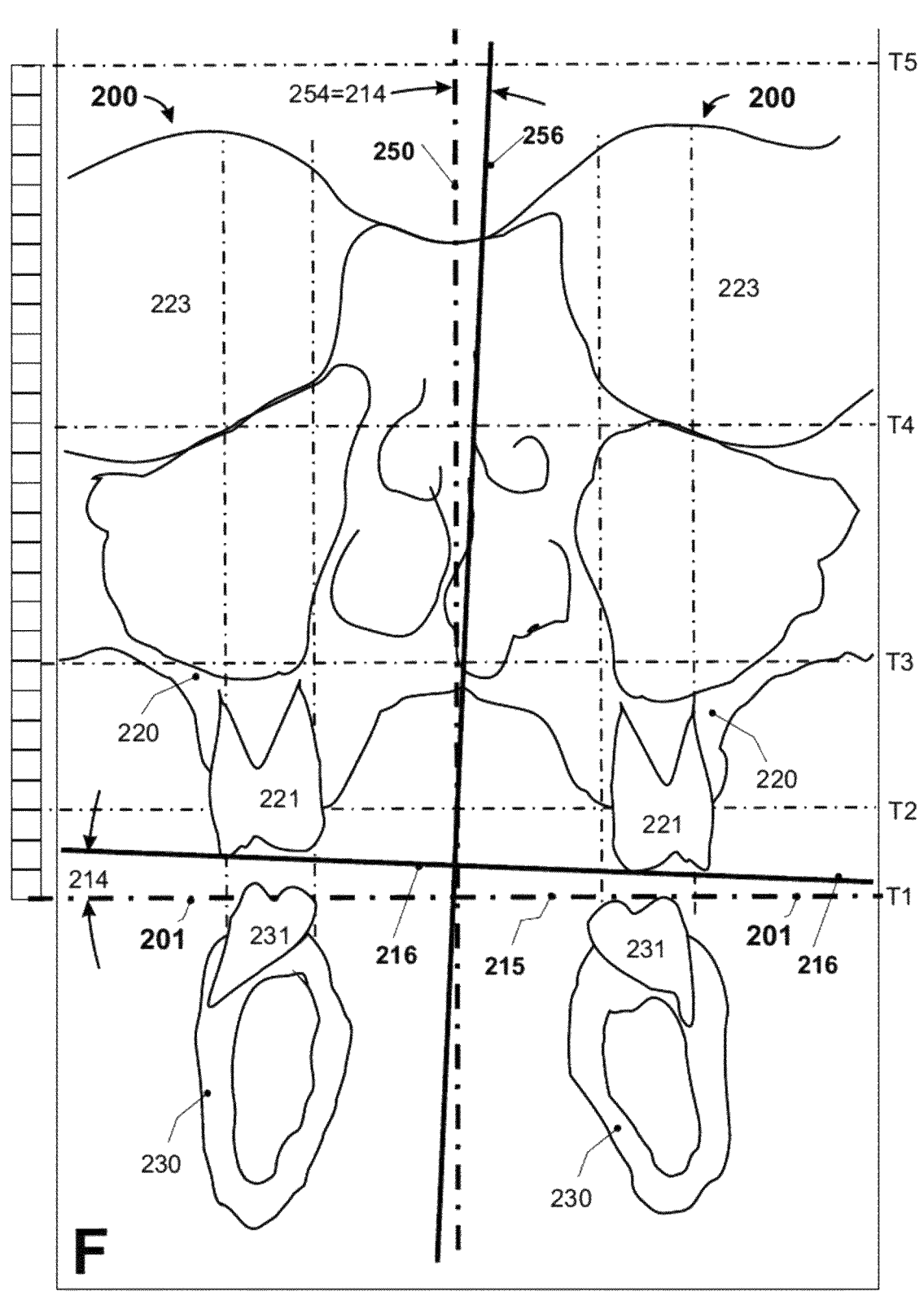
FIG. 35 shows a digital or virtual frontal sectional view through the molar region and reveals a clear oblique position of the current occlusal plane in this example.

FIG. 35 shows a digital or virtual frontal sectional view F through the molar region and reveals a clear oblique position of the current occlusal plane/chewing plane 216 in this example. In the schematic frontal sectional view F through the virtual 3D volume image of a skull 200 with upper jaw 220 and lower jaw 230 and the dental arches 221 above and

231 below shown here, one can analyze to what extent an asymmetry or tilting of the dentition and the jaws is given. The vertical axis 250 of the cranium 200 and the horizontal axis 215 perpendicular to it are shown in bold dashed lines. At first glance, it appears that the teeth are aligned with the transverse axis 215. However, a closer look shows that the current occlusal plane 216 on the upper jaw is tilted by the angle 214 with respect to the transverse axis 215 of the cranium 200. Correspondingly, the surface normal 256 is also tilted to the current occlusal plane, the angle 254 is equal to the angle 214. Eye orbits 223 are also bony structures of the cranium 200. Lower edges of the eye orbits 223 are also suitable for the alignment of the structural marker 500, for example.

Figure 36:
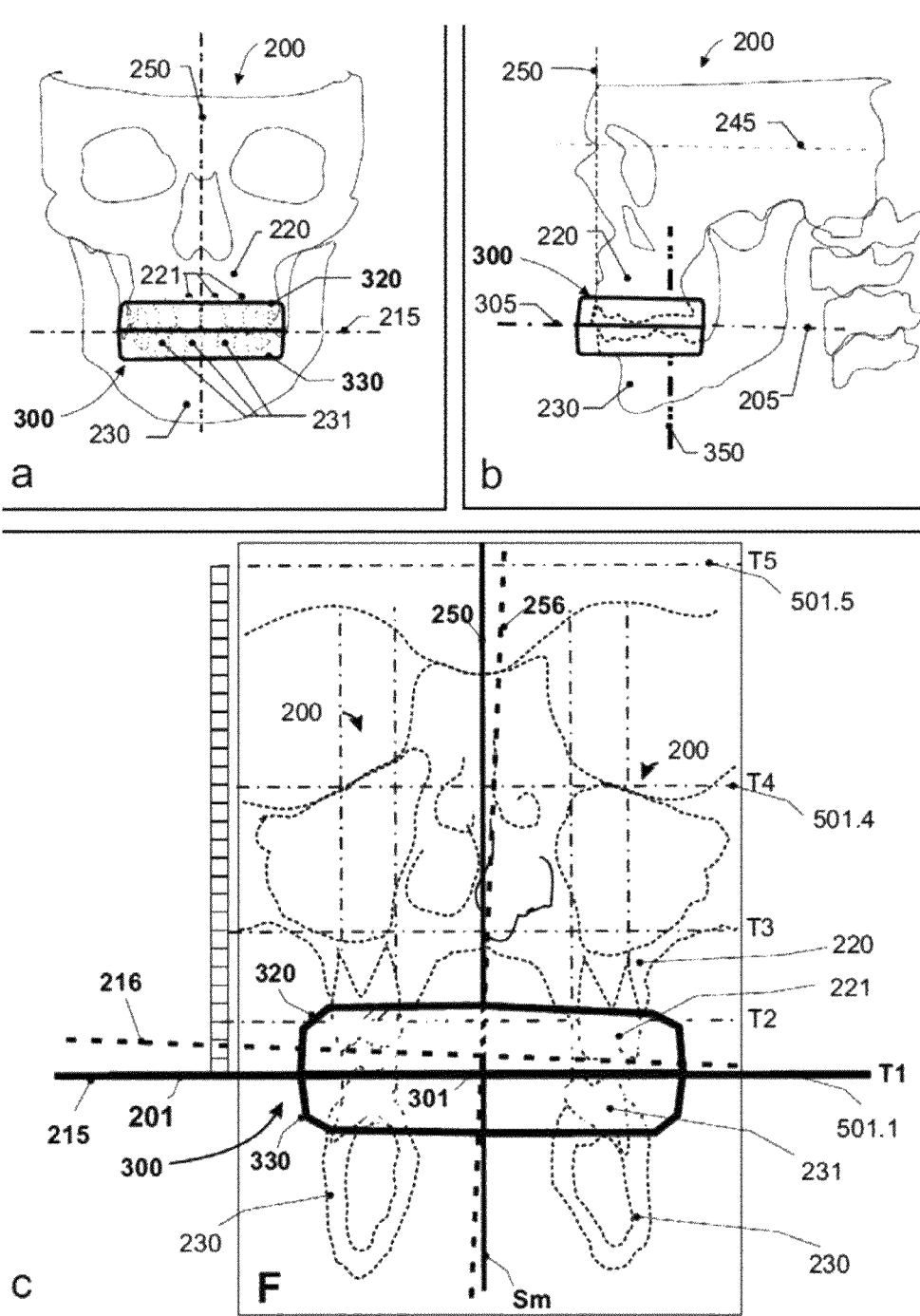
FIG. 36 shows a training apparatus with separating-sliding plane in the position of the ideal occlusal plane in a roughly schematic view.

FIG. 36 shows a training apparatus 300 with separating-sliding plane 301 in the position of the ideal occlusal plane 201 in a rough schematic view. FIG. 32*a* shows schematically the bony structures 200*a* of the cranium 200 with upper jaw 220 and attached lower jaw 230, which does not belong to the cranium. The dental arch 221 of the upper jaw and the dental arch 231 of the lower jaw are hidden here by the apparatus 300. The bony structures 200*a* of the cranium, particularly in the area around the eyes, i.e. not those in the upper jaw itself, can be analyzed to define the position and directional orientation of the principal axes. Crucial may be the transverse axis 215 and the vertical axis 250, as well as the anterior-posterior axis 205, which is not visible from the front.

FIG. 36*b* schematically shows a lateral view of the bony structures of a cranium (skull) 200 in virtual 3D space, where here the head is tilted forward so far that the anterior-posterior axis 205 of the cranium 200 runs horizontally in the image. The transverse right-left axis 215 runs perpendicular to the image in FIG. 32*b*, i.e., perpendicularly out of the image plane or perpendicularly into the image plane. The idealized occlusal plane 201 is defined by these two axes 205 and 215 and is perpendicular to the vertical axis 250 and contains the axis 205. The separating-sliding plane 301 of the apparatus 300 is positioned precisely to coincide with the occlusal plane 201. Thus, in sectional or side view, the anterior-posterior axis 305 of the apparatus 300 lies on the anterior-posterior axis 205 of the cranium 200. The vertical axis 350 of the apparatus 300 is parallel to the vertical axis 250 of the cranium 200.

FIG. 36*c* shows the frontal view with superimposition of the contours of the apparatus 300 with separating-sliding plane 301 over the frontal sectional view from FIG. 36. The separating-sliding plane 301 lies as precisely as possible on the idealized occlusal plane 201. This figure illustrates the positioning of the biomechanically and neurophysiologically important position and orientation of the separating-sliding plane 301 between the upper part 320 and the lower part 330 of the apparatus 300, which in practice results individually from the form fit of the inserted apparatus parts 320 and 330 if they are manufactured precisely according to the dental arches. The apparatus 300 may be, for example, a training apparatus or an orthosis. The apparatus 300 with the at least two parts 320 and 330 can also be constructed asymmetrically on one side and or in multiple parts.

The reference plane for planning and fabricating the apparatus 300, in particular for training the temporomandibular joint musculature or for treating the temporomandibular joint, cannot be the current chewing plane with the transverse direction 216 but the transverse plane T1 of the cranium with the transverse direction 215 and the direction of the anterior-posterior axis 205. This is the idealized occlusal plane T1*a* or the reference plane T1*a* and thus the plane in which the lateral sliding movement of the lower jaw 230 with the apparatus 300 inserted is possible relative to the upper jaw 220. In two-part apparatuses 300 with separating-sliding plane 301, digital or virtual preforms for the fabrication of parts 320 and 330 are oriented for this purpose during planning in digital or virtual 3D space in a preferred procedure, or the apparatus 300 is virtually oriented with its separating-sliding plane 301 in such a way that this separating-sliding plane 301 lies in the orientation of the idealized occlusal plane 201. In the particularly preferred exemplary embodiment, the separating-sliding plane 301 is identical in its angular orientation and vertical position to the transverse plane T1 or reference plane T1*a* determined from the 3D structural marker 500.

FIG. 37 shows the head schematically from the side with a spatial orientation in which the coordinate system of the skull is perpendicular. In this spatial orientation, the front-back principal direction 105 of the chewing plane 110 appears obliquely inclined with respect to the transverse principal direction 205 of the skull along which the separating-sliding plane is oriented. The transverse principal direction 305 of the apparatus 300 has thus been placed exactly in the orientation of the principal direction 205 of the skull by suitable positioning of the preforms in the 3D image space, thereby creating the training apparatus as a superposition of the contours of the preforms and the contours of the dental arches together with the air gap. The same applies in the orientation in the other 2 spatial angles, which can be seen from the front and from above, but not from the side.

Structural markers 500, methods and use for fabricating real apparatuses are described in further detail below.

Fields of application are analysis, measurement, design, planning, diagnostics, training and/or therapy in connection with moving body parts, especially with the position and movement of the lower jaw UK to the upper jaw OK as well as the definition of the position and orientation of teeth, dental arches, implants and/or of biomechanical and orthodontic apparatuses, e.g. 300.

The description uses anatomical terms that can also be understood technically:

Transverse axis: running between right and left

Vertical axis: running between top and bottom

AP axis: running between front (anterior) and back (posterior)

Frontal plane: sectional plane with principal axes right-left and top-bottom

Transverse plane: sectional plane with principal axes right-left and front-back

Sagittal plane: sectional plane with principal axes front-back and top-bottom

Description of the structural marker 500 The 3D structural marker 500 comprises at least two plane-parallel plane packages 501 and 502 that are perpendicular to each other in the digital or virtual 3D space 50. FIG. 16 shows a preferred embodiment example with three mutually perpendicular plane packages in perspective view. Each sectional plane shows the plane-parallel planes as parallel lines. The perpendicular plane packages create crossed packages of parallel lines in the sectional view. In the preferred exemplary embodiments, the sectional planes for visualization in the 3D image system are set parallel to one of the plane packages 501 or 502 or 503. One then sees the intersection lines of the other plane packages as a rectangular crossed grid of parallel lines, where the line packages may have a characteristic spacing pattern or spacing ratio.

Each plane package may consist of at least 3 planes (T1, T2, T3 or F1, F2, F3). In the preferred case of 3D structural marker 500, a plane package 591 to 595 of 5 planes (F1 to F5) is used combined with a second plane package 581 to 585 of 5 planes (T1 to T5) orthogonal thereto, see FIG. 17.

In a further developed exemplary embodiment, the group of two orthogonal plane packages (F1 to Fn) and (T1 to Tn) is supplemented by at least one plane package (S1 to Sn) perpendicular thereto. Particularly preferably, the sagittal plane package S is a combined plane package of two part-packages (S1R to SnR) and (S1L to SnL) which are parallel and which are arranged symmetrically about the median sagittal plane Sm, e.g. by the two planes S3L and S3R being identical and forming the median sagittal plane. Further alternatively, only one plane package can be used, e.g. the set of planes with the transverse planes.

In the general exemplary embodiment, the spacing patterns of the plane spacings for the plane packages may differ. In the particularly preferred exemplary embodiment, all plane packages have the same spacing pattern and the same spacing ratios, see FIG. 17.

The spacing of the plane-parallel planes within a plane package can be different. In the particularly preferred exemplary embodiment, they behave according to a Fibonacci sequence such as.

a1=3, a2=5, a3=8, a4=13, a5=21, where a3=a1+a2; a4=a2+a3; a5=a3+a4; etc.

The spacing ratio may also be a constant proportionality in another exemplary embodiment: a2/a1=a3/a2=a4/a3=a5/a4 etc., wherein the proportionality factor is preferably chosen between 1.80 and 1.50, particularly preferably between 1.65 and 1.60.

In the particularly preferred case of 3D structural markers 500 for orthodontic application, a plane package 501 consisting of five planes with the distances 3, 5, 8, 13 units is combined with a second plane package 502 consisting of a further five planes orthogonal to it with the same distances 3, 5, 8, 13 units. Perpendicular to this again is a third plane packet 503 as a double plane package consisting of two sub packages 503R and 503L, which in turn have the distances 3, 5, 8, 13. The sub packages 503R and 503L can be oriented in opposite directions and symmetrically, corresponding to the basic symmetry in the anatomy of the body. The 3D structural marker 500 has the following options for individualized setting:

The size scaling of the 3D structural marker 500 is individually adjustable, i.e. the structural marker can be enlarged or reduced.

The spatial angular orientation of the 3D structural marker 500 and its principal axes is individually adjustable, i.e. the 3 principal directions of the orthogonal plane packages can be aligned as required in the digital or virtual space 50, corresponding to the 3 degrees of freedom of rotation.

The spatial position of the 3D structural marker 500 or its center of gravity is individually adjustable, i.e. the 3 spatial coordinates (x, y, z) of the mutually fixed group from the orthogonal plane packages are adjustable in the sense of the 3 degrees of freedom of translation. For the individual adaptation of the 3D structural marker 500 to the conditions of the bony skull, anatomical landmarks/features of symmetry and further anchor features, e.g. anchor points, are used, which can be found in the virtual 3D image of the skull in suitable sectional views 72. For application of the 3D structural marker 500 according to the invention, a virtual 3D image of at least one real body part, e.g., of the head 90a of a patient is provided, in a preferred exemplary embodiment, e.g., via a modern 3D DVT X-ray system, see FIG. 13.

The spatial resolution of such 3D X-ray images can reach values around 0.1 mm (millimeter), with even better resolutions expected in the future, i.e. resolutions smaller than 0.1 mm but larger than 0.001 mm, for example. This is sufficient for precise positioning and orientation. The virtual sectional images are visualized, for example, with the aid of a monitor as output unit 72a, which shows the views of selected sectional planes and the perpendicular orientations of further sectional planes, usually in different screen sections, side by side.

The imaging area and the orientation and position of the sectional planes can be moved, rotated and scaled by operating elements or operating devices 73.

Method of 3D structural marker alignment a) Display and 3D position determination of landmarks/ features in general.

b) Display, positioning and orientation of axes c) Alignment of the image planes with the principal planes and principal axes of the body part.

d) Display of the 3D structural marker in the digital or virtual image space.

e) Degrees of freedom and individually definable parameters of 3D structural marker f) Positioning, alignment and scaling of the 3D structural marker in the digital or virtual image space.

g) Using multiple 3D structural markers 500 h) 3D structural marker to analyze harmony and symmetry in the body part under consideration.

i) Planning of dental prosthesis or tooth changes with the help of the 3D structural marker.

j) Planning and manufacture of training apparatuses and orthotics.

k) Special significance of the transverse idealized occlusal plane as a separating-sliding plane.

a) Display and 3D positioning of landmarks/features in general.

Selection of the principal view so that the landmarks are visible, in case of symmetrical landmarks at least one of the two and determination of the 3D position.

In the case of approximately symmetrical landmarks that do not lie exactly in an image plane, adjust the image plane as required and determine the second landmark in 3D in the same way.

If required, the principal view can be switched to the other two orthogonal image planes so that the appropriate sectional planes can be displayed depending on the situation and the current problem in the procedure.

For example, in order to precisely define right-left symmetrical landmarks, the sagittal sectional plane is shifted into the area of these landmarks if required, as is the transverse and/or frontal sectional plane. This enables the anatomical landmarks to be defined with high precision.

b) Display, positioning and orientation of axes

Axes result as continued connecting lines between two landmarks, each of which has a defined 3D position.

Axes are usually defined as digital objects 66 in the 3D image system and can be faded in and/or out in the virtual 3D space 50.

Axes also result as lines of intersection between two planes that are not parallel to each other.

c) Alignment of the image planes to the principal planes and principal axes of the body part.

Orientation of the sectional plane of visualization 72 such that the surface normal to the sectional plane passes through right-left symmetric landmarks 281 of the bony structures as transverse axis 215, see FIG. 19.

In the preferred exemplary embodiment, alignment at the vertices of the zygomatic arches, see FIG. 19, 215L and 215R. This defines the orientation of all sagittal planes, which are basically perpendicular to the transverse axis 215. One can also use other symmetrical landmarks of the cranium 200 as far as they are located in the upper and anterior facial skull. However, the area of the nasal septum and the pharynx is very asymmetrical and hardly or less suitable.

In addition, the center 211 of the distance between the symmetric landmarks is determined, or several distances, in order to find a suitable position for the median sagittal plane Sm. FIG. 19 and FIG. 27 show the distance 209 to the center 211 on both sides and the median sagittal plane Sm passing through the through the center 211.

Optionally checking the position of center 211 by matching it with the position of nose point 601, see FIGS. 20 to 24, above the root of the nose. Since, geometrically speaking, a saddle surface is located in anchor point 601 in the exemplary embodiment of the head selected here (nose point NP), the position of anchor point 601 as center 211 of transverse axis 215 may be rather inaccurate.

Optional alignment with the center 212 of the inner ear axis 285 between the right-left symmetrical landmarks 280L and 280R of the inner ear and the vestibular organ, respectively, see FIG. 27. Here, although there is often a measurable deviation of the axis direction 285 from the transverse axis direction 215 defined above, the landmarks 280L and 280R on the inner ear are very suitable for determining the center 212 and thus the central position of the median sagittal plane Sm.

Selecting the image plane perpendicular to the transverse axis 215 defined above and through the centers 211, 212 defined above and considering the optional additional anchor points 602, 603 if necessary.

Displaying the median sagittal plane Sm as a sectional plane in at least a portion of the visualization device 72.

d) Display of the 3D structural marker in the virtual image space

After this first alignment of the image planes (sagittal planes, frontal planes, transverse planes) for the visualization 72, the 3D structural marker 500 according to the invention can be inserted and aligned by:

Generating a digital or virtual image of the 3D structural marker 500, which is preferably present in the data area 60 as a data object 55, as a scalable 3D object 500.

Overlaying the virtual 3D image of the body part or skull with the 3D structural marker 500 in digital or virtual space 50.

Display of plane packages 501, 502, 503 in the sectional view, where the planes of the plane packages appear as parallel lines in the sectional view. Planes perpendicular to each other appear as right-angled crossed lines T, F, S (R and L oriented) in true-angle display.

If required, show and/or hide the plane packages or show and/or hide individual plane packages.

e) Degrees of freedom and individually definable parameters of 3D structural marker The exact individual scaling, positioning and orientation of the 3D structural information 500 may typically include at least 7 degrees of freedom:

3 degrees of freedom (parameters) of translation on the three coordinate axes.

3 degrees of freedom (parameters) of the rotation of the spatial orientation of the principal axes.

At least 1 degree of freedom (parameter) of the 3D structural marker scaling 500.

f) Positioning, orientation and scaling of the 3D structural marker 500 in the digital or virtual image space 50

The first main purpose of the structural marker according to the invention may be to analyze the symmetry and harmony of the body part, in particular the skull and the jaw regions of the upper jaw OK and the lower jaw UK. For this purpose, the 3D structural marker 500 may first be aligned with the sagittal principal plane and, further, with the aid of the structural marker 500 itself, the transverse principal plane may be defined by:

Placing the virtual 3D structural marker 500 as a digital or virtual object in the virtual image space 50. In sagittal sectional view, the grid of parallel lines T1 Tn and F1 Fn can be seen.

Aligning the 3D structural marker 500 with its median sagittal plane directly in the median sagittal plane Sm of the contrast-imaged body part, in particular the bony skull 200 in the preferred exemplary embodiment.

Display anchor points 601, 602, 603 for 3D structural marker 500 alignment.

In the exemplary embodiment on the head for dental and orthodontic applications, the anchor point 601 (nose point NP) is positioned in the nasion and the anchor point 602 (base point BP) is positioned in the basion and the anchor point 603 (palate point GP) is positioned in the bone area between the palate roof and the base of the skull. Other anchor points or more or less anchor points are also possible.

Positioning of the not yet oriented and not yet scaled 3D structural marker 500 with a pivot point e.g. at the anchor point 602. Preferably, an intersection point of T and L lines is suitable as pivot point or pivot axis D. In the exemplary embodiment, positioning of the intersection point of line F5 with T3 directly on the anchor point 602 (BP).

Rotation of the 3D structural marker 500, preferably around the anchor point 602, so that the spatial direction of the T-lines is parallel to the line through the anchor points 602 and 603. In the exemplary embodiment, rotation around GP until line T3 runs tangentially through anchor point 603 (GP).

Optionally scale the 3D structural marker 500 by reducing or enlarging it until a defined F line passes through the anchor point 601 (NP). In the exemplary embodiment, scaling with fixed point 602 (BP) without rotation until line F1 passes tangentially through anchor point 601 (NP). Line T3 also runs after scaling through anchor point 602 (BP) and tangentially through anchor point 603 (GP). Alternatively, the optional scaling can also take place before the rotation.

Thus, the position of the 3D structural marker 500 in the three spatial coordinates is defined as well as the spatial orientation in the three spatial angles and, in addition, the size of the 3D structural marker 500 can now also be defined. The isotropic scaling in the three spatial directions, for example, also results in the plane distances of all plane packages 501 (T transverse), 502 (F frontal), 503 (S or R and L sagittal), see FIGS. 19 to 22.

The steps described above for positioning, aligning and scaling can alternatively follow each other in a different time sequence and/or be extended by additional translations, rotations and scalings. One of the positioning, aligning and rotation or scaling operations may also be omitted. Alternatively, several of these operations may be omitted. It may be critical that, at the conclusion of the alignment, the 3D structural marker 500 is individually scaled and that the landmarks/features and anchor points are suitably reached, i.e., suitably overlapped. The above exemplary embodiment is one of the most direct ways to achieve this.

With suitable technological means of pattern recognition and automation, these steps and as well as parameter assignments can be designed partially or completely automatically.

g) Using multiple 3D structural markers 500

The 3D structural marker 500 according to the invention can be copied into the digital or virtual 3D space 50 under consideration, either once or several times:

Multiple use can be used, for example, to assign a 3D structural marker to each of several body parts that are movable relative to each other, e.g. 500.A and 500.B.

Thus, both the cranium 200 and the lower jaw UK can each be assigned a 3D structural marker, see FIG. 28.

More than one 3D structural marker 500 can also be applied within a body part.

For many applications, an additional 3D structural marker 500 can be introduced to align them with non-physiological, non-symmetrical or non-harmonic features and thus make their deviation from the symmetry and harmony of the shape visible and measurable.

h) 3D structural marker 500 to analyze the harmony and symmetry in the body part under consideration.

The fitted 3D structural marker 500 can show the symmetry and geometric harmony of the body part:

At the top of the upper anterior cranium 200, the symmetry according to which the transverse axis 215 and the median sagittal plane Sm were defined may be apparent.

Further down in the cranial region, i.e. in the area of the nasal septum and the pharynx, significant asymmetries can be seen, see e.g. FIGS. 19, 26, 27.

Measurement of the inner ear axis 285 using the internal ear landmarks 280L and 280R may reveal a spatial orientation of the inner ear axis 285 (IOA) that is not always parallel to the transverse axis 215 resulting from bony landmarks of the anterior superior cranium, particularly anatomical landmarks. This may be indicative of asymmetry of the anterior cranium 200 relative to the posterior cranium 200.

Fitting a structural marker 500 to the anatomy of the dental arches 221 and 231, particularly to the dental arch 221 of the upper jaw OK, see FIGS. 29 to 32, can often result in a tilt angle 214 in the frontal sectional view with which the current occlusal plane may be tilted against the cranial transverse plane.

The current axis 216 can be both tilted and displaced relative to the transverse axis 215. In many cases, the current occlusal plane may be too far up, e.g. if the lower jaw UK is too small and, in addition, the teeth are already ground down, see e.g. FIG. 29.

If one structural marker 500.A is fitted into the cranium 200 as described above and a second structural marker 500.B is fitted into the lower jaw UK at the temporomandibular joint, the tilting and displacement of the lower jaw UK can be very clearly visible and directly measurable, see FIG. 28.

i) Planning of dentures or tooth modifications with the help of 3D structural marker 500

The transverse plane 501.1 (T1), see FIGS. 20, 23, 24, 29, 30, 31, 32, or the reference plane T1 a, see FIG. 20, can mark the idealized location of the occlusal plane 201, aligned with the landmarks of the bony structures of the skull 200, with the 3D structural marker 500 fitted:

In most practical cases, the current position of the occlusal plane may differ from the ideal occlusal plane 201.

The deviation can be in the vertical position as well as in the inclination sideways to the axis 215, as well as in the inclination backwards to the axis 205.

Particularly, in the production of dental prostheses, the teeth are preferably aligned with the ideal occlusal plane 201 and thus arranged and shaped differently from the previous situation in such a way that the new occlusal plane is closer to the ideal occlusal plane 201.

Cosmetic framework conditions can be adhered to. However, in the vast majority of cases, the change based on the 3D structural marker 500 can lead to very significant improvements in the optical appearance as well, because the symmetry in the lower jaw UK and upper jaw OK to the upper facial skull is now better than before.

Instead of implants and crowns, veniers (veneers) can also be fabricated to correct the occlusal plane so that the distance between the lower jaw UK and upper jaw OK increases in occlusion. The visual effect can be a younger, more dynamic appearance. The biomechanical effect can be a significant relief of the temporomandibular joint.

j) Design and manufacture of training apparatuses and orthoses.

A particular use may be made of the structural marker 500 and the ideal position of the occlusal plane 201 determined thereby in the design and manufacture of apparatuses 300 for training and/or therapy for malocclusions, particularly of the temporomandibular joint:

In one step the image planes can be aligned as described above.

In a further step, at least one 3D structural marker 500 may be introduced.

The 3D structural marker can be positioned and/or aligned and/or scaled as described above.

This allows the idealized occlusal plane 201 to be defined; in the preferred exemplary embodiment, it is located in plane 501.1 (T1), see, for example, FIGS. 31 and 32.

This idealized occlusion plane 201 with its spatial directions 205 and 215 can now serve as a basic plane for setting up apparatuses 300, etc., in digital or virtual space.

For apparatuses 300 having upper parts 320 and lower parts 330, the separating plane 301 between 320 and 330 can be positioned in the location of the idealized occlusal plane 201, i.e., in particular, the principle axes 315 and 305 of the apparatus 300 can be aligned with the principle axes 215 and 205 of the cranium 200.

In this orientation of the apparatus 300 relative to the cranium 200, a fixed reference to the teeth of the upper jaw OK may result. The reference to the teeth of the lower jaw UK may be less fixed, which is why design options for therapy and/or training and possibly cosmetics may be available here.

The recesses for teeth, gums and other volume stressing parts in the mouth can result from the intersection of the tissues depicted in the virtual space with the materials of the apparatus 300. Boolean operators may be used here, particularly subtraction, AND, NOT, OR, or combinations of these operators.

The upper part 320 may show overlap with the dental arch of the upper jaw 220, and the recesses of material in the upper part 320 may be designed to prevent collisions and to allow the apparatus 320 to fit snugly in the mouth on the dental arch 221 and not injure the softer tissues in the upper jaw 220.

The lower part 330 can show the overlap with the dental arch 231 of the lower jaw UK after the lower jaw UK has been positioned biomechanically and physiologically suitable in the digital or virtual space 50. For this purpose, the idealized occlusal plane may be suitable, which in the explained method corresponds to the plane T1 or the reference plane T1 a. Here, too, the recesses on the material of the molded part 330 can be designed in such a way that no collisions occur and that the apparatus 330 fits snugly in the mouth on the dental arch 231 and the softer tissues in the upper jaw 230 are not injured.

The apparatus 300 with parts 320 and 330 can be manufactured as a real apparatus after being designed in virtual 3D space, either additively, e.g. by 3D printing, or subtractively, e.g. by 3D preforms machined by 3D milling machines.

The fabricated moldings can be absolutely customized to fit the individuals' dental arches precisely and can sit in the individual's mouth with positional accuracy.

According to the design, the realized separating plane between the upper part 320 and the lower part 330 can be parallel to the transverse planes T and ideally lie on the transverse plane T1 or on the reference plane T1 a.

k) Special significance of the transverse idealized occlusal plane as a separating-sliding plane The fitted 3D structural marker 500 can define the position and orientation of the transverse planes:

The ideal occlusal plane or chewing plane can be such a transverse plane and thus lie orthogonal to the vertical axis.

The muscles that lift the lower jaw UK and press it against the upper jaw OK attach symmetrically at the top of the cranium 200 on the right and left.

If the movement of the lower jaw UK is released by a suitable apparatus in the lateral direction exactly in the transverse plane, this can mean an unstable equilibrium of the position under pressure.

This unstable equilibrium can result because, during free lateral movement, the resulting force between the lower jaw UK and the upper jaw OK is perpendicular, as in the case of a dancer or figure skater balancing on one leg.

Such instability can train the regulative or autonomic nervous system and this can have great and useful effects on the neurophysiological control and on the sensorimotor system of the masticatory apparatus.

In a particularly preferred exemplary embodiment, the separating plane between the upper part 320 and the lower part 330 can be designed as a smooth, retention-free, i.e. no protrusions, and/or low-friction separating-sliding surface 301, so that the contact force is perpendicular to this separating-sliding surface as long as no lateral stops are reached.

In a particularly preferred exemplary embodiment, an apparatus designed in this way can be fitted into the virtual space in such a way that the separating-sliding plane 301 lies exactly in the idealized occlusion plane 201 or is at least approximately arranged there.

When such apparatuses with separating-sliding plane 301 are used with individualized alignment in the mouth, there are demonstrably very beneficial training effects on the jaw musculature and on the temporomandibular joint, up to and including massive therapeutic effects.

In this way, the 3D structural marker 500 of the invention can be used to design and manufacture highly effective apparatuses that exhibit excellent therapeutic effects. The functional tests have shown that a 3D structural marker which obeys the Fibonacci sequence 3, 5, 8, 13 as precisely as possible in the plane distances is particularly well suited for producing apparatuses which lead to very good therapeutic and also, if necessary, very good cosmetic results. Therefore, the particularly preferred embodiments of 3D structural marker use exactly this spacing ratio, see rulers in FIG. 26 and FIGS. 29 to 32. Conversely, the effectiveness of the apparatuses in use may deteriorate if they deviate from the orientation of the principal planes and principal directions of the cranium 200 and from the harmonic symmetry of the principal planes. Thus, the idealized position of the occlusal plane 201, see for example FIG. 19, as resulting from the application of the 3D structural marker 500 according to the invention, has already been comprehensively demonstrated in practical use. The apparatuses can be iteratively adjusted after several weeks, for example, positioning the 3D structural marker in a new image of the patient's skull to change the occlusal plane, which may now be in a different location than at the beginning of the action.

There are numerous 3D image viewing systems on the market that allow objects to be fitted into other 3D image data, e.g. using a computer mouse, a so-called trackball or even voice control, i.e. semi-automatically with a certain manual component. The objects can be pins, implants or the like. Alternatively, the object can be a structural marker that has been previously defined with the 3D image viewing system or another program, e.g. for image processing or a CAD (Computer Aided Design). For example, the Extraoral-3D-Family program can be used or another suitable program, e.g. from the Sirona3D company.

In a further development stage, the 3D image viewing system can be adapted to automatically align the 3D structural marker with the anchor features or anchor points, with translations, rotation and scaling also being performed automatically or fully automatically. Manual intervention or readjustment may be possible.

The exemplary embodiments are not to scale and are not limiting. Variations within the scope of the skilled art are possible. Although the invention has been further illustrated and described in detail by the preferred exemplary embodiment, the invention is not limited by the disclosed examples and other variations may be derived therefrom by those skilled in the art without departing from the scope of protection of the invention. The further developments and embodiments mentioned in the introduction may be combined with each other. The exemplary embodiments mentioned in the figure description may also be combined with each other. Furthermore, the further developments and embodiments mentioned in the introduction may be combined with the exemplary embodiments mentioned in the figure description.

The proposed method and its further developments cannot be used for treating the human or animal body and cannot be a diagnostic method practiced on the human or animal body. Alternatively, the proposed method and its further developments may be used for the treatment of the human or animal body and they may be a diagnostic method practiced on the human or animal body.

Disclosed is a 3D structural marker as a novel 3D tool for the alignment of virtual 3D objects in spatial relation to body parts such as the head or the spine, which are also virtually displayed in 3D systems after image-based 3D acquisition. The aim of this alignment in virtual space is to bring the teeth, implants and apparatuses, which are to be individually aligned with the bone substance, virtually into a state that is as physiologically highly functional as possible, so that they can then be manufactured with this excellent property on the basis of the virtual 3D data. In a particularly preferred application on the head and jaw of patients, 3D structural marker is used to very quickly, safely and elegantly define the principle axes and principle planes, which would otherwise be very complex and tedious. The principal axes and principal planes of the cranium are crucial for the functionality of teeth, dentures or orthodontic apparatuses. A particularly effective group of applications results from the use of 3D structural marker for the design and fabrication of apparatuses that have a separating-sliding plane oriented as parallel as possible to the cranial transverse plane. Moreover, the 3D structure of the structural marker 500 allows simple but precise vertical positioning of the ideal occlusal plane, which would be impossible or difficult to achieve using other methods. The 3D structural marker can also be referred to as a 3D ruler, especially if size scales are also displayed, which can be suitably adjusted by the optional scaling.

Feature groups from which claims can be formulated, in particular by selecting one or more of the named features and combining any selected features: 3D tool 3D structural marker 500 as a tool for application in virtual 3D space, comprising at least two plane packages, each consisting of plane-parallel planes, each of the plane packages consisting of at least 3 planes which are in a characteristic spacing relationship, wherein at least two plane packages 501 and 502 are perpendicular to each other in their orientation.

3D structural marker 500 . . . wherein the structural marker has a transverse axis that serves for the transverse orientation and alignment of the structural marker in virtual space, in particular the alignment with bony structures of body parts in a virtual 3D image of the respective body parts.

3D structural marker 500 . . . wherein the distances between the plane-parallel planes within at least one plane package have a defined distance ratio that at least partially corresponds to the formation law of Fibonacci series 3, 5, 8, 13, 21, etc.

3D structural marker 500 . . . wherein the distances between the plane-parallel planes of at least one plane package have a constant proportionality ratio, wherein the distance of the subsequent plane to the previous distance is in the ratio between 1.8 and 1.5.

3D structural marker 500 . . . wherein the distances of the plane-parallel adjacent planes are completely or almost exactly proportional and the proportionality factor is between 1.60 and 1.65.

3D structural marker 500 . . . wherein at least three mutually orthogonal plane packages are combined to form a virtual 3D structure.

3D structural marker 500 . . . wherein the plane packages can be oriented in their combination such that a first plane package 501 comprises at least 3 transverse planes, a second plane package 502 comprises at least 3 frontal planes, and a third plane package 503 comprises at least 3 sagittal planes with respect to a body part.

3D structural marker 500 . . . wherein the structural marker comprises intersection lines of the planes ins space which appear as intersection points in the sectional plane perpendicular thereto, wherein this image plane the intersection lines of the parallel planes of the plane packages appear as parallels with the image plane.

7 degrees of freedom for positioning composed of the definition of 3 degrees of freedom of translation and 3 degrees of freedom of rotation and at least one degree of freedom of scaling for defining the relative position and orientation and size of a structural markwe 500 characterized in that:

frontal plane Fn passes through anchor point 601, and/or transverse plane Tx passes through anchor points 602 and 603, and/or frontal plane F1 passes through anchor point 601.

And thus the definition of an anchor point for the positional positioning of the idealized chewing plane (biomechanically individually ideal position of the chewing plane based on the shape and structure of the skull) by a point of intersection between the transverse plane T and the frontal plane F of the structural marker in the sagittal view. Spatial orientation of the idealized chewing plane parallel to the transverse plane of the structural marker.

Figure 4:
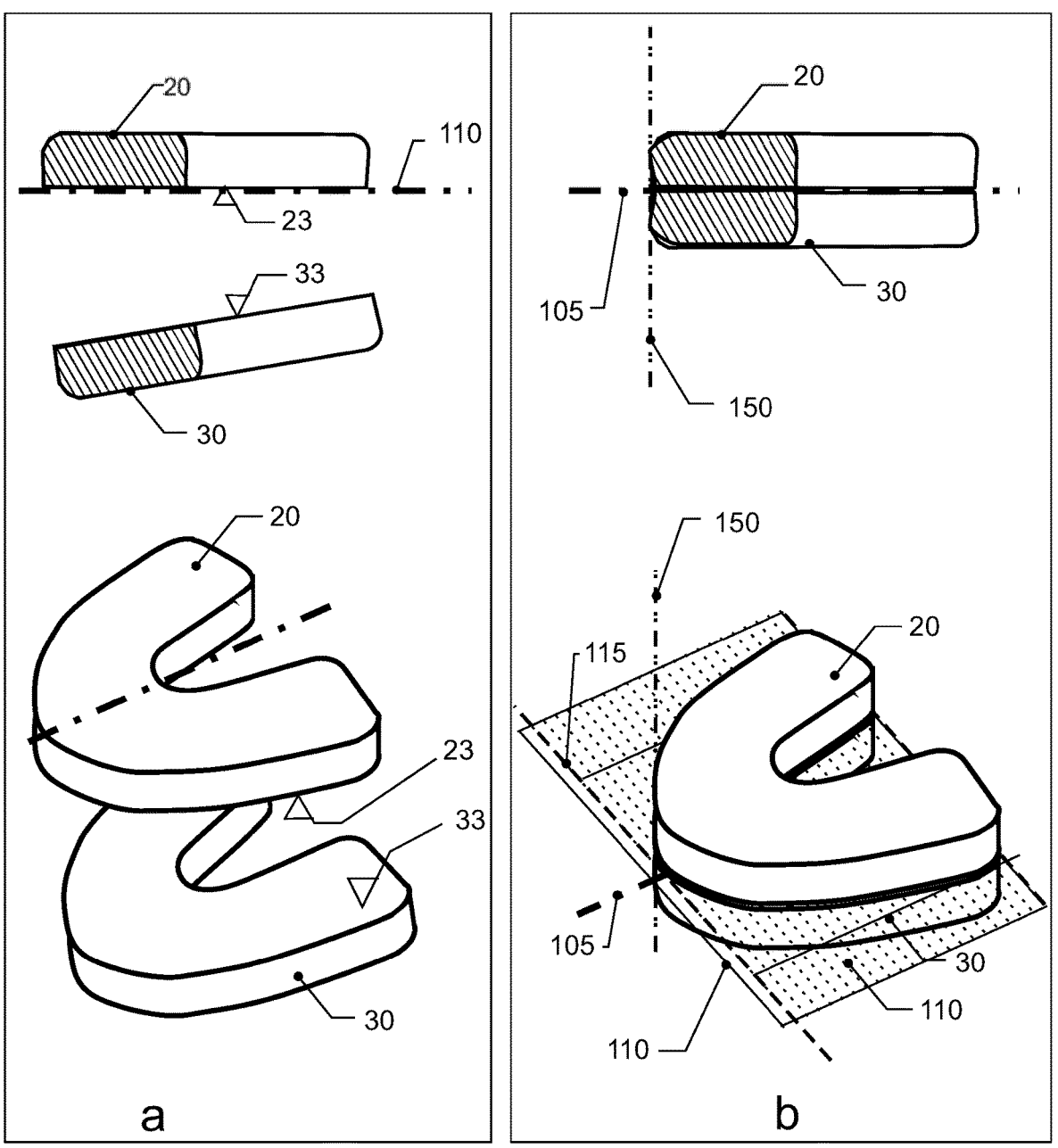

Particularly preferred structural marker according to FIG. 4 generated in sectional view according to FIG. 8:

frontal plane F5 passes through anchor point 601 BP, and/or transverse plane T3 passes through anchor points 602, BP and 603 GP, and/or frontal plane F1 passes through anchor point 601 NP, and/or defines incisal point 604, IP as intersection F1 with T1, preferably in the median sagittal plane.

3D Method

A method of applying a 3D structural marker 500, wherein the structural marker is aligned in its transverse axis with bony structures, wherein for this purpose approximately symmetrical landmarks in the bony structures on the right and left are used to make tangential approximations with transverse axes and/or to the let the axis pass through these landmarks, wherein the transverse thus aligned serves as the surface normal of the sagittal planes which are used as image planes in a 3D image system for the further alignment of the 3D structural marker.

Method . . . using the bony structures of the anterior facial skull on the right and left in their axial connection as the transverse direction for alignment of the transverse axis.

Method . . . wherein the 3D structural marker is positioned at further anchor points in at least one coordinate and aligned in at least one solid angle by using anchor points that lie in a plane that is in the image plane or parallel to the image plane.

Method . . . wherein the 3D structural marker is enlarged or reduced to the extent that at least two given anchor points are touched or intersected by given lines.

Method . . . wherein the 3D structural marker 500 is enlarged or reduced to the extent that at least three given anchor points are touched or intersected by predetermined lines.

Method . . . wherein the 3D structural marker 500 is positioned in a sectional image representation around an anchor point in one step, is rotated by an angle in another step so that a principal axis of the structural marker points in the direction of the connecting axis of two anchor points of a body part, and is scaled in a third step so that at least 2 anchor points pass through defined lines or intersection points of the 3D structural marker in the sectional image.

Method . . . wherein the 3D structural marker 500 is oriented in its sagittal planes 503 parallel to the sagittal plane of the body part, in particular of the head, wherein in at least one positioning step the structural marker 500 is positioned in such a way that a pivot point is defined and in a second step a rotation of the structural marker by an angle takes place, so that the transverse plane is parallel in sagittal sectional view to the connecting line between two anchor points 602 and 603, and in a further step the scaling of the size and the plane spacing of the structural device 500 is adjusted so that the structural marker intersects a further anchor point 601 with a frontal plane.

Method . . . wherein the positioning of the 3D structural marker 500 accurately takes into account at least one 3D position of an anchor point 602 lying in the sagittal plane, and the axis orientation of the structural marker 500 is such that a transverse plane of the 3D structural marker 500 passes through the second anchor point 602 approximately tangentially and a plane perpendicular to the transverse plane and the sagittal plane intersects at least one further anchor point 601, and in that for this purpose the scaling of the 3D structural marker is suitably adjusted to satisfy these conditions simultaneously.

Method for positioning and orienting and scaling a 3D position marker 500 wherein as anchor point for positioning and rotation the base point BP at the foramen magnum is used and as anchor point for angular orientation of the transverse plane the palatal point GP at the uppermost point of the palatal roof in the middle of the spongiosa or in the middle of the concrete compact bone edges between the palate and the base of the skull is used and as anchor point for scaling the structural marker 500 the nasal point NP at the nasion above the nasal root is used.

Usage

Use of the principal planes and principal directions defined by alignment of the 3D structural marker 500 for precise angular alignment and 3D positioning of the separating-sliding plane of apparatuses, said separating-sliding plane permitting, within other mechanical limits, lateral low-friction mobility in the directions of the plane and rotation about the normal axis perpendicular to the separating-sliding plane.

Use of the transverse plane T1 positioned according to the invention and oriented in the directions as an alignment plane for the idealized separating-sliding plane of apparatuses or the idealized occlusal plane of the dentition.

Use of the idealized separating-sliding plane defined by means of 3D structural marker 500 with position and orientation as separating plane for the manufacture of real at least two-part apparatuses for insertion into the body or for attachment to the body part.

Use of the idealized separating-sliding plane defined by means of 3D structural marker 500 parallel to the cranial transverse plane T1 for the manufacture of dental prostheses or of implants or of apparatuses for insertion into the mouth, in particular for placement on the dental arches.

Although the invention has been further illustrated and described in detail by the preferred exemplary embodiment, the invention is not limited by the disclosed examples and other variations may be derived therefrom by those skilled in the art without departing from the scope of protection of the invention. Identical reference signs refer to identical technical features unless otherwise stated. Where "may" is used in this application, it means both, the possibility of realization and the actual technical implementation. The concepts of the disclosure are described with reference to preferred exemplary embodiments below in a specific context, namely, a structural marker on a head, particularly for positioning apparatuses in the region of the teeth. However, the disclosed concepts can also be applied to other situations and/or arrangements, in particular to structural marker on other parts of the body and to apparatuses arranged on these other parts of the body.

Glossary

Buccal: to the lateral surface of a tooth facing the cheek.

Lingual: side facing the tongue

Occlusal: facing the occlusal surface

Marginal gap: gap between apparatus 100 and body tissue such as tooth or gum.

DVT: digital volume tomogram, stationary 3D X-ray image

OK: upper jaw 220

OKP: upper jaw preform 20

OKM: upper jaw part 120 of apparatus 100

UK: lower jaw 230

UKP: lower jaw preform 30

UKM: lower jaw part 130 of apparatus 100

TGE: separating-sliding plane 110 between OKM 120 and UKM 130

AKE: current chewing plane 111, approximate, mostly oblique to TGE 110.

Anterior-posterior running from front to back

BP base point at the basion of the foramen magnum, preferably as an anchor point 2

DVT digital volume tomogram, stationary 3D radiography f1, f2, f3 . . . distance between frontal planes F first plane F1 to F5 frontal plane F, plane with principal directions right-left and top-bottom GP palatal point, preferred as anchor point 3

Cranium bony skull

L left

L1 to L5 sagittal planes running to the left, plane with principal directions front-back and top-bottom NP nose point on nasion, preferred as anchor point 1

OK upper jaw 220

R right

R1 to R5 sagittal planes running to the right

S second plane t1, t2, t3 . . . distance of transverse planes T s1, s2, s3 . . . distance of sagittal planes S Tb first sectional plane T1a reference plane Tx transverse plane passing through anchor points 602 and 603.

T third plane

T1 to T5 transverse plane, plane with principal directions front-back and right-left UK lower jaw 230

KS0 reference system x0, y0, z0 axis, coordinate

KS1 first digital reference system x1, y1, z1 axis, coordinate

KS2 second digital reference system x2, y2, z2 axis, coordinate

KS3 third digital reference system x3, y3, z3 axis, coordinate

REFERENCE SIGN

1 to 8 tooth positions in the jaw

20 upper jaw preform OKP

22 data object as a representation of the predominant bony structures of the body part.

22a spatial data

30 lower jaw preform UKP

33 data object representing the apparatus 300 and its parts

40 real space with real objects

50 digital or virtual space of 3D structural marker

55 data set, data object as a representation of the 3D structural marker.

60 data space with data objects in memory unit

60a storage unit

66 data set, other data objects

71 processing unit, 3D image system with processor

72 visualized views for digital or virtual 3D objects

72a output unit, monitor

73 input means for positioning, rotation, scaling, etc.

73a input unit

80 imaging unit

81 image data storage and generation 3D image data set

82 arm of a 3D X-ray exposure device with multiple exposure directions

83 radiation sensitive array for image generation

90 head of an individual

90a body part

91 radiographically dense bony structures in the head

100 apparatus

105 axis front-back in the apparatus

110 separating-sliding plane TGE between OKM and UKM

111 current chewing plane AKE without correction of the position of the UK

112 tilt angle Kappa between AKE 111 and TGE 110

113 cranial symmetry point on the right, preferred in the facial skull

114 cranial symmetry point left, preferred in the facial skull

115 axis right-left in the apparatus 100

116 transverse tilt angle

117 sagittal tilt angle

120 upper jaw part OKM

121 training bead on the outside of the OKM circumferentially

122 marginal gap in the upper jaw module

123 plan smooth separating-sliding surface at OKM

124 recess in the OKM corresponding to tooth and gum

125 cusp-like or plateau-like projection as support point in the OKM

127 side walls of the recesses 124 in the OKM preferably with marginal gap, not adjacent

129 penetrations from the teeth of the lower jaw into the sliding surface 123 in the OKM

130 lower jaw part UKM

131 training bead circumferential on outside of UKM

132 marginal gap in the lower jaw module

133 smooth plane sliding surface and separating surface at the UKM

134 recess in the UKM corresponding to tooth and gum

135 cusp-like or plateau-like protrusion as support point in the UKM.

136 breakthrough of the recess 134 through the separating-sliding surface 133

137 lateral walls of recesses 124 in UKM preferably with marginal gap, not adjacent

150 axis top-bottom in the apparatus

200 cranium, bony skull

200a bony structure

201 idealized occlusal plane, physiological position of the separating-sliding plane 203 angle of inclination between the cranial anterior-posterior axis 205 and the image horizontal, especially for horizontal image adjustment of the AP axis 215

205 axis front-back in inclination slightly oblique to the rear downward with upright head posture

205a axis parallel to anterior-posterior axis

209 distance to center

211 center

214 tilt angle of the current occlusal plane e.g. at the dental arch of the upper jaw relative to the cranial transverse axis 215

215 axis right-left based on anatomical landmarks preferably of the facial skull

216 tilted current occlusal plane

215 R/L alignment points for the cranial transverse axis 215 in the anterior facial skull 220 Upper jaw OK

221 dental arch in the upper jaw

223 eye orbit

228 tooth from the dental arch of the upper jaw

230 lower jaw UK

231 dental arch in the lower jaw

238 tooth from the dental arch of the lower jaw

245 orientation axis in the upper facial skull

250 axis top bottom in skull

256 tilted vertical (surface normal) perpendicular to current occlusal plane 216

270 upper spurs of the cervical spine

275 temporomandibular joint bone, near joint area

280 inner ear structure, especially arch of the organ of equilibrium

281 R/L symmetric landmarks

285 inner ear axis 10A

295 Perpendicular to the inner ear axis

301 low-friction planar separating-sliding plane of apparatus 300 between upper part

320 and lower part 330.

500 3D structural marker as digital or virtual 3D object

501 first plane package, transverse plane package,

501.1 to 501.nplane

502 second plane package, frontal plane package,

502.1 to 502.nplane

503 third plane package, sagittal plane package,

503R sagittal plane package running to the right

503R.1 to 503R.5 plane

503L sagittal plane package running to the left

503L.1 to 503L.5 plane

515 first principal direction of a plane

550 second principal direction of a plane

601 third anchor feature or first anchor point above cranially in the area of the forehead/nose.

602 first anchor feature or second anchor point posteriorly cranial in the region of the base

603 second anchor feature or third anchor point at the front in the region of the palate

604, IP Ideal incisal point between the upper and lower incisors determined with the aid of the 500 structural marker.

W1, W2 angle

D pivot axis

700, 800 method

710 to 790 step

810 to 890 step

The invention claimed is:

1. Apparatus for training the muscular, sensorimotor and neurophysiological systems of the temporomandibular joint and for positioning and guiding the lower jaw relative to the upper jaw, wherein the apparatus comprises at least two modules which lie against one another in the region of a comparatively large-surface smooth planar separating-sliding plane without teeth or tooth fissures or comparable shapes obstructing the sideways movement of the modules relative to one another along the separating-sliding plane, wherein at least one of the two modules is designed as an upper-jaw module which has a plurality of recesses for the teeth of the upper jaw, said recesses approximately forming an arch, and a first smooth sliding surface, and at least one of the two modules is designed as a lower-jaw module having a plurality of recesses for the teeth of the lower jaw and a second smooth sliding surface, wherein the separating-sliding plane together with a dental chewing plane spans a first angle k greater than 0°, wherein the lower jaw and the upper jaw form the dental chewing plane in the state of mechanical contact.

2. The apparatus according to claim 1, wherein the a) the first angle k is determined in plan view perpendicular to a sagittal sectional view of the cranium, the first angle preferably being <10° and/or b) the separating-sliding plane together with the dental chewing plane spans a second angle which is determined in plan view of a sagittal sectional view of the cranium, wherein the second angle is spanned by a first axis, which intersects the base point in parallel displacement with the dental chewing plane, and a second axis, which intersects the base point and the palatal roof point.

3. The apparatus according to claim 2, wherein the second angle is between 0° and 10°.

4. The apparatus according to claim 1, which is rotated in the separating-sliding plane through an angle of rotation that spans an angle<10° from a sagittal plane passing through the incisors.

5. The apparatus according to claim 1, wherein the recesses are designed to be widened in depth and in extension parallel to the separating-sliding plane in comparison to a 3D tooth geometry to such an extent that, when the modules are placed on the dental arches, marginal gaps remain between the material of the modules and the body tissue and/or the tooth material.

6. The apparatus according to claim 1, wherein selected recesses at a narrowly defined local location corresponding to the chewing surface of a tooth have cusp-like or plateau-like contact points, wherein directly at the contact points the 3D geometry without marginal gap corresponds to the 3D surface of the teeth and the contact points are surrounded by regions with marginal gap.

7. The apparatus according to claim 1, wherein at least one module and therein at least one recess has at least partially in the region of the chewing surface of the tooth an open aperture through the material of the module, wherein the recess is designed in such a way that the tooth with its chewing surface lies partially outside the module, in the region of the opposite module.

8. The apparatus according to claim 1, wherein at least one sliding surface of the modules is locally pierced by at least one recess corresponding to a tooth of the opposing dental arch, said recess being widened at least by a marginal gap allowing the lateral mobility of the tooth of the opposing side passing into the recess along the separating-sliding plane.

9. The apparatus according to claim 1, wherein the material of the modules outside the arch of the recesses form a bead-shaped rim, which requires such a large volume in the oral cavity, in particular such that the soft tissues, muscles and fascia are stretched in a defined manner by this bead rim.

10. The apparatus according to claim 1, wherein the modules are approximately horseshoe-shaped and each comprise a dental arch, wherein the apparatus is defined in position by an orthogonal axis system, wherein the modules are placed against each other at the sliding surfaces to form the separating-sliding plane and are displaceable in this contact position almost without friction, in particular when a force not exactly perpendicular to the separating sliding plane is exerted by the lower jaw in the direction of the upper jaw on the two modules in the sense of a compressive force.

11. The apparatus according to claim 1, wherein in at least one of the modules the dental chewing plane formed by the chewing surfaces of the teeth of the dental arch is oblique on the separating-sliding plane separating and slidingly guiding upper jaw modules and lower jaw modules against each other, wherein a clearly measurable tilt angle k between the planes and of more than 0.2 degrees occurs.

12. The apparatus according to claim 1, wherein the apparatus in the inserted mouth expands the lips by more than 10% due to bead rims and the apparatus can be covered by the lips to a maximum of 90% as seen from the front, wherein the separating-sliding plane is visible from the front and the transverse right-left axis can be detected metrologically in its axial direction.

13. The apparatus according to claim 1, wherein at least one of the modules is made from several parts, in particular from two parts, wherein the modules have recesses which predominantly correspond to the molars and/or canines of the respective dental arch, wherein the parts of a module together form the same separating-sliding plane when they are inserted together into the mouth and positioned on the dental arch.

14. The apparatus according to claim 1, wherein a bead-shaped rim of the lower jaw module in the region of the anterior teeth is more than 1 mm wider than the bead-shaped rim of the upper jaw module and the two modules have an approximately flat transition at the outer regions towards the cheek without distinct contour projections.

15. The apparatus according to claim 1, wherein the position of the recesses in the modules is adjusted 6-dimensionally, with 3 spatial positions and 3 spatial directions, by fitting a 3D digital model of the apparatus to the 3D digital model of the skull such that the orthogonal axes of the facial skull are parallel to the orthogonal axes of the separating-sliding plane, wherein the right-left axes and the front-back axes and the top-bottom axes are perpendicular to each other in the sense of orthogonality and the position of the orthogonal axes of the skull is defined on the basis of typical bony landmarks of the skull, in particular of the facial skull in the 3D model.

16. The apparatus according to claim 1, wherein at least one of the recesses comprises both a contact point and an aperture, wherein the vicinity of the contact point is designed with marginal gaps.

17. The apparatus according to claim 1, wherein marginal gaps in the vicinity of the breakthrough recesses in the separating-sliding plane are worked out to such an extent that a laterally sliding movement in two directions right-left and/or back-front and combined is possible by at least 0.3 mm, particularly preferably at least 0.4 to 1.4 mm.

18. The apparatus according to claim 15, wherein the right-left position of the apparatus relative to the skull is determinable by the right-left symmetry along the right-left axis of the bony features of the facial skull and or the right-left symmetry of the upper jaw in the anterior tooth region, and further the up-down position of the apparatus along the up-down axis of the skull is determinable by the area of overlap of the incisors or the dental arches in the anterior tooth region and, in addition, the back-front position of the apparatus can be determined along the back-front axis by the region between the upper and lower anterior teeth.

19. The apparatus according to claim 15, wherein a marginal gap layer can be generated in the 3D digital model of the apparatus as an extension of the volume required by teeth and gums, which marginal gap layer is maintained by isolated contact points even under pressure, on which the apparatus rests on the dental arches in the chewing pressure direction, in that at the location of the contact points the modules are formed locally without marginal gap in form fit to the corresponding tooth and subsequently these modules 3D geometry is produced with marginal gap and contact points and the position and location of the recesses resulting from the orientation including marginal gaps and contact points for the dental arches is produced.

20. The apparatus according to claim 1, wherein the smooth planar first and second sliding surfaces of the modules have a roughness with RZ below 5 micrometers so that, along the separating-sliding plane, a laterally sliding planar and flat guided sliding movement in two spatial directions and/or a rotation about the axis perpendicular to the separating-sliding plane can take place.

* * * * *